(12) United States Patent
Ruiz Echevarria

(10) Patent No.: US 12,540,361 B2
(45) Date of Patent: Feb. 3, 2026

(54) GENE SIGNATURES FOR CANCER CHARACTERIZATION AND TREATMENT

(71) Applicant: The Board of Regents of the University of Oklahoma, Norman, OK (US)

(72) Inventor: Maria Jesus Ruiz Echevarria, Edmond, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 18/752,771

(22) Filed: Jun. 24, 2024

(65) Prior Publication Data

US 2024/0417808 A1  Dec. 19, 2024

Related U.S. Application Data

(63) Continuation of application No. 17/255,375, filed as application No. PCT/US2019/040684 on Jul. 5, 2019, now abandoned.

(60) Provisional application No. 62/694,323, filed on Jul. 5, 2018.

(51) Int. Cl.
*C12Q 1/6886* (2018.01)

(52) U.S. Cl.
CPC ...... *C12Q 1/6886* (2013.01); *C12Q 2600/118* (2013.01); *C12Q 2600/158* (2013.01)

(58) Field of Classification Search
None
See application file for complete search history.

(56) References Cited

U.S. PATENT DOCUMENTS

| | | | |
|---|---|---|---|
| 6,110,678 A | 8/2000 | Weisburg | |
| 8,778,621 B2 | 7/2014 | Hoffmann et al. | |
| 9,410,206 B2 | 8/2016 | Hoon et al. | |
| 9,605,319 B2 | 3/2017 | Stone et al. | |
| 9,846,158 B2 | 12/2017 | Mansfield et al. | |
| 9,976,188 B2 | 5/2018 | Stone et al. | |
| 10,191,056 B2 | 1/2019 | McNeel et al. | |
| 10,260,105 B2 | 4/2019 | Goel et al. | |
| 10,302,664 B2 | 5/2019 | Rolfs et al. | |
| 2004/0166494 A1 | 8/2004 | Green | |
| 2006/0110744 A1 | 5/2006 | Sampas | |
| 2011/0033854 A1 | 2/2011 | Drmanac | |
| 2011/0236903 A1 | 9/2011 | McClelland et al. | |
| 2013/0302242 A1 | 11/2013 | Stone | |
| 2013/0344495 A1 | 12/2013 | Sanders | |
| 2014/0162888 A1 | 6/2014 | Kuslich et al. | |
| 2016/0090638 A1 | 3/2016 | Tsai et al. | |
| 2016/0222461 A1* | 8/2016 | Wilson | G01N 33/57484 |
| 2016/0237505 A1 | 8/2016 | Nonn et al. | |
| 2016/0312287 A1* | 10/2016 | Cottrell | G01N 33/57434 |
| 2016/0312296 A1 | 10/2016 | Laghi et al. | |
| 2016/0333420 A1 | 11/2016 | Stern et al. | |
| 2017/0096712 A1 | 4/2017 | Stone et al. | |

FOREIGN PATENT DOCUMENTS

WO  WO-2002/30268 A2  4/2002

OTHER PUBLICATIONS

Siegel, Rebecca L. et al.; "Cancer Statistics, 2015"; CA: A Cancer Journal for Clinicians; vol. 65 No. 1; Jan./Feb. 2015; pp. 5-29.
Aizer, Ayal A. et al.; "Initial management of prostate-specific antigen-detected, low-risk prostate cancer and the risk of death from prostate cancer"; BJU International; 113; 2014; pp. 43-50.
Gery, Sigal et al.; "Repression of the TMEFF2 Promoter by c-Myc"; Journal of Molecular Biology; 328; 2003; pp. 977-983.
Han, Hongchao et al.; "Upregulation of TMEFF2 is involved in the antiproliferative effects of vitamin C and tyrphostin AG490 on GES-1 and AGS cells"; Oncology Letters; 17; 2019; pp. 652-659.
Herbst, Andreas et al.; "Methylated free-circulating HPP1 Dna is an early response marker in patients with metastic colorectal cancer"; International Journal of Cancer; 140; 2017; pp. 2134-2144.
Ivanauskas, A. et al.; "Distinct TPEF/HPP1 gene methylation patterns in gastric cancer indicate a field effect in gastric carcinogenesis"; Digestive and Liver Disease; 40; 2008; pp. 920-926.
Li, Kailiang et al.; "Expression of TMEFF2 in Human Pancreatic Cancer Tissue and the Effects of TMEFF2 Knockdown on Cell, Proliferation, and Apoptosis in Human Pancreatic Cell Lines"; Medical Science Monitor; 25; 2019; pp. 3238-3246.
Monteriro-Reis, Sara et al.; "Accurate detection of upper tract urothelial carcinoma in tissue and urine by means of quantitative GDF15, TMEFF2 and VIM promoter methylation"; European Journal of Cancer; 50; 2014; pp. 226-233.
Shaw, Richard J. et al; "Molecular Staging of Surgical Margins in Oral Squamous Cell Carcinoma Using Promoter Methylation of p16INK4A, Cytoglobin, E-cadherin, and TMEFF2"; Annals of Surgical Oncology; 20; 2013; pp. 2796-2802.
Sun, Tiantian et al.; "TMEFF2 Deregulation Contributes to Gastric Carcinogenesis and Indicates Poor Survival Outcome"; Clinical Cancer Research; vol. 20 No. 17; Sep. 1, 2014; pp. 4689-4704.
Sun, Tian-Tian et al.; "Bidirectional regulation between TMEFFS and STAT3 may contribute to *Helicobacter pylori*-associated gastric carcinogenesis"; International Journal of Cancer; 136; 2015; pp. 1053-1064.
Allera-Moreau et al.; "DNA replication stress response involving PLK1, CDC6, POLQ, RAD51 and CLASPIN upregulation prognoses the outcome of early/mid-stage non-small cell lung cancer patients"; Oncogenesis; 2012; 10 pages.

(Continued)

*Primary Examiner* — Carla J Myers
(74) *Attorney, Agent, or Firm* — WINSTEAD PC

(57) ABSTRACT

An assay system and method for generating quantitative data for a subject and a method for treating prostate cancer in a subject by determining an expression level of a biomarker panel in a sample obtained from the subject, the biomarker panel including the genes CDC45, CENPI, CLSPN, ERCC6L, EXO1, NCAPG, BUB1B, CDK1, NUSAP1, RAD51, and RRM2 and optionally E2F7 and/or GSG2, wherein the expression level is obtained by measuring expression of the biomarker panel in the sample, and wherein the subject has a cancer, or is suspected of having a cancer. The cancer may be, for example, prostate cancer, brain cancer, lung cancer, breast cancer, bladder cancer, or ovarian cancer.

6 Claims, 28 Drawing Sheets

(56) References Cited

OTHER PUBLICATIONS

Ruijter, Emiel Th et al.; "Histological Grade Heterogeneity In Multifocal Prostate Cancer. Biological And Clinical Implications"; Journal of Pathology; vol. 180; 1996; pp. 295-299.

Alshalalfa, Mohammed et al.; "Evolving transcriptomic fingerprint based on genome-wide data as prognostic tools in prostate cancer"; Biology of the Cell; vol. 107; 2015; pp. 232-244.

Assié, Guillaume et al.; "Value of Molecular Classification for Prognostic Assessment of Adrenocortical Carcinoma"; JAMA Oncology; Jul. 11, 2019; pages E1-E8.

Barbano, Raffaela et al; "High RAD51 mRNA expression characterize estrogen receptor-positive/progesteron receptor-negative breast cancer and is associated with patient's outcome"; International Journal of Cancer; 129; 2011; pp. 536-545.

Bie, Li et al; "The Accuracy of Survival Time Prediction for Patients with Glioma Is Improved by Measuring Mitotic Spindle Checkpoint Gene Expression"; PLoS One; vol. 6 Iss. 10; Oct. 2011; 10 pages.

Bishoff, Jay T. et al.; "Prognostic Utility of the Cell Cycle Progression Score Generated from Biopsy in Men Treated with Prostatectomy"; The Journal of Urology; vol. 192; Aug. 2014; pp. 409-414.

Boström, Peter J. et al.; "Genomic Predictors of Outcome in Prostate Cancer"; European Urology; 68; 2015; pp. 1033-1044.

Boukovinas, Ioannis et al.; "Tumor BRCA1, RRM1 and RRM5 mRNA Expression Levels and Clinical Response to First-Line Gemcitabine plus Docetaxel in Non-Small-Cell Lung Cancer Patients"; PLoS One; vol. 3 Iss. 11; Nov. 2008; 8 pages.

Castelblanco, Esmeralda et al.; "APLP2, RRMS, and PRC1: New Putative Markers for the Differential Diagnosis of Thyroid Follicular Lesions"; Thyroid; vol. 27 No. 1; Nov. 1, 2017; pp. 59-66.

Chang, Wai Hoong et al.; "Transcriptional landscape of DNA repair genes underpins a pan-cancer prognostic signature associated with cell cycle dysregulation and tumor hypoxia"; DNA Repair; 78; 2019; pp. 142-153.

Chen, Li et al; "High Levels of Nucleolar Spindle-Associated Protein and Reduced Levels of BRCA1 Expression Predict Poor Prognosis in Triple-Negative Breast Cancer"; PLOS One; Oct. 20, 2015; 14 pages.

Boutros, Paul C et al.; "Spatial genomic heterogeneity within localized, multifocal prostate cancer"; Nature Genetics; vol. 47 No. 7; Jul. 2015; pp. 736-745.

Chen, Jian et al.; "Novel key genes in triple-negative breast cancer identified by weighted gene co-expression network analysis"; Journal of Cellular Biochemistry; 120; 2019; pp. 16900-16912.

Chen, Juan et al.; "Identification of novel biomarkers and small molecule drugs in human colorectal cancer by microarray and bioinformatics analysis"; Molecular Genetics & Genomic Medicine; 2019; 15 pages.

Chen, Ru et al.; "Identification of modules and functional analysis in CRC subtypes by integrated bioinformatics analysis"; PLOS One, Aug. 30, 2019; 16 pages.

Chen, Wei-xian et al.; "Bioinformatics analysis revealing prognostic significance of RRM2 gene in breast cancer"; Bioscience Reports; 39; 2019; 9 pages.

Chen, Fang-Fang et al.; "Integrative genomics analysis of hub genes and their relationship with prognosis and signaling pathways in esophageal squamous cell carcinoma"; Molecular Medicine Reports; 20; 2019; pp. 3649-3660.

Chistiakov, Dimitry A. et al.; "New biomarkers for diagnosis and prognosis of localized prostate cancer"; Seminars in Cancer Biology; 52; 2018; pp. 9-16.

Chu, Junjun et al.; "E2F7 overexpression leads to tamoxifen resistance in breast cancer cells by competing with E2F1 at miR-15a/16 promoter"; Oncotarget; vol. 6 No. 31; 2015; pp. 31944-31957.

Cooperberg, Matthew R. et al.; "Validation of a Cell-Cycle Progression Gene Panel to Improve Risk Stratification in a Contemporary"; Journal of Clinical Oncology; vol. 31 No. 11; Apr. 10, 2013; pp. 1428-1434.

Cooperberg, Matthew R. et al.; "Combined Value of Validated Clinical and Genomic Risk Stratification Tools for Predicting Prostate Cancer Mortality in a High-risk Prostatectomy Cohort"; European Urology; 67; 2015; pp. 326-333.

Cullen, Jennifer et al.; "A Biopsy-based 17-gene Genomic Prostate Score Predicts Recurrence After Radical Prostatectomy and Adverse Surgical Pathology in a Racially Diverse Population of Men with Clinically Low- and Intermediate-risk Prostate Cancer"; European Urology; 68; 2015; pp. 123-131.

Cyll, Karolina et al.; "Tumour heterogeneity poses a significant challenge to cancer biomarker research"; British Journal of Cancer; 117; 2017; pp. 367-375.

Cuzick, J et al.; "Prognostic value of a cell cycle progression signature for prostate cancer death in a conservatively managed needle biopsy cohort"; British Journal of Cancer; 106(6); 2012; pp. 1095-1099.

Dancik, Garrett M. et al.; The Prognostic Value of Cell Cycle Gene Expression Signatures in Muscle Invasive High-Grade Bladder Cancer; Bladder Cancer; 1; 2015; pp. 45-63.

Deng, Leihong et al.; "Identification and characterization of biomarkers and their functions for docetazel-resistant prostate cancer cells"; Oncology Letters; 18; 2019; pp. 3236-3248.

Eure, Gregg et al.; "Use of a 17-Gene Prognostic Assay in Contemporary Urologic Practice: Results of an Interim Analysis in an Observational Cohort"; Genomics in Urologic Health and Disease; 107; 2017; pp. 67-75.

Fisher, Sarah B. et al.; "Excision Repair Cross-Complementing Gene-1, Ribonucleotide Reductase Subunit M1, Ribonucleotide Reductase Subunit M2, and Human Equilibrative Nucleoside Transporter-1 Expression and Prognostic Value in Biliary Tract Malignancy"; Cancer; Jan. 15, 2013; pp. 454-462.

Freedland, Stephen J. et al.; "Prognostic Utility of Cell Cycle Progression Score in Men With Prostate Cancer After Primary External Beam Radiation Therapy"; International Journal of Radiation Oncology Biology Physics; vol. 86 No. 5; 2013; pp. 848-853.

Fu, Xin et al.; "Overexpression of BUB1B contributes to progression of prostate cancer and predicts poor outcome in patients with prostate cancer"; OncoTargets and Therapy; 9; 2016; pp. 2211-2220.

Gachechiladze, Mariam et al.; "Prognostic and predictive value of loss of nuclear RAD51 immunoreactivity in resected non-small cell lung cancer patients"; Lung Cancer; 105; 2017; pp. 31-38.

Grolmusz, Vince Kornél et al.; "Cell cycle dependent RRM2 may serve as proliferation marker and pharmaceutical target in adrenocortical cancer"; American Journal of Cancer Research; 6(9); 2016 pp. 2041-2053.

Grossi, Francesco et al.; "Expression of Ribonucleotide Reductase Subunit-2 and Thymidylate Synthase Correlates with Poor Prognosis in Patients with Resected Stages I-III Non-Small Cell Lung Cancer"; Disease Markers; vol. 2015 Art. ID 302649; 18 pages.

Boutros, Paul C. et al.; "Clonality of localized and metastatic prostate cancer"; Current Opinion in Urology; vol. 26 No. 3; May 2016; pp. 219-224.

Guo, Ai Ye et al.; "Identification of a Low-Frequency Missense Variant in E2F Transcription Factor 7 Associated with Colorectal Cancer Risk In A Chinese Population"; Asian Pacific Journal of Cancer Prevention; vol. 18; 2017; pp. 271-275.

Haider, Syed et al.; "A multi-gene signature predicts outcome in patients with pancreatic ductal adenocarcinoma"; Genome Medicine; vol. 6 No. 105; 2014; 11 pages.

Han, Ping et al.; "Ribonucleotide reductase M2 subunit expression and prognostic value in nasopharyngeal carcinoma"; Molecular Medicine Reports; 12; 2015; pp. 401-409.

Han, Guangchun et al.; "Unique protein expression signatures of survival time in kidneynal clear cell carcinoma through a pan-cancer screening"; BMC Genomics; 18; 2017; pp. 80-93.

Hansel, Donna E. et al.; "CDC2/CDK1 Expression in Esophageal Adenocarcinoma and Precursor Lesions Serves as a Diagnostic and Cancer Progression Marker and Potential Novel Drug Target"; The American Journal of Surgical Pathology; vol. 29 No. 3; Mar. 2005; pp. 390-399.

He, Zhaohui et al.; "Analysis of differentially expressed genes, clinical value and biological pathways in prostate cancer"; The American Journal of Translational Research; 10(5); 2018; pp. 1444-1456.

(56) References Cited

OTHER PUBLICATIONS

He, Wenwu et al.; "Gene set enrichment analysis and meta-analysis to identify six key genes regulating and controlling the prognosis of esophageal squamous cell carcinoma"; Journal of Thoracic Disease; 10(10); 2018; pp. 5714-5726.

Hongo, Fumiya et al.; "CDK1 and CDK2 activity is a strong predictor of renal cell carcinoma recurrence"; Urologic Oncology; 32; 2014; pp. 1240-1246.

Huang, Yasheng et al.; "The prognostic value of ribonucleotide reductase small subunit M2 in predicting recurrence for prostate cancers"; Urologic Oncology; 32; 2014; pp. 51.e9-51.e19.

Ihara, Keisuke et al.; "Expression of DNA double-strand break repair proteins predicts the response and prognosis of colorectal cancer patients undergoing oxaliplatin-based chemotherapy"; Oncology Reports; 35; 2016; pp. 1349-1355.

Tosoian, Jeffrey J. et al.; "Molecular heterogeneity of localized prostate cancer: more different than alike"; Translational Cancer Research; 6; Feb. 2017; 5 pages.

Johnston, Wendy L. et al.; "Unbiased data mining identifies cell cycle transcripts that predict non-indolent Gleason score 7 prostate cancer"; BMC Urology; 19:4; 2019; 11 pages.

Kessous, Roy et al.; "Distinct homologous recombination gene expression profiles after neoadjuvant chemotherapy associated with clinical outcome in patients with ovarian cancer"; Gynecologic Oncology; 148; 2018; pp. 553-558.

Kobayashi, Go et al.; "Clinicopathological significance of claspin overexpression and its association with spheroid formation in gastric cancer"; Human Pathology; 84; 2019; pp. 8-17.

Kori, Medi et al.; "Potential biomarkers and therapeutic targets in cervical cancer: Insights from the meta-analysis of transcriptomics data within network biomedicine perspective"; PLOS One; Jul. 18, 2018; 27 pages.

Kretschmer, Céline et al.; "Identification of early molecular markers for breast cancer"; Molecular Cancer; 10:15; 2011; 11 pages.

Lee, Boin et al.; "High Expression of Ribonucleotide Reductase Subunit M2 Correlates with Poor Prognosis of Hepatocellular Carcinoma"; Gut and Liver; vol. 8 No. 6; Nov. 2014; pp. 662-668.

Leonardi, Simona et al.; "The relevance of prelamin A and RAD51 as molecular biomarkers in cervical cancer"; Oncotarget; vol. 8 No. 55; 2017; pp. 94247-94258.

Li, Yong et al.; "Elevated Expression of Rad51 is Correlated With Decreased Survival in Resectable Esophageal Squamous Cell Carcinoma"; Journal of Surgical Oncology; 104; 2011; pp. 617-622.

Li, Boxuan et al.; "Identifying novel biomarkers in hepatocellular carcinoma by weighted gene co-expression network analysis"; Journal of Cellular Biochemistry; 120; 2019; pp. 11418-11431.

Li, Yunhai et al.; "Expression patterns of E2F transcription factors and their potential prognostic roles in breast cancer"; Oncology Letters; 15; 2018; pp. 9216-9230.

Shoag, Jonathan et al.; "Clinical variability and molecular heterogeneity in prostate cancer"; Asian Journal of Andrology; 18; 2016; pp. 543-548.

Li, Shicheng et al.; "Identification of an eight-gene prognostic signature for lung adenocarcinoma"; Cancer Management and Research; 10; 2018; pp. 3383-3392.

Liao, Xiwen et al.; "Integrated analysis of competing endogenous RNA network revealing potential prognostic biomarkers of hepatocellular carcinoma"; Journal of Cancer; 10(14); 2019; pp. 3267-3283.

Liu, Xiyong et al.; "Ribonucleotide reductase small subunit M2 serves as a prognostic biomarker and predicts poor survival of colorectal cancers"; Clinical Science; 124; 2013; pp. 567-578.

Liu, Rong et al.; "Network-based approach to identify prognostic biomarkers for estrogen receptor-positive breast cancer treatment with tamoxifen"; Cancer Biology & Therapy; 16:2; Feb. 2015; pp. 317-324.

Liu, Wanwei et al.; "Overexpression of non-SMC condensin I complex subunit G serves as a promising prognostic marker and therapeutic target for hepatocellular carcinoma"; International Journal of Molecular Medicine; 40; 2017; pp. 731-738.

Liu, Ze-Long et al.; "Expressions and prognostic values of the E2F transcription factors in human breast carcinoma"; Cancer Management and Research; 10; 2018; pp. 3521-3532.

Liu, Zhaoxiu et al.; "High NUSAP1 expression predicts poor prognosis in colon cancer"; Pathology—Research and Practice; 214; 2018; pp. 968-973.

Liu, Wan-Ting et al.; "A novel strategy of integrated microarray analysis identifies CENPA, CDK1 and CDC20 as a cluster of diagnostic biomarkers in lung adenocarcinoma"; Cancer Letters; 425; 2018; pp. 43-53.

Luo, Fei et al.; "Exonuclease 1 expression is associated with clinical progression, metastasis, and survival prognosis of prostate cancer"; Journal of Cellular Biochemistry; 120; 2019; pp. 11383-11389.

Maddalena, Francesca et al.; "TRAP1 protein signature predicts outcome in human metastatic colorectal carcinoma"; Oncotarget; vol. 8 No. 13; 2017; pp. 21229-21240.

Cooper et al.; "Nature Genetics"; 47(4); Apr. 2015; 21 pages.

Mah, Vei et al.; "Ribonucleotide Reductase Subunit M2 Predicts Survival in Subgroups of Patients with Non-Small Cell Lung Carcinoma: Effects of Gender and Smoking Status"; PLOS One; May 22, 2015; 15 pages.

Manicum, Theasha et al.; "Prognostic values of E2F mRNA expression in human gastric cancer"; Bioscience Reports; 38; 2018; 14 pages.

Martin, Katherine J. et al.; "Prognostic Breast Cancer Signature Identified from 3D Culture Model Accurately Predicts Clinical Outcome across Independent Datasets"; PLoS One; vol. 3 Iss. 8; Aug. 2008; 9 pages.

Matakidou, Athena et al.; "Genetic variation in the DNA repair genes is predictive of outcome in lung cancer"; Human Molecular Genetics; vol. 16 No. 19; 2007; pp. 2333-2340.

Mullane, Stephanie A. et al.; "Expression Levels of DNA Damage Repair Proteins Are Associated With Overall Survival in Platinum-Treated Advanced Urothelial Carcinoma"; Clinical Genitourinary Cancer; Aug. 2016; pp. 352-359.

Nagathihalli, Nagaraj S. et al.; "RAD51 as a potential biomarker and therapeutic target for pancreatic cancer"; Biochimica et Biophysica Acta; 1816; 2011; pp. 209-218.

Nam, Seungyoon et al.; "A pathway-based approach for identifying biomarkers of tumor progression to trastuzumab-resistant breast cancer"; Cancer Letters; 356; 2015; pp. 880-890.

Pan, Shen et al.; "Identification of Biomarkers for Controlling Cancer Stem Cell Characteristics in Bladder Cancer by Network Analysis of Transcriptome Data Stemness Indices"; Frontiers in Oncology; vol. 9 Art. 613; Jul. 2019; 11 pages.

Pataer, Apar et al.; "Major pathologic response and RAD51 predict survival in lung cancer patients receiving neoadjuvant chemotherapy"; Cancer Medicine; 7(6); 2018; pp. 2405-2414.

Piao, Junjie et al.; "Target gene screening and evaluation of prognostic values in non-small cell lung cancers by bioinformatics analysis"; Gene; 647; 2018; pp. 306-311.

Gundem, Gunes et al.; "The Evolutionary History of Lethal Metastatic Prostate Cancer"; Nature; 520(7547); Apr. 16, 2015; 24 pages.

Pu, Shao-Yan et al.; "ERCC6L, a DNA helicase, is involved in cell proliferation and associated with survival and progress in breast and kidney cancers"; Oncotarget; vol. 8 No. 26; 2017; pp. 42116-42124.

Putluri, Nagireddy et al.; "Pathway-Centric Integrative Analysis Identifies RRM2 as a Prognostic Marker in Breast Cancer Associated with Poor Survival and Tamoxifen Resistance"; Neoplasia; vol. 16 No. 5; May 2014; pp. 390-402.

Qiao, G-B et al.; "High-level expression of Rad51 is an independent prognostic marker of survival in non-small-cell lung cancer patients"; British Journal of Cancer; 93; 2005; pp. 137-143.

Rajan, Prabhakar et al.; "Identification of a candidate prognostic gene signature by transcriptome analysis of matched pre- and post-treatment prostatic biopsies from patients with advanced prostate cancer"; BMC Cancer; 14:977; 2014; 10 pages.

Raman, Pichai et al.; "Pancreatic cancer survival analysis defines a signature that predicts outcome"; PLOS One; Aug. 9, 2018; 18 pages.

Ramos-Montoya, Antonio et al.; "HES6 drives a critical AR transcriptional programme to induce castration-resistant prostate cancer

(56) References Cited

OTHER PUBLICATIONS through activation of an E2F1-mediated cell cycle network"; EMBO Molecular Medicine; vol. 6 No. 5; 2014; pp. 651-661.
Reimer, Daniel et al.; "Clinical Relevance of E2F Family Members in Ovarian Cancer—An Evaluation in a Training Set of 77 Patients"; Clinical Cancer Research; 13(1); Jan. 1, 2007; pp. 144-151.
Frio, Thomas Rio et al.; "Homozygous BUB1B Mutation and Susceptibility to Gastrointestinal Neoplasia"; The New England Journal of Medicine; 363:27; Dec. 30, 2010; pp. 2628-2637.
Rubicz, Rohina et al.; "Expression of Cell Cycle-Regulated Genes and Prostate Cancer Prognosis in a Population-Based Cohort"; The Prostate; 75; 2015; pp. 1354-1362.
Schulten, Hans-Juergen et al.; "Comprehensive molecular biomarker identification in breast cancer brain metastases"; Journal of Translational Medicine; 15:269; 2017; 20 pages.
Guiu, S. et al.; "Molecular subclasses of breast cancer: how do we define them? The IMPAKT 2012 Working Group Statement"; Annals of Oncology; 23; 2012; pp. 2997-3006.
Shi, Yuan-Xiang et al.; "Prognostic and predictive values of CDK1 and MAD2L1 in lung adenocarcinoma"; Oncotarget; vol. 7 No. 51; 2016; pp. 85235-85243.
Söderlund, Karin et al.; "The BRCA1/BRCA2/Rad51 complex is a prognostic and predictive factor in early breast cancer"; Radiotherapy and Oncology; 84; 2007; pp. 242-251.
Song, Bin et al.; "Dysregulation of NCAPG, KNL1, miR-148a-3p, miR-193b-3p, and miR-1179 may contribute to the progression of gastric cancer"; Biological Research; 51:44; 2018; 12 pages.
Song, Ying-Jian et al.; "Integrated analysis reveals key genes with prognostic value in lung adenocarcinoma"; Cancer Management and Research; 10; 2018; pp. 6097-6108.
Souglakos, J. et al.; "Ribonucleotide reductase subunits M1 and M2 mRNA expression levels and clinical outcome of lung adenocarcinoma patients treated with docetaxel/gemcitabine"; British Journal of Cancer; 98(10); 2008; pp. 1710-1715.
Su, Ying-Fang et al.; "The Expression of Ribonucleotide Reductase M2 in the Carcinogenesis of Uterine Cervix and Its Relationship with Clinicopathological Characteristics and Prognosis of Cancer Patients"; PLOS One; vol. 9 Iss. 3; Mar. 2014; 8 pages.
Sun, Qian et al.; "Gene co-expression network reveals shared modules predictive of stage and grade in serious ovarian cancers"; Oncotarget; vol. 8 No. 26; 2017; pp. 42983-42996.
Tang, Hao et al.; "A 12-Gene Set Predicts Survival Benefits from Adjuvant Chemotherapy in Non-Small Cell Lung Cancer Patients"; Clinical Cancer Research; 19(6); Mar. 15, 2013; pp. 1577-1586.
Sung, Wen-Wei et al.; "High nuclear/cytoplasmic ratio of Cdk1 expression predicts poor prognosis in colorectal cancer patients"; BMC Cancer; 14:951; 2014; 7 pages.
Taylor, Karen J et al.; "Dynamic changes in gene expression in vivo predict prognosis of tamoxifen-treated patients with breast cancer"; Breast Cancer Research; 12:R39; 2010; 13 pages.
Shtivelman, Emma et al.; "Molecular pathways and targets in prostate cancer"; Oncotarget; vol. 5 No. 17; Aug. 2014; pp. 7217-7259.
Bertucci, Francois et al.; "Gene Expression Profiling and Clinical Outcome in Breast Cancer"; A Journal of Integrative Biology; vol. 10 No. 4; 2006; pp. 429-443.
Thangavelu, Pulari U. et al.; "Overexpression of the E2F target gene CENPI promotes chromosome instability and predicts poor prognosis in estrogen receptor-positive breast cancer"; Oncotarget; vol. 8 No. 37; 2017; pp. 62167-62182.
Tryfonidis, K et al.; "Association of BRCA1, ERCC1, RAP80, PKM2, RRM1, RRM2, TS, TSP1, and TXR1 mRNA expression levels between primary tumors and infiltrated regional lymph nodes in patients with resectable non-small cell lung cancer"; The Pharmacogenomics Journal; 19; 2019; pp. 15-24.
Uddin, Md. Nazim et al.; "Identification of Transcriptional Signatures of Colon Tumor Stroma by a Meta-Analysis"; Journal of Oncology; vol. 2019; 12 pages.

Wang, Xin et al.; "A network-pathway based module identification for predicting the prognosis of ovarian cancer patients"; Journal of Ovarian Research; 9:73; 2016; 8 pages.
Xiang, Xiao-Hong et al.; "Seven-senescence-associated gene signature predicts overall survival for Asian patients with hepatocellular carcinoma"; World Journal of Gastroenterology; vol. 25 Iss. 14; Apr. 14, 2019; pp. 1715-1728.
Xiao, He et al.; "Identification of Five Genes as a Potential Biomarker for Predict Progress and Prognosis in Adrenocortical Carcinoma"; Journal of Cancer; vol. 9; 2018; pp. 4484-4495.
Yan, Yongcong et al.; "Identification and validation of a prognostic four-genes signature for hepatocellular carcinoma: integrated ceRNA network analysis"; Hepatology International; 13; 2019; pp. 618-630.
Yan, Xin et al.; "Identification of Hub Genes Associated With Progression and Prognosis in Patients With Bladder Cancer"; Frontiers in Genetics; vol. 10 Art. 408; May 2019; 12 pages.
Yang, Hui et al.; "A four-gene signature for prognosis in breast cancer patients with hypermethylated IL15RA"; Oncology Letters; 17; 2019; pp. 4245-4254.
Yang, Wookyeom et al.; "Accumulation of cytoplasmic Cdk1 is associated with cancer growth and survival rate in epithelial ovarian cancer"; Oncotarget; vol. 17 No. 31; 2016; pp. 49481-49497.
Parker, Joel S. et al.; "Supervised Risk Predictor of Breast Cancer Based on Intrinsic Subtypes"; Journal of Clinical Oncology; vol. 27 No. 8; Mar. 10, 2009; pp. 1160-1167.
Yin, Xiaomao et al.; "Identification of biomarkers of chromophobe renal cell carcinoma by weighted gene co-expression network analysis"; Cancer Cell International; 18:206; 2018; 12 pages.
Zeestraten, ECM et al.; "Specific activity of cyclin-dependent kinase I is a new potential predictor of tumour recurrence in stage II colon cancer"; British Journal of Cancer 106; 2012; pp. 133-140.
Zhang, Chunyu et al.; "Loss of Cytoplasmic CDK1 Predicts Poor Survival in Human Lung Cancer and Confers Chemotherapeutic Resistance"; PLOS One; vol. 6 Iss. 8; Aug. 2011; 15 pages.
Zhang, Hang et al.; "Prognostic and therapeutic significance of ribonucleotide reductase small subunit M2 in estrogen-negative breast cancers"; BMC Cancer; 14:664; 2014; 16 pages.
Zhong, Xiaodan et al.; "Identification of Potential Prognostic Genes for Neuroblastoma"; Frontiers in Genetics; vol. 19 Art. 589; Nov. 2018; 10 pages.
Zhuang, Liping et al.; "Upregulation of BUB1B, CCNB1, CDC7, CDC20, and MCM3 in Tumor Tissues Predicted Worse Overall Survival and Disease-Free Survival in Hepatocellular Carcinoma Patients"; BioMed Research International; vol. 2018; 2018; 8 pages.
Stark, Rory; "Checking gene expression signatures against random and known signatures with SigCheck"; Dec. 9, 2015; 17 pages.
Moschini, Marco et al.; "Incorporation of tissue-based genomic biomarkers into localized prostate cancer clinics"; BMC Medicine; 14:67; 2016; 7 pages.
Cuzick, Jack et al.; "Prognostic value of an RNA expression signature derived from cell cycle proliferation genes in patients with prostate cancer: a retrospective study"; The Lancet Oncology; vol. 12; Mar. 2011; pp. 245-255.
Erho, Nicholas et al.; "Discovery and Validation of a Prostate Cancer Genomic Classifier that Predicts Early Metastasis Following Radical Prostatectomy"; PLOS One; vol. 8 Iss. 6; Jun. 2013; 12 pages.
Klein, Eric A. et al.; "A 17-gene Assay to Predict Prostate Cancer Aggressiveness in the Context of Gleason Grade Heterogeneity, Tumor Multifocality, and Biopsy Undersampling"; European Urology; 66; 2014; pp. 550-560.
Kaffenberger, Samuel D. et al.; "Molecular subtyping of prostate cancer"; Current Opinion in Urology; vol. 26 No. 3; May 2016; pp. 213-218.
Schoenborn, Jamie R. et al.; "Genomic Profiling Defines Subtypes of Prostate Cancer with the Potential for Therapeutic Stratification"; Clinical Cancer Research; 19(15); Aug. 1, 2013; pp. 4058-4066.
Demichelis, Francesca et al.; "Molecular Archeology: Unearthing Androgen Induced Structural Rearrangements in Prostate Cancer Genomes"; Cancer Cell .; 23(2); Feb. 11, 2013; 5 pages.

(56) References Cited

OTHER PUBLICATIONS

Lee, D et al.; "Molecular alterations in prostate cancer and association with MRI features"; Prostate Cancer and Prostatic Diseases; 2017; pp. 430-435.
Humphrey, Peter A.; "Gleason grading and prognostic factors in carcinoma of the prostate"; Modern Pathology; 17; 2004; pp. 292-306.
Schultz, Nikolaus et al.; "The molecular taxonomy of primary prostate cancer"; Cell.; 163(4); Nov. 5, 2015; 29 pages.
Gorlov, Ivan P. et al.; "How to get the most from microarray data: advice from reverse genomics"; BMC Genomics; 15; 2014; 10 pages.
Ross-Adams, H. et al.; "Integration of copy number and transcriptomics provides risk stratification in prostate cancer: A discovery and validation cohort study"; EBioMedicine; 2; 2015; pp. 1133-1144.
Chen, Xiaofei et al.; "The TMEFF2 tumor suppressor modulates integrin expression, RhoA activation and migration of prostate cancer cells"; Biochimica et Biophysica Acta; 1843; 2014; pp. 1216-1224.
Chen, Xiaofei et al.; "The Tumor Suppressor Activity of the Transmembrane Protein with Epidermal Growth Factor and Two Follistatin Motifs 2 (TMEFF2) Correlates with Its Ability to Modulate Sarcosine Levels"; The Journal of Biological Chemistry; vol. 286 No. 18; May 6, 2011; pp. 16091-16100.
Corbin, Joshua M. et al.; Analysis of TMEFF2 Allografts and Transgenic Mouse Models Reveals Roles in Prostate Regeneration and Cancer; The Prostate; 76; 2016; pp. 97-113.
Green, Thomas et al.; "TMEFF2 and SARDH Cooperate to Modulate One-Carbon Metabolism and Invasion of Prostate Cancer Cells"; The Prostate; 73; 2013; pp. 1561-1575.
Afar, Daniel E.H. et al.; "Preclinical validation of anti-TMEFF2-auristatin E-conjugated antibodies in the treatment of prostate cancer"; Molecular Cancer Therapeutics; 3(8); Aug. 2004; pp. 921-932.
Glynne-Jones, Eveline et al.; "TENB2, a Proteoglycan Identified in Prostate Cancer That is Associated With Disease Progression and Androgen Independence"; International Journal of Cancer; 94; 2001; pp. 178-184.
Lin, Kui et al.; TMEFF2 Is a PDGF-AA Binding Protein with Methylation-Associated Gene Silencing in Multiple Cancer Types Including Glioma; PLOS One; vol. 6 Iss. 4; Apr. 2011; 14 pages.
Joniau, Steven et al.; "Stratification of High-risk Prostate Cancer into Prognostic Categories: A European Multi-institutional Study"; European Urology; 67; 2015; pp. 157-164.
Taylor, Barry S.et al.; "Integrative Genomic Profiling of Human Prostate Cancer"; Cancer Cell; 18; Jul. 13, 2010; pp. 11-22.
Rhodes, Daniel R. et al.; "Oncomine: A Cancer Microarray Database and Integrated Data-Mining Platform"; Neoplasia; vol. 6 No. 1; Jan./Feb. 2004; 6 pages.
Grasso, Catherine S. et al.; "The mutational landscape of lethal castration-resistant prostate cancer"; Nature; vol. 487; Jul. 12, 2012; pp. 239-243.
Szklarczyk, Damian et al.; "The STRING database in 2017: quality-controlled protein-protein association networks, made broadly accessible"; Nucleic Acids Research; vol. 45; 2017; pp. D362-D368.
Aguirre-Gamboa, Raul et al.; "SurvExpress: An Online Biomarker Validation Tool and Database for Cancer Gene Expression Data Using Survival Analysis"; PLOS One; vol. 8 Iss. 9; Sep. 2013; 9 pages.
Stark, Rory et al.; "SigCheck: Check a gene signature's prognostic performance against random signatures, known signatures, and permuted data/metadata"; Bioconductor; Oct. 10, 2019; 4 pages.
Venet, David et al.; "Most Random Gene Expression Signatures Are Significantly Associated with Breast Cancer Outcome"; PLOS Computational Biology; vol. 7 Iss. 10; Oct. 2011; 8 pages.
Roehl, Kimberly A. et al.; "Cancer Progression And Survival Rates Following Anatomical Radical Retropubic Prostatectomy In 3,478 Consecutive Patients: Long-Term Results"; The Journal of Urology; vol. 172; Sep. 2004; pp. 910-914.
Freedland, Stephen J. et al.; "Risk of Prostate Cancer-Specific Mortality Following Biochemical Recurrence After Radical Prostatectomy"; The Journal of the American Medical Association; vol. 294 No. 4; Jul. 27, 2005; pp. 433-439.
Antonarakis, Emmanuel S. et al.; "The natural history of metastatic progression in men with prostate-specific antigen recurrence after radical prostatectomy: long-term follow-up"; BJU International; 109; 2011; pp. 32-39.
Draisma, Gerrit et al.; "Lead Time and Overdiagnosis in Prostate-Specific Antigen Screening: Importance of Methods and Context"; Journal of the National Cancer Institute; vol. 101 Iss. 6; Mar. 18, 2009; pp. 374-383.
Paller, Channing J. et al.; "Management of Biochemically Recurrent Prostate Cancer After Local Therapy: Evolving Standards of Care and New Directions"; Clinical Advances in Hematology and Oncology; 11(1); Jan. 2013; 15 pages.
Amling, Christopher L. et al.; "Long-Term Hazard of Progression After Radical Prostatectomy for Clinically Localized Prostate Cancer Continued Risk of Biochemical Failure After 5 Years"; The Journal of Urology; vol. 164; Jul. 2000; pp. 101-105.
Han, Misop et al.; "Long-Term Biochemical Disease-Free and Cancer-Specific Survival Following Anatomic Radical Retropubic Prostactomy"; Urologic Clinics of North America; vol. 28 No. 3; Aug. 2001; pp. 555-565.
Hull, Gerald W. et al.; "Cancer Control With Radical Prostatectomy Alone in 1,000 Consecutive Patients"; The Journal of Urology; vol. 167; Feb. 2002; pp. 528-534.
Psutka, Sarah P. et al.; "Men With Organ-confined Prostate Cancer and Positive Surgical Margins Develop Biocheml Failure at a Similar Rate to Men With Extracapsular Extension"; Journal of Urology; 78(1); 2011; pp. 121-125.
Loeb, Stacy et al.; "Overdiagnosis and Overtreatment of Prostate Cancer"; European Urology; 65(6); Jun. 2014; 21 pages.
Klotz, Laurence; "Prostate cancer overdiagnosis and overtreatment"; Current Opinion in Endocrinology, Diabetes and Obesity; vol. 20 No. 3; Jun. 2013; pp. 204-209.
Armenia, Joshua et al.; "The long tail of oncogenic drivers in prostate cancer"; Nature Genetics; 50(5); May 2018; 17 pages.
Gery, Sigal et al.; "TMEFF2 is an adrogen-regulated gene exhibiting antiproliferative effects in prostate cancer cells"; Oncogene; 21; 2002; pp. 4739-4746.
Hong, Sung Kyu et al.; "Insignificant disease among men with intermediate-risk prostate cancer"; World Journal of Urology; 32(6); Dec. 2014; 10 pages.
Overcash, Ryan F. et al.; "Androgen Signaling Promotes Translation of TMEFF2 in Prostate Cancer Cells via Phosphorylation of the α Subunit of the Translation Initiation Factor 2"; PLOS One; vol. 8 Iss. 2; Feb. 2013; 13 pages.
Kim, Jung H. et al.; "Deep sequencing reveals distinct patterns of DNA methylation in prostate cancer"; Genome Research; 21; 2011; pp. 1028-1041.
Fournier, Pierrick GJ et al.; "The TGFβ Signaling Regulator PMEPA1 Suppresses Prostate Cancer Metastases to Bone"; Cancer Cell.; 27(6); Jun. 8, 2015; 29 pages.
Xu, Youyuan et al.; "Androgens Induce Prostate Cancer Cell Proliferation through Mammalian Target of Rapamycin Activation and Post-transcriptional Increases in Cyclin D Proteins"; Cancer Research; 66(15); Aug. 1, 2006; pp. 7783-7792.
McNair, C et al.; "Cell cycle-coupled expansion of AR activity promotes cancer progression"; Oncogene; 36; 2017; pp. 1655-1668.
Balk, Steven P. et al.; "AR, the cell cycle, and prostate cancer"; Journal of the Nuclear Receptor Signaling Atlas; vol. 6; 2008; 12 pages.
Sivanandam, Arun et al.; "Role of Androgen Receptor in Prostate Cancer Cell Cycle Regulation: Interaction with Cell Cycle Regulatory Proteins and Enzymes of DNA Synthesis"; Current Protein and Peptide Science; vol. 11 No. 6; 2010; pp. 451-458.
Koryakina, Yulia et al.; "Cell Cycle Dependent Regulation of Androgen Receptor Function"; Endocrine-Related Cancer; 22(2); Apr. 2015; 25 pages.

(56) References Cited

OTHER PUBLICATIONS

Paju, Annukka et al.; "Increased Expression of Tumor-Associated Trypsin Inhibitor, TATI, in Prostate Cancer and in Androgen-Independent 22Rv1 Cells"; European Urology; 52; 2007; pp. 1670-1681.
Stenman, Ulf-Håkan; SPINK1: A New Therapeutic Target in Cancer?; Clinical Chemistry; 57:11; 2011; pp. 1474-1475.
Tomlins, Scott A. et al.; "The Role of SPINK1 in ETS Rearrangement Negative Prostate Cancers"; Cancer Cell.; 13(6); Jun. 2008; 22 pages.
Flavin, Richard et al.; "SPINK1 Protein Expression and Prostate Cancer Progression"; Clinical Cancer Research; 20(18); Sep. 15, 2014; pp. 4904-4911.
Ateeq, Bushra et al.; "Therapeutic targeting of SPINK1-positive prostate cancer"; Science Translational Medicine; 3(72); Mar. 2, 2011; 18 pages.
Bolger, Anthony M. et al.; "Trimmomatic: a flexible trimmer for Illumina sequence data"; Bioinformatics; vol. 30 No. 15; 2014; pp. 2114-2120.
Bray, Nicolas L. et al.; "Near-optimal RNA-Seq quantification"; Nat Biotechnol; 34:525-7; 2016; 21 pages.
Soneson, Charlotte et al.; "Differential analyses for RNA-seq: transcript-level estimates improve gene-level inferences"; F1000Research; 4:1521; 2016; 19 pages.
Love, Michael I et al.; "Moderated estimation of fold change and dispersion for RNA-seq data with DESeq2"; Genome Biology; 15:550; 2014; 21 pages.
Varambally, Sooryanarayana et al.; "Integrative genomic and proteomic analysis of prostate cancer reveals signatures of metastatic progression"; Cancer Cell; vol. 8; Nov. 2005; pp. 393-406.
Vanaja, Donkena Krishna et al.; "Transcriptional Silencing of Zinc Finger Protein 185 Identified by Expression Profiling Is Associated with Prostate Cancer Progression"; American Association for Cancer Research; 63; Jul. 15, 2003; pp. 3877-3882.
Cerami, Ethan et al.; "The cBio Cancer Genomics Portal: An Open Platform for Exploring Multidimensional Cancer Genomics Data"; Cancer Discovery; 2(5); May 2012; 7 pages.
Shao, Yu-Hsuan et al.; "Contemporary Risk Profile of Prostate Cancer in the United States"; Journal of the National Cancer Institute; vol. 101 Iss. 18; Sep. 16, 2009; pp. 1280-1283.
Alves de Inda, Marcia et al.; "Validation of Cyclic Adenosine Monophosphate Phosphodiesterase-4D7 for its Independent Contribution to Risk Stratification in a Prostate Cancer Patient Cohort with Longitudinal Biological Outcomes"; European Urology Focus; 4; 2018; pp. 376-384.
Georgescu, Constantin et al.; "A TMEFF2-regulated cell cycle derived gene signature is prognostic of recurrence risk in prostate cancer"; BMC Cancer; 19:423; 2019; 13 pages.
Altschul, Stephen F. et al.; "Basic Local Alignment Search Tool"; Journal of Molecular Biology; 215; 1990; pp. 403-410.
Gish, Warren et al.; "Identification of protein coding regions by database similarity search"; Nature Genetics; vol. 3; Mar. 1993; pp. 266-272.
Karlin, Samuel et al.; "Methods for assessing the statistical significance of molecular sequence features by using general scoring schemes"; Proceedings of the National Academy of Sciences of the USA; vol. 87; Mar. 1990; pp. 2264-2268.
Karlin, Samuel et al.; "Applications and statistics for multiple high-scoring segments in molecular sequences"; Proceedings of the National Academy of Sciences of the USA; vol. 90; Jun. 1993; pp. 5873-5877.
Myers, Eugene W. et al.; Optimal alignments in linear space; CABIOS; vol. 4 No. 1; 1988; pp. 11-17.
Pearson, William R. et al.; "Improved tools for biological sequence comparison"; Proceedings of the National Academy of Sciences of the USA; vol. 85; Apr. 1988; pp. 2444-2448.
Ali, Nazim et al.; "Phorbol Ester-induced Shedding of the Prostate Cancer Marker Transmembrane Protein with Epidermal Growth Factor and Two Follistatin Motifs 2 Is Mediated by the Disintegrin and Metalloproteinase-17"; The Journal of Biological Chemistry; vol. 282 No. 52; Dec. 28, 2007; pp. 37378-37388.
Antunes, Alberto A. et al.; "The Role of Prostate Specific Membrane Antigen and Pepsinogen C Tissue Expression as an Adjunctive Method to Prostate Cancer Diagnosis"; The Journal of Urology; vol. 181; Feb. 2009; pp. 594-600.
Schröder, Fritz H. et al.; "Prostate-Cancer Mortality at 11 Years of Follow-up"; The New England Journal of Medicine; vol. 366 No. 11; Mar. 15, 2012; pp. 981-990.
Chen, Qian et al.; "Gene expression in the LNCaP human prostate cancer progression model: Progression associated expression in vitro corresponds to expression changes associated with prostate cancer progression in vivo"; Cancer Letters; 244; 2006; pp. 274-288.
Chen, Xiaofei et al.; "TMEFF2 modulates the AKT and ERK signaling pathways"; International Journal of Biochemistry and Molecular Biology; 4(2); 2013; pp. 83-94.
Chen, Ying-Chieh et al.; "Quantitative DNA methylation analysis of selected genes in endometrial carcinogenesis"; Taiwanese Journal of Obstetrics & Gynecology; 54; 2015; pp. 572-579.
Chen, Tian Rui et al.; "Generation and characterization of Tmeff2 mutant mice"; Biochemical and Biophysical Research Communications; 425; 2012; pp. 189-194.
Chen, Hua-Yun et al.; "High CpG island methylator phenotype is associated with lymph node metastasis and prognosis in gastric cancer"; Cancer Science; vol. 103 No. 1; Jan. 2012; pp. 73-79.
Clarke, Megan A. et al.; "Discovery and validation of candidate host DNA methylation markers for detection of cervical pecancer and cancer"; International Journal of Cancer; 141; 2017; pp. 701-710.
Costa, Vera L. et al.; Three Epigenetic Biomarkers, GDF15, TMEFF2, and VIM, Accurately Predict Bladder Cancer from DNA-Based Analyses of Urine Samples; Clinical Cancer Research; 16(23); Dec. 1, 2010; pp. 5842-5851.
Ebert, Matthias P.A. et al.; "Hypermethylation of the TPEF/HPP1 Gene in Primary and Metastatic Colorectal Cancers"; Neoplasia; vol. 7 No. 8; Aug. 2005; pp. 771-778.
Elahi, Abul et al.; "HPP1-mediated tumor suppression requires activation of STAT1 pathways"; International Journal of Cancer; 122; 2008; pp. 1567-1572.
Gawel-Beben, Katarzyna et al.; TMEFF2 shedding is regulated by oxidative stress and mediated by ADAMs and transmembrane serine proteases implicated in prostate cancer; Cell Biology International; 42; 2018; pp. 273-280.
Saha, Partha et al.; "The Human Homolog of *Saccharomyces cerevisiae* CDC45*"; The Journal of Biological Chemistry; vol. 273 No. 29; Jul. 17, 1998; pp. 18205-18209.
Agilent. Agilent Whole Human Genome Microarray 4 x 44K. 2015. Available via URL: <ftp.ebi.ac.uk/biostudies/nfs/A-MEXP-/125/A-MEXP-1125/Files/A-MEXP-1125.adf.txt> (Year: 2015).
NCBI Gene Expression Omnibus (GEO). Platform GPL29829, Mar. 9, 2021, 194 pages (Year: 2021).
Georgescu et al. bioRxiv preprint. Aug. 21, 2018. 32 pages, available via URL: <biorxiv.org/content/10.1101/397331v1 .full.pdf>) (Year: 2018).
Corbin et al. AACR Annual Meeting 2019. "A tumor suppressor-regulated cell cycle derived gene signature is prognostic of recurrence risk in prostate cancer" 3152/5, Session PO.CL 11.09, Apr. 2, 2019 (Year: 2019).

* cited by examiner

GENE SIGNATURES FOR CANCER CHARACTERIZATION AND TREATMENT

CROSS-REFERENCE TO RELATED APPLICATIONS

The present patent application is a continuation of U.S. Ser. No. 17/255,375, filed Dec. 22, 2020, which is a U.S. National stage application of PCT application No. PCT/US2019/040684, filed Jul. 5, 2019, which claims priority to U.S. Provisional patent application Ser. No. 62/694,323 filed on Jul. 5, 2018, each of which applications is incorporated by reference herein in its entirety.

BACKGROUND

Cancer of the prostate (PCa) is the most common form of cancer diagnosed in the United States (one in six men, lifetime risk) and the second leading cause of cancer death among men (one in 33 men, lifetime risk). The clinical behavior of PCa is variable, and while the majority of PCa cases remain indolent, 10% of the patients progress with aggressive metastatic disease and subsequent emergence of therapy-resistant PCa. Under current practice, clinical variables including Gleason score, tumor stage, and PSA levels are used at the time of diagnosis to help predict disease outcome. However, these prognostic factors have limitations, resulting in significant rates of overtreatment, with associated comorbidities, and undertreatment, leading to disease progression and increased risk of PCa-specific mortality.

The clinical heterogeneity of PCa reflects, in part, a remarkable genomic heterogeneity that is apparent even across different tumor foci within a single prostate. This suggests that disease stratification based on molecular features may be of prognostic value beyond standard clinicopathological variables, and aid in the clinical management of the disease, as it is the case for other cancers, i.e. breast. Currently, several tissue-based molecular tests offer prognostic information for patients with PCa either before or after treatment. These are based on general features of malignancy, e.g., the Prolaris® test, which incorporates information from 31 cell-cycle related genes, or on molecular features more specific for PCa (Decipher®, Oncotype DX®, ProMark®, and ConfirmMDx® tests). In addition, recent work has outlined the existence of several molecular subtypes of PCa. Notably, in one of these studies, the molecular subtypes were defined by specific driver mutations or gene fusions that are essentially mutually exclusive and that were able to categorize up to 74% of the analyzed tumors. If shown to correlate with clinical behavior, these molecular subtypes could prove useful in the management and treatment of the disease. However, currently their prognostic value is not fully established, and a significant fraction of primary prostate cancers in the study could not be categorized within these molecular subsets suggesting the existence of additional relevant molecular alterations.

It would be desirable to identify other biomarkers for assessing cancer risk, risk of recurrence after treatment, and/or predicted response to a therapy, for prostate cancer as well as other cancers. It is to this goal that the present disclosure is directed.

BRIEF DESCRIPTION OF THE DRAWINGS

Several embodiments of the present disclosure are hereby illustrated in the appended drawings. It is to be noted however, that the appended drawings only illustrate several embodiments and are therefore not intended to be considered limiting of the scope of the present disclosure.

DETAILED DESCRIPTION

Figure 1:
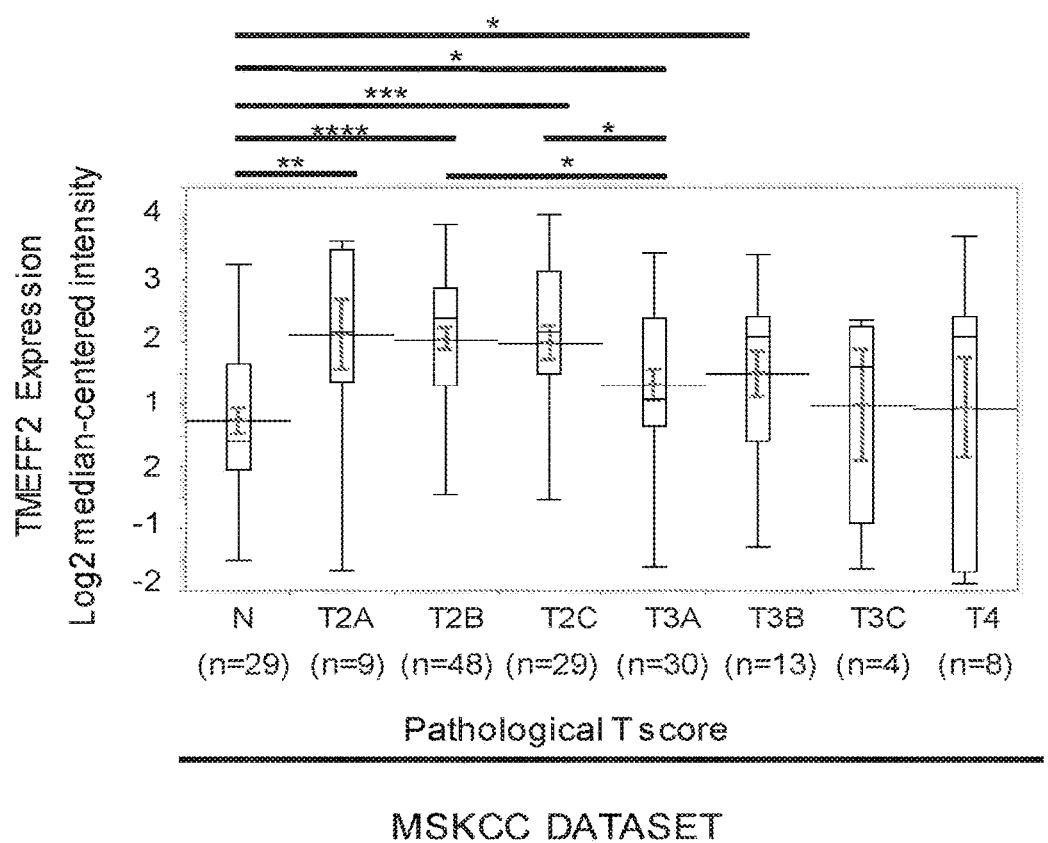
FIG. 1 shows gene expression data from the MSKCC dataset (obtained from Oncomine), comparing type 1 transmembrane protein with epidermal growth factor and two follistatin motifs 2 (TMEFF2) mRNA expression in samples from patients with tumors of different pathological T score. While TMEFF2 expression increases in samples from low pathological T score, it decreases with advanced disease (high pathological T score). Expression levels are presented as boxplots and statistical analysis was done using a Wilcoxon multiple comparison test. *$P<0.05$; $P<0.01$; *$P<0.001$; ****$P<0.0001$.

Disclosed herein is a set of gene signatures based on sets of TMEFF2 modulated cell cycle (TMCC) genes which can be used as biomarker panels in methods, assay systems, and kits for characterizing cancers in individuals. The biomarker panel may comprise, for example, one or more genes selected from the group CDC45, CENPI, CLSPN, ERCC6L, EXO1, NCAPG, BUB1B, CDK1, E2F7, GSG2, NUSAP1, RAD51, and RRM2. In one embodiment, the biomarker panel TMCC3a includes the three genes CDC45, CLSPN, and NCAPG, for example. In one embodiment, the biomarker panel TMCC11 includes the eleven genes CDC45, CENPI, CLSPN, ERCC6L, EXO1, NCAPG, BUB1B, CDK1, NUSAP1, RAD51, and RRM2. Cancers that can be prognosticated using the biomarker panels, assay systems, kits, and methods disclosed herein include, but are not limited to, prostate, brain, lung, bladder, ovarian, and breast cancers, for example.

The clinical progression to aggressive prostate cancer (PCa) and ultimately to castration-resistant prostate cancer (CRPC) is the cause of death for most patients dying from this disease. In patients undergoing radical prostatectomy (RP), risk stratification guides the use of adjuvant therapy and follow-up. However, current clinico-pathological variables provide limited prognostic information and, while not all the patients presenting with high grade tumors relapse after RP, some that do not present with adverse characteristics do. Therefore, adjuvant therapy subjects many patients to unnecessary treatment and the potential for side effects. Improvements to the prediction of the risk of recurrence after curative treatment are therefore necessary for disease management. In certain embodiments, the present disclosure is directed to methods for determining expression of a biomarker gene panel in a sample of prostate gland tissue for diagnosing prostate cancer in an individual suspected to have prostate cancer (for example due to diagnosis of an enlarged prostate gland or other symptoms), or for aiding in determining a course of treatment following a surgical procedure in a patient. For example, in individuals who have already been treated for prostate cancer, e.g., by radical prostatectomy, the presently disclosed assay system and methods may be used to predict the likelihood that the patient will respond (and the extent of the response) to a specific treatment (e.g., the cancer is unlikely to recur), or will not respond to the treatment (i.e., will be resistant to the specific treatment or will respond negatively), wherein the cancer is likely to recur. In such a case the results of the biomarker panel can be used by an attending physician to adjust the treatment modality of the patient by either maintaining the current treatment, ending the current treatment, or replacing the treatment with an alternate treatment. The method may include obtaining the sample of prostate gland tissue directly from the patient, or from prostate gland tissue obtained from the subject, or from circulating cells or portions of cells, measuring the expression of a predetermined panel of genes (the biomarker panel), calculating a test value based on the expression of the panel of genes, and comparing the test value to a threshold index value, and administering to the subject active surveillance when the test value is less than the threshold index value, or administering to the subject an active treatment (e.g., one or more of hormonal therapy, chemotherapy, immunotherapy, radiation therapy, or surgery) when the test value is equal to or greater than the threshold index value.

Before further describing various embodiments of the apparatus, kits, arrays, panels, compounds, compositions, and methods of the present disclosure in more detail by way of exemplary description, examples, and results, it is to be understood that the apparatus, kits, arrays, panels, compounds, compositions, and methods of present disclosure are not limited in application to the details of specific embodiments and examples as set forth in the following description. The description provided herein is intended for purposes of illustration only and is not intended to be construed in a limiting sense. As such, the language used herein is intended to be given the broadest possible scope and meaning; and the embodiments and examples are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the present disclosure. However, it will be apparent to a person having ordinary skill in the art that the present disclosure may be practiced without these specific details. In other instances, features which are well known to persons of ordinary skill in the art have not been described in detail to avoid unnecessary complication of the description. It is intended that all alternatives, substitutions, modifications and equivalents apparent to those having ordinary skill in the art are included within the scope of the present disclosure. While the apparatus, kits, arrays, panels, compounds, compositions, and methods of the present disclosure have been described in terms of particular embodiments, it will be apparent to those of skill in the art that variations may be applied to the apparatus, kits, arrays, panels, compounds, compositions, and methods and in the steps or in the sequence of steps of the methods described herein without departing from the concept, spirit, and scope of the inventive concepts.

All patents, published patent applications, and non-patent publications mentioned in the specification or referenced in any portion of this application, in particular U.S. Provisional Application Ser. No. 62/694,323, are herein expressly incorporated by reference in their entirety to the same extent as if each individual patent or publication was specifically and individually indicated to be incorporated by reference.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular. Where used herein, the specific term "single" is limited to only "one".

As utilized in accordance with the methods, compounds, and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one," The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached: in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example. Reference to an integer with more (greater) or less than includes any number greater or less than the reference number, respectively. Thus, for example, reference to less than 100 includes 99, 98, 97, etc. all the way down to the number one (1); and less than 10 includes 9, 8, 7, etc. all the way down to the number one (1).

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" is used to indicate that a value includes the inherent variation of error in the disclosed embodiments, or the variation that exists among the study subjects. As used herein the qualifiers "about" or "approximately" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The term "about" or "approximately", where used herein when referring to a measurable value such as an amount, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art. As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

As used herein any reference to "one embodiment" or "an embodiment" means that a particular element, feature, structure, or characteristic described in connection with the embodiment is included in at least one embodiment and may be included in other embodiments. The appearances of the phrase "in one embodiment" in various places in the specification are not necessarily all referring to the same embodiment and are not necessarily limited to a single or particular embodiment.

The term "pharmaceutically acceptable" refers to compounds and compositions which are suitable for administration to humans and/or animals without undue adverse side effects such as toxicity, irritation and/or allergic response commensurate with a reasonable benefit/risk ratio. The compounds or conjugates of the present disclosure may be combined with one or more pharmaceutically-acceptable excipients, including carriers, vehicles, and diluents which may improve solubility, deliverability, dispersion, stability, and/or conformational integrity of the compounds or conjugates thereof.

By "biologically active" is meant the ability to modify the physiological system of an organism without reference to how the active agent has its physiological effects.

As used herein, "pure," or "substantially pure" means an object species is the predominant species present (i.e., on a molar basis it is more abundant than any other object species in the composition thereof), and particularly a substantially purified fraction is a composition wherein the object species comprises at least about 50 percent (on a molar basis) of all macromolecular species present. Generally, a substantially pure composition will comprise more than about 80% of all macromolecular species present in the composition, more particularly more than about 85%, more than about 90%, more than about 95%, or more than about 99%. The term "pure" or "substantially pure" also refers to preparations where the object species is at least 60% (w/w) pure, or at least 70% (w/w) pure, or at least 75% (w/w) pure, or at least 80% (w/w) pure, or at least 85% (w/w) pure, or at least 90% (w/w) pure, or at least 92% (w/w) pure, or at least 95% (w/w) pure, or at least 96% (w/w) pure, or at least 97% (w/w) pure, or at least 98% (w/w) pure, or at least 99% (w/w) pure, or 100% (w/w) pure.

Non-limiting examples of animals within the scope and meaning of the term "mammal" include dogs, cats, rats, mice, guinea pigs, chinchillas, horses, goats, cattle, sheep, zoo animals, Old and New World monkeys, non-human primates, and humans.

"Treatment" refers to therapeutic treatments. "Prevention" refers to prophylactic or preventative treatment measures or reducing the onset of a condition or disease. The term "treating" refers to administering a composition to a subject for therapeutic purposes and/or for prevention, or to a procedure conducted on or to the subject, e.g., a surgical procedure.

The terms "therapeutic composition" and "pharmaceutical composition" refer to an active agent-containing composition that may be administered to a subject by any method known in the art or otherwise contemplated herein, wherein administration of the composition brings about a therapeutic effect as described elsewhere herein. In addition, the compositions of the present disclosure may be designed to provide delayed, controlled, extended, and/or sustained release using formulation techniques which are well known in the art.

The term "effective amount" refers to an amount of an active agent which is sufficient to exhibit a detectable therapeutic or treatment effect in a subject without excessive adverse side effects (such as substantial toxicity, irritation and allergic response) commensurate with a reasonable benefit/risk ratio when used in the manner of the present disclosure. The effective amount for a subject will depend upon the subject's type, size and health, the nature and severity of the condition to be treated, the method of administration, the duration of treatment, the nature of concurrent therapy (if any), the specific formulations employed, and the like. Thus, it is not possible to specify an exact effective amount in advance. However, the effective amount for a given situation can be determined by one of ordinary skill in the art using routine experimentation based on the information provided herein.

The term "ameliorate" means a detectable or measurable improvement in a subject's condition, disease or symptom thereof. A detectable or measurable improvement includes a subjective or objective decrease, reduction, inhibition, suppression, limit or control in the occurrence, frequency, severity, progression, or duration of the condition or disease, or an improvement in a symptom or an underlying cause or a consequence of the disease, or a reversal of the disease. A successful treatment outcome can lead to a "therapeutic effect," or "benefit" of ameliorating, decreasing, reducing, inhibiting, suppressing, limiting, controlling or preventing the occurrence, frequency, severity, progression, or duration of a disease or condition, or consequences of the disease or condition in a subject.

A decrease or reduction in worsening, such as stabilizing the condition or disease, is also a successful treatment outcome. A therapeutic benefit therefore need not be complete ablation or reversal of the disease or condition, or any one, most or all adverse symptoms, complications, consequences or underlying causes associated with the disease or condition. Thus, a satisfactory endpoint may be achieved when there is an incremental improvement such as a partial decrease, reduction, inhibition, suppression, limit, control or prevention in the occurrence, frequency, severity, progression, or duration, or inhibition or reversal of the condition or disease (e.g., stabilizing), over a short or long duration of time (hours, days, weeks, months, etc.). Effectiveness of a method or use, such as a treatment that provides a potential therapeutic benefit or improvement of a condition or disease, can be ascertained by various methods and testing assays.

The term "homologous" or "% identity" as used herein means a nucleic acid (or fragment thereof) or a protein (or a fragment thereof) having a degree of homology to the corresponding natural reference nucleic acid or protein that may be in excess of 70%, or in excess of 80%, or in excess of 85%, or in excess of 90%, or in excess of 91%, or in excess of 92%, or in excess of 93%, or in excess of 94%, or in excess of 95%, or in excess of 96%, or in excess of 97%, or in excess of 98%, or in excess of 99%. For example, in regard to peptides or polypeptides, the percentage of homology or identity as described herein is typically calculated as the percentage of amino acid residues found in the smaller of the two sequences which align with identical amino acid residues in the sequence being compared, when four gaps in a length of 100 amino acids may be introduced to assist in that alignment (as set forth by Dayhoff, in Atlas of Protein Sequence and Structure, Vol. 5, p. 124, National Biochemical Research Foundation, Washington, D.C. (1972)). In one embodiment, the percentage homology as described above is calculated as the percentage of the components found in the smaller of the two sequences that may also be found in the larger of the two sequences (with the introduction of gaps), with a component being defined as a sequence of four, contiguous amino acids. Also included as substantially homologous is any protein product which may be isolated by virtue of cross-reactivity with antibodies to the native protein product. Sequence identity or homology can be determined by comparing the sequences when aligned so as to maximize overlap and identity while minimizing sequence gaps. In particular, sequence identity may be determined using any of a number of mathematical algorithms. A non-limiting example of a mathematical algorithm used for comparison of two sequences is the algorithm of Karlin & Altschul, Proc. Natl. Acad. Sci. USA 1990, 87, 2264-2268, modified as in Karlin & Altschul, Proc. Natl. Acad. Sci. USA 1993, 90, 5873-5877.

In one embodiment "% identity" represents the number of amino acids or nucleotides which are identical at corresponding positions in two sequences of a protein having the same activity or encoding similar proteins. For example, two amino acid sequences each having 100 residues will have 95% identity when 95 of the amino acids at corresponding positions are the same.

Another example of a mathematical algorithm used for comparison of sequences is the algorithm of Myers & Miller, CABIOS 1988, 4, 11-17. Such an algorithm is incorporated into the ALIGN program (version 2.0) which is part of the GCG sequence alignment software package. When utilizing the ALIGN program for comparing amino acid sequences, a PAM120 weight residue table, a gap length penalty of 12, and a gap penalty of 4 can be used. Yet another useful algorithm for identifying regions of local sequence similarity and alignment is the FASTA algorithm as described in Pearson & Lipman, Proc. Natl. Acad. Sci. USA 1988, 85, 2444-2448.

Another algorithm is the WU-BLAST (Washington University BLAST) version 2.0 software (WU-BLAST version 2.0 executable programs for several UNIX platforms). This program is based on WU-BLAST version 1.4, which in turn is based on the public domain NCBI-BLAST version 1.4 (Altschul & Gish, 1996, Local alignment statistics, Doolittle ed., Methods in Enzymology 266, 460-480; Altschul et al., Journal of Molecular Biology 1990, 215, 403-410; Gish & States, Nature Genetics, 1993, 3:266-272; Karlin & Altschul, 1993, Proc. Natl. Acad. Sci. USA 90, 5873-5877; all of which are incorporated by reference herein).

In addition to those otherwise mentioned herein, mention is made also of the programs BLAST, gapped BLAST, BLASTN, BLASTP, and PSI-BLAST, provided by the National Center for Biotechnology Information. These programs are widely used in the art for this purpose and can align homologous regions of two amino acid sequences. In all search programs in the suite, the gapped alignment routines are integral to the database search itself. Gapping can be turned off if desired. The default penalty (Q) for a gap of length one is Q=9 for proteins and BLASTP, and Q=10 for BLASTN, but may be changed to any integer. The default per-residue penalty for extending a gap (R) is R=2 for proteins and BLASTP, and R=10 for BLASTN, but may be changed to any integer. Any combination of values for Q and R can be used in order to align sequences so as to maximize overlap and identity while minimizing sequence gaps. The default amino acid comparison matrix is BLOSUM62, but other amino acid comparison matrices such as PAM can be utilized.

Specific amino acids may be referred to herein by the following designations: alanine: ala or A; arginine: arg or R; asparagine: asn or N; aspartic acid: asp or D; cysteine: cys or C; glutamic acid: glu or E; glutamine: gln or Q; glycine: gly or G; histidine: his or H; isoleucine: ile or I; leucine: leu or L; lysine: lys or K; methionine: met or M; phenylalanine: phe or F; proline: pro or P; serine: ser or S; threonine: thr or T; tryptophan: trp or W; tyrosine: tyr or Y; and valine: val or V.

The terms "polynucleotide sequence" or "nucleic acid," as used herein, include any polynucleotide sequence which encodes a mutant peptide including polynucleotides in the form of RNA, such as mRNA, or in the form of DNA, including, for instance, cDNA and genomic DNA obtained by cloning or produced by chemical synthetic techniques or by a combination thereof. The DNA may be double-stranded or single-stranded. Single-stranded DNA may be the coding strand, also known as the sense strand, or it may be the non-coding strand, also referred to as the anti-sense strand. The polynucleotide sequence encoding a mutant peptide or encoding a therapeutically-effective fragment of a mutant peptide can be substantially the same as the coding sequence of the endogenous coding sequence as long as it encodes a biologically active mutant peptide. Further, the mutant peptide, or therapeutically-effective fragment of a mutant peptide may be expressed using polynucleotide sequence(s) which differ in codon usage due to the degeneracies of the genetic code or allelic variations. Moreover, the mutant peptides of the present disclosure and the nucleic acids which encode them include peptide and nucleic acid variants which comprise additional conservative substitutions. For example, the peptide variants include, but are not limited to, variants that are not exactly the same as the sequences disclosed herein, but which have, in addition to the substitutions explicitly described for various sequences listed herein, conservative substitutions of amino acid residues which do substantially not impair the agonistic or antagonistic activity or properties of the variants described herein. Examples of such conservative amino acid substitutions include, but are not limited to, ala to gly, ser, or thr; arg to gln, his, or lys; asn to asp, gln, his, lys, ser, or thr; asp to asn or glu; cys to ser; gln to arg, asn, glu, his, lys, or met; glu to asp, gln, or lys; gly to pro or ala; his to arg, asn, gln, or tyr; ile to leu, met, or val; leu to ile, met, phe, or val; lys to arg, asn, gln, or glu; met to gln, ile, leu, or val; phe to leu, met, trp, or tyr; ser to ala, asn, met, or thr; thr to ala, asn, ser, or met; trp to phe or tyr; tyr to his, phe or trp; and val to ile, leu, or met.

The term "antisense" refers to a polynucleotide or oligonucleotide molecule that is substantially complementary or 100% complementary to a particular polynucleotide or oligonucleotide molecule (RNA or DNA), i.e., a "sense" strand, or portion thereof. For example, the antisense molecule may be complementary in whole or in part to a molecule of messenger RNA, miRNA, pRNA, tRNA, rRNA of hnRNA, or a sequence of DNA that is either coding or non-coding.

The term "operably linked" where used herein refers to an association of two chemical moieties linked in such a way so that the function of one is not affected by the other, e.g., an arrangement of elements wherein the components so described are configured so as to perform their usual function. The two moieties may be linked directly, or may be linked indirectly via a linker sequence of molecule.

The term "primer" refers to an oligonucleotide sequence which serves as a starting point for DNA synthesis in the polymerase chain reaction (PCR). A primer generally comprises from about 12 to about 30 nucleotides and hybridizes with a complementary region of a target sequence, for example a microRNA molecule.

The term "probe" refers to an oligonucleotide which is bound to or configured to bind to a target sequence, and includes for example, an antisense nucleic acid sequence which is designed to hybridize by a sequence-specific method with a complementary region of a specific nucleic acid sequence such as a target nucleic acid, such as an miRNA as disclosed herein. An oligonucleotide probe can comprise any number of nucleotides, such as 10 to 25, as long as the oligonucleotide probe comprises a sufficient number of nucleotides to bind to the target nucleic acid with the necessary specificity for the particular use of the probe. For purposes of quantification of the probe-target sequence complex, the probe may further optionally comprise a tag or label operably linked thereto, wherein the tag or label comprises, for example, a fluorescent (e.g., fluorophore), luminescent, or chemiluminescent label or reporter group. Oligonucleotides with binding specificity to the RNAs and cDNAs expressed from the biomarker panel disclosed herein may be referred to as "capture molecules" in the assay systems and methods disclosed herein.

The term "fluorophore" or "fluorochrome" or "fluorescent species" or "fluorescent label" or "fluorescent tag," as used herein indicates a substance which itself fluoresces or can be made to fluoresce. Each term is interchangeable. Fluorophores can be used alone or covalently attached ("operably-linked") or non-covalently linked to another molecule, such as an oligonucleotide primer, probe, or miRNA, such as described herein. The process of covalently attaching a fluorophore to another molecule or compound is referred to as "fluorescent labeling" and may be conducted by, for example, an enzyme effective in forming the covalent bond therebetween.

Examples of fluorophores which may be used in various embodiments of the present disclosure include but are not limited to: hydroxycoumarin, methoxycoumarin, Alexa fluor 345, aminocoumarin, 7-diethylaminocoumarin-3-carboxylic acid, Cy2 (cyanine 2), FAM, Alexa fluor 350, Alexa fluor 405, Alexa fluor 488, Fluorescein (FITC), Alexa fluor 430, Alexa fluor 532, HEX 535, Cy3, Alexa fluor 546, Alexa fluor 555, R-phycoerythrin (PE), tetramethyl rhodamine (TRITC), Rhodamine Red-X, Tamara, Cy3.5, Rox, Alexa fluor 568, Red 613 480, Texas Red 615, Alexa fluor 594, Alexa fluor 633, Allophycocyanin, Alexa fluor 647, Cy5, Alexa fluor 660, Cy5.5, TruRed 490, Alexa fluor 680, Alexa fluor 750, Cy7, DAPI, QSY 7, QSY 33, dabsyl, BODIPY FL, BODIPY630/650, BODIPY 650/665, BODIPY TMR-X, BODIPY TR-X, Hoechst 33258, SYTOX blue, Hoechst 33342, YOYO-1 509, SYTOX green, TOTO1, TO-PRO-1, SYTOX orange, Chromomycin A3, Mithramycin, propidium iodide, ethidium bromide, Pacific Orange, Pacific Green, Pacific Blue, Oregon Green 488, Oregon Green 514, red fluorescent protein (RFP), green fluorescent protein (GFP), and cyan fluorescent protein (CFP).

Turning now to particular embodiments of the present disclosure, in at least one embodiment, the present disclosure includes a method for generating quantitative data for a subject, including determining an expression level of a biomarker panel in a sample obtained from the subject, the biomarker panel comprising at least one biomarker selected from a first biomarker group consisting of the genes CDC45, CENPI, CLSPN, ERCC6L, EXO1, NCAPG, and optionally at least one additional biomarker selected from a second biomarker group consisting of the genes BUB1B, CDK1, E2F7, GSG2, NUSAP1, RAD51, and RRM2 in any combination, wherein the expression level is obtained by measuring expression of the biomarker panel in the sample, and wherein the subject has a cancer, or is suspected of having a cancer.

In at least one embodiment, the disclosure is directed to an assay system for use in a cancer assay of a test sample, including a test surface; and a plurality of capture molecules immobilized directly or indirectly on the test surface, wherein the plurality of capture molecules are selected from a group of capture molecules specific for RNA, proteins, and/or cDNA corresponding to a biomarker panel comprising the biomarker panel comprising at least one biomarker selected from a first biomarker group consisting of the genes CDC45, CENPI, CLSPN, ERCC6L, EXO1, NCAPG, and optionally at least one additional biomarker selected from a second biomarker group consisting of the genes BUB1B, CDK1, E2F7, GSG2, NUSAP1, RAD51, and RRM2 in any combination, for measuring an expression level of the biomarker panel in the sample. The test surface may be a plate, a flow cell, a microarray plate, microbeads, or a capture surface, for example. The assay system may be used to measure the expression level by immunohistochemistry, PCR, RNA sequencing, and/or multiplex RNA quantitation using molecular barcoding of nanostrings. The sample may be obtained from cells or portions of cells selected from the group consisting of a biopsy sample, tissue excised during a surgery, circulating tumor cells, exosomes, and vesicles.

In at least one embodiment, the present disclosure includes a method for treating prostate cancer in a subject, comprising: (1) obtaining a sample comprising prostate cancer tumor tissue from said subject; (2) measuring the expression of a biomarker panel including at least one gene, or at least two genes, or at least three genes (see TABLE 15), or at least four genes (see TABLE 16), or at least five genes (see TABLE 17), or all six genes, of a group consisting of the genes CDC45, CENPI, CLSPN, ERCC6L, EXO1, NCAPG, and the biomarker panel optionally comprising one or more genes selected from a group consisting of the genes BUB1B, CDK1, E2F7, GSG2, NUSAP1, RAD51, and RRM2; and (3) calculating a test value based on the expression of the panel of genes; and (4) comparing the test value to a threshold index value, and administering to the subject active surveillance when the test value is less than the threshold index value, and administering to the subject one or more of hormone therapy, chemotherapy, immunotherapy, radiation therapy, or surgery when the test value is equal to or greater than the threshold index value.

In non-limiting embodiments, the present disclosure is directed to an assay system having a test surface, such as a test strip, bead, flow cell, capture surface, or microarray, upon which is (are) disposed one or more capture molecules, e.g., primers, probes, antibodies, or aptamers, able to bind to genes, RNA, cDNA, or proteins corresponding to the group CDC45, CENPI, CLSPN, ERCC6L, EXO1, NCAPG, BUB1B, CDK1, E2F7, GSG2, NUSAP1, RAD51, and RRM2. In non-limiting embodiment, the present disclosure is directed to a kit comprising a test surface, such as a test strip, bead, flow cell, capture surface, or microarray, upon which is (are) disposed one or more capture molecules, able to bind to genes, RNA, cDNA, or proteins corresponding to the group CDC45, CENPI, CLSPN, ERCC6L, EXO1, NCAPG, BUB1B, CDK1, E2F7, GSG2, NUSAP1, RAD51, and RRM2.

In non-limiting embodiments, the disclosure is directed to a method for determining gene expression in a sample obtained from a subject diagnosed with prostate cancer, including (a) obtaining the sample, wherein the sample is derived from a biopsy, a surgically-excised tissue, circulating cells, or portions of cells from the subject; (b) measuring an expression level of a biomarker panel in a sample obtained from the subject, the biomarker panel comprising at least one biomarker selected from a first biomarker group consisting of the genes CDC45, CENPI, CLSPN, ERCC6L, EXO1, NCAPG, and optionally at least one additional biomarker selected from a second biomarker group consisting of the genes BUB1B, CDK1, E2F7, GSG2, NUSAP1, RAD51, and RRM2 in any combination, wherein the expression level is obtained by measuring expression of the biomarker panel in the sample; (c) calculating a test value based on the expression level of the biomarker panel; (d) comparing the test value to a threshold index value; (e) determining that the subject is likely to respond favorably or unfavorably to a prostate cancer treatment modality based on the relation of the test value to the threshold index value; and (f) adjusting the treatment modality administered to the subject based on whether it is determined that the subject is likely to respond favorably or unfavorably to the treatment modality.

In non-limiting embodiments of said methods, assay systems, and kits, the biomarker panel comprising at least one gene comprises the gene CDC45. In non-limiting embodiments of said methods, the biomarker panel comprising at least two genes comprises the genes CDC45 and NCAPG. In certain non-limiting embodiments, the biomarker panel of genes which comprises at least three genes comprises at least the genes CDC45, NCAPG, and CLSPN, or CDC45, CENPI, and CLSPN, or CDC45, CENPI, and ERCC6L. In non-limiting embodiments of said methods, the biomarker panel comprising at least four genes comprises the genes CDC45, NCAPG, EXO1, and CLSPN. In non-limiting embodiments of said methods, the biomarker panel comprising at least five genes comprises the genes CDC45, NCAPG, EXO1, CLSPN, and CENPI.

The measurement of expression may be determined by quantitative real-time PCR of cDNA. In non-limiting embodiments of said methods, the step of measuring expression further comprises measuring expression of one or more housekeeping genes in said sample. Gene expression can be determined either at the RNA level (i.e., noncoding RNA (ncRNA), mRNA, miRNA, tRNA, rRNA, snoRNA, siRNA and piRNA) or at the protein level. RNA molecules may be identified and measured using RNA Sequencing or by nanostring technology wherein the RNA molecules are captured on a capture surface for detection. Levels of proteins in a tumor sample can be determined by any known techniques in the art, e.g., HPLC, mass spectrometry, or using antibodies specific to selected proteins (e.g., IHC, ELISA, etc.). In certain embodiments, the amount of RNA transcribed from the panel of genes including test genes is measured in the tumor sample. In addition, the amount of RNA of one or more housekeeping genes in the tumor sample is also measured, and used to normalize or calibrate the expression of the test genes. The terms "normalizing genes" and "housekeeping genes" are defined herein below. In certain embodiments, the expression of the biomarker panel of genes is measured by using a primer set comprising primers which are specific for a panel of genes are described herein. The primer set may comprise at least one forward primer specific for RNA transcribed from each gene of the panel of genes. The primer set may be disposed in a reaction mixture. In one embodiment, the expression of the panel of genes is measured by using a hybridization array comprising oligonucleotide probes which are specific for a panel of genes are described herein. The hybridization array may comprise the probes immobilized on a surface. The surface may comprise a microarray plate, a flow cell, a capture surface, or a plurality of microbeads. The probes may comprise DNA or RNA.

The sample used in the method may be of prostate gland tissue obtained by way of biopsy or surgical procedure (e.g., transurethral resection of the prostate (TURP), or prostatectomy), or may be obtained from prostate cells or portions of prostate cells naturally shed into blood, urine, sputum, pleural fluid, semen, saliva, or any other body fluid into which prostate cells are shed. Samples from an individual who has not been diagnosed as having prostate cancer may be used for the diagnosis of prostate cancer. Samples from an individual diagnosed as having prostate cancer may be used for the cancer prognosis. As noted above, other types of cancers can be prognosticated using combinations of the gene markers disclosed herein include, but are not limited to, prostate, brain, lung, ovarian, bladder, and breast cancers. Tissue samples used in the testing can be obtained by way of biopsy or surgical procedure, or may be obtained directly from a biopsies of the tumor, or from tumor cells or portions of tumor cells naturally shed into blood, urine, sputum, ascites, pleural fluid, semen, saliva, cerebrospinal fluid, breast milk or secretions, or any other body fluid. The methods of the disclosure may be performed on a tumor sample from a patient identified as having prostate cancer, lung cancer, bladder cancer, breast cancer, ovarian cancer, or brain cancer. Such a method includes at least the following steps: (1) obtaining a tumor sample from a patient identified as having prostate cancer, lung cancer, bladder cancer, ovarian cancer, or brain cancer; (2) determining the expression of a biomarker panel in the tumor sample including 1, 2, 3, 4, 5, 6, 7, 8, 9, 10, or 11 or more genes; and (3) providing a test value by averaging the determined expression of each of a plurality of test genes, or by weighting the determined expression of each of a plurality of test genes selected from said panel of genes with a predefined coefficient, and combining the weighted expression to provide said test value. The method also may be performed on a sample from a patient who has not been diagnosed of (but may be suspected of) cancer (e.g., prostate cancer, lung cancer, bladder cancer, breast cancer, ovarian cancer, or brain cancer).

The sample tested herein may be obtained by excision, e.g., by a biopsy or a surgical procedure (e.g., removal of a tumor) sample directly from the organ (e.g., prostate, lung, bladder, ovary, breast or brain), or cells in a bodily fluid (e.g., blood, urine, sputum, semen, ascites, etc.) naturally shedded from such an organ. The sample to be tested can be derived from any biological source or sample, such as tissues, extracts, cell cultures, including cells, portions of cells such as vesicles and exosomes, cell lysates, and physiological fluids, such as, for example, whole blood, plasma, serum, saliva, ductal lavage, ocular lens fluid, cerebral spinal fluid, sweat, urine, milk, semen, ascites fluid, synovial fluid, peritoneal fluid and the like. The sample can be obtained from animals, including mammals, and human and non-human primates.

In certain embodiments, the present disclosure is directed to a set of reagents to measure levels of one or more biomarkers in a sample, wherein the one or more biomarkers are selected from a first biomarker group comprising the genes CDC45, CENPI, CLSPN, ERCC6L, EXO1, NCAPG, and optionally further comprising at least one additional biomarker selected from a second biomarker group comprising the genes BUB1B, CDK1, E2F7, GSG2, NUSAP1, RAD51, and RRM2. The set of reagents may be binding molecules. The binding molecules may be, but are not limited to, antibodies, primers, probes, reporter molecules (e.g., nanoreporters), and nanostring tags.

Persons having ordinary skill in the art of molecular biology are knowledgeable of the various techniques for determining gene expression and protein production in a tissue or cell sample including, but not limited to, microarray analysis (e.g., for assaying mRNA or microRNA expression, or copy number), quantitative real-time PCR ("qRT-PCR", e.g., TaqMan™), and immunoanalysis (e.g., ELISA, immunohistochemistry). The activity level of a polypeptide encoded by a gene may be used in much the same way as the expression level of the gene or polypeptide. Often higher activity levels indicate higher expression levels while lower activity levels indicate lower expression levels. Thus, in some embodiments, the method may include the use of any of the methods discussed above, wherein the activity level of a polypeptide encoded by the gene is determined instead of or in addition to the expression level of the gene.

In some embodiments, the expression of one or more normalizing genes is also obtained for use in normalizing the expression of the genes of the biomarker (gene) gene panel ("test genes"). As used herein, "normalizing genes" refer to the genes whose expression is used to calibrate or normalize the measured expression of the test genes. Importantly, the expression of normalizing genes should be independent of cancer outcome/prognosis, and the expression of the normalizing genes is very similar among all the tumor samples. The normalization ensures accurate comparison of expression of a test gene between different samples. For this purpose, housekeeping genes known in the art can be used. Housekeeping genes are well known in the art, with examples including, but not limited to, glucuronidase beta (GUSB), hydroxymethylbilane synthase (HMBS), succinate dehydrogenase complex, subunit A (SDHA), flavoprotein, ubiquitin C (UBC), ARF1, CLTC, GPS1, PGK1, RPL4, RPL8, RPL13A, RPS29, and UBA52. One or more housekeeping genes can be used. In some embodiments, at least 2, 3, 4, 5, 6, 7, 8, 9, 10, 11, 12, 13, 14, or 15 or more housekeeping genes are used to provide a combined normalizing gene set. Other examples of housekeeping genes for use in the methods and compositions of the present disclosure include, but are not limited to, those shown in Table A of U.S. Pat. No. 9,065,319.

In at least one embodiment, gene expression is measured by measuring RNA levels for the specified genes via quantitative real-time PCR (qRT-PCR) assay, following a reverse transcription reaction. Typically, a cycle threshold (Ct) is determined for each test gene and each normalizing gene, i.e., the number of cycle at which the fluorescence from a qRT-PCR reaction above background is detectable.

Those skilled in the art are familiar with various ways of deriving and using index values herein (including but not limited to the gene expression, diagnosis, and prognosis aspects discussed above and the kit, method of treatment, and system aspects discussed below). For example, the index value may represent the gene expression levels found in a normal sample obtained from the patient of interest, in which case an expression level in the test sample significantly higher than this index value would indicate, e.g., cancer, a poor prognosis, increased likelihood of cancer recurrence, or a need for aggressive treatment.

In certain embodiments, the index value may represent the average expression level for a set of individuals from a diverse population or a subset of the population. For example, one may determine the average expression level of a gene or gene panel in a random sampling of patients (either cancer-free controls or patients with prostate cancer). This average expression level may be termed the "threshold index value." Patients or subjects having the TMCC gene panel expression higher than this value have a higher probability (risk) of having cancer or cancer recurrence as compared to patients or subjects having a TMCC gene panel expression lower than this value, who would be expected to have a lower probability (risk) of having cancer or cancer recurrence.

In some embodiments of the disclosure, the methods comprise determining the expression level of the particular biomarker panel (i.e., the TMCC panel genes) in a person suspected of having prostate cancer and, if this expression is equal to or exceeds a threshold value (i.e., is "increased"), the patient is diagnosed as having prostate cancer, or highly likely to have prostate cancer, or if the subject has already been treated for prostate cancer, has a high risk for recurrence or a lack of response or an adverse outcome to a specific treatment. In the context of the present embodiments, "increased" expression of a gene means the patient's expression level is either elevated over a normal index value or a threshold index (e.g., by at least some threshold amount),or closer to a particular index value (e.g., "cancer index value" or "high risk index value") than to another index value (e.g., "cancer-free index value" or "low risk index value").

Thus, when the determined level of expression of a relevant gene marker is closer to the cancer index value of the gene than to the cancer-free index value of the gene, then it can be concluded that the patient has cancer. On the other hand, if the determined level of expression of a relevant gene marker is closer to the cancer-free index value of the gene than to the cancer index value of the gene, then it can be concluded that the patient does not have cancer. Likewise, when the determined level of expression of a relevant gene marker is closer to the low risk index value of the gene than to the high risk index value of the gene, then it can be concluded that the patient is less likely to have a poor prognosis, i.e., a low (or no increased) likelihood of cancer recurrence. On the other hand, if the determined level of expression of a relevant gene marker is closer to the high risk index value of the gene than to the low risk index value, then it can be concluded that the patient is more likely to have a poor prognosis, i.e., a high (increased) likelihood of cancer recurrence.

Those skilled in the art are familiar with various ways of determining the expression of a biomarker panel (i.e., a plurality) of genes. Sometimes herein this is called determining the "overall expression" of a panel or plurality of genes. One may determine the expression of a panel of genes by determining the average expression level (normalized or absolute) of all panel genes in a sample obtained from a particular patient (either throughout the sample or in a subset of cells from the sample or in a single cell). Increased expression in this context will mean the average expression is higher than the average expression level of these genes in normal patients (or higher than some index value that has been determined to represent the average expression level in a reference population such as healthy patients or patients with a particular cancer). Alternatively, one may determine the expression of a panel of genes by determining the average expression level (normalized or absolute) of at least two or more of the genes in the panel. Alternatively, one may determine the expression of a panel of genes by determining the absolute copy number of the mRNA (or protein) of all the genes in the panel and either total or average these across the genes.

"Recurrence" and "progression" are terms well-known in the art and are used herein according to their known meanings to those skilled in the art. As used herein, a patient has an "increased likelihood" of some clinical feature or outcome (e.g., recurrence or progression) if the probability of the patient having the feature or outcome exceeds some reference probability or value. The reference probability may be the probability of the feature or outcome across the general relevant patient population. For example, if the probability of recurrence in the general prostate cancer population is X % and a particular patient has been determined by the methods of the present invention to have a probability of recurrence of Y %, and if Y>X, then the patient has an "increased likelihood" of recurrence. Alternatively, as discussed above, a threshold or reference value may be determined and a particular patient's probability of recurrence may be compared to that threshold or reference. Because predicting recurrence and predicting progression are prognostic endeavors, "predicting prognosis" will often be used herein to refer to either or both. In these cases, a "poor prognosis" will generally refer to an increased likelihood of recurrence, progression, or both.

In some embodiments of the present disclosure, the present method is carried out before a radical prostatectomy is conducted (e.g., using a prostate biopsy sample), while in some embodiments it is made after a radical prostatectomy is conducted (e.g., using the resected prostate sample). Prostate cancer treatment currently applied in accordance with the present disclosure includes, but is not limited to, prostatectomy, radiotherapy, hormonal therapy (e.g., using GnRH antagonists, GnRH agonists, antiandrogens), chemotherapy, and high intensity focused ultrasound. In some embodiments, one or more prostate tumor cells from prostate cancer tissue are obtained from a prostate cancer patient during biopsy or prostatectomy and are used for analysis in the method of the present disclosure.

The results of any analyses according to the presently disclosed methods may be communicated to physicians, genetic counselors and/or patients (or other interested parties such as researchers) in a transmittable form that can be communicated or transmitted to any of the above parties. Such a form can vary and can be tangible or intangible. The results can be embodied in descriptive statements, diagrams, photographs, charts, images or any other visual forms. The information can be recorded on a tangible medium such as papers, computer readable media or on an intangible medium, e.g., an electronic medium in the form of email or website on internet or intranet or accessible via a cloud-based storage system. In addition, results can also be recorded in a sound form and transmitted through any suitable medium, e.g., analog or digital cable lines, fiber optic cables, via telephone, facsimile, wireless mobile phone, internet, and the like. Thus, the information and data on a test result can be produced virtually anywhere in the world, e.g., inside or outside the United States, and transmitted to a different location inside or outside the United States. The sample analyzer can be any instrument useful in determining gene expression, including, e.g., a sequencing machine, a real-time PCR machine, a microarray instrument.

The analysis function can also be embodied in computer program products and used in the systems described above or other computer- or internet-based systems. Accordingly, another aspect of the present invention relates to a computer program product comprising a computer-usable medium having computer-readable program codes or instructions embodied thereon for enabling a processor to carry out gene status analysis.

These computer program instructions may be loaded onto a computer or other programmable apparatus to produce a machine, such that the instructions which execute on the computer or other programmable apparatus create means for implementing the functions or steps described above. These computer program instructions may also be stored in a computer-readable memory or medium that can direct a computer or other programmable apparatus to function in a particular manner, such that the instructions stored in the computer-readable memory or medium produce an article of manufacture including instruction means which implement the analysis. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions or steps described above.

"Active treatment" in prostate cancer is well-understood by those skilled in the art and, as used herein, has the conventional meaning in the art. Generally speaking, active treatment in prostate cancer is anything other than "watchful waiting" or "active surveillance." Active treatment currently applied in the art of prostate cancer treatment includes, e.g., prostatectomy, radiotherapy, hormonal therapy (e.g., GnRH antagonists, GnRH agonists, antiandrogens), chemotherapy, and high intensity focused ultrasound.

"Watchful-waiting," also called "active surveillance," also has its conventional meaning in the art. This generally means observation and regular monitoring without invasive treatment. Watchful-waiting is sometimes used, e.g., when an early stage, slow-growing prostate cancer is found in an older man. Watchful-waiting may also be suggested when the risks of surgery, radiation therapy, or hormonal therapy outweigh the possible benefits. Other treatments can be started if symptoms develop, or if there are signs that the cancer growth is accelerating (e.g., rapidly rising PSA, increase in Gleason score on repeat biopsy, etc.).

In another aspect of the present disclosure, a kit is provided for practicing the disclosed methods. The kit may include a carrier for the various components of the kit. The carrier can be a container or support, in the form of, e.g., bag, box, tube, rack, and is optionally compartmentalized. The carrier may define an enclosed confinement for safety purposes during shipment and storage. The kit includes various components useful in determining the status of one or more TMCC genes and one or more housekeeping gene markers, using the above-discussed detection techniques. For example, the kit may include oligonucleotides specifically hybridizing under high stringency to mRNA or cDNA of the genes described herein. Such oligonucleotides can be used as PCR primers in RT-PCR reactions, or hybridization probes. In some embodiments the kit comprises reagents (e.g., probes, primers, and or antibodies) for determining the expression level of a panel of genes as disclosed herein. Oligonucleotides in the detection kit can be labeled with any suitable detection marker including but not limited to, radioactive isotopes, fluorophores, biotin, enzymes (e.g., alkaline phosphatase), enzyme substrates, ligands and antibodies. Alternatively, the oligonucleotides included in the kit are not labeled, and instead, one or more markers are provided in the kit so that users may label the oligonucleotides at the time of use.

Various other components useful in the detection techniques may also be included in the detection kit. Examples of such components include, but are not limited to, Taq polymerase, deoxyribonucleotides, dideoxyribonucleotides, other primers suitable for the amplification of a target DNA sequence, RNase A, and the like. In addition, the detection kit in some embodiments includes instructions on using the kit for practice the methods of the present disclosure.

In certain embodiments, the present disclosure is directed to characterization (i.e., classification and/or evaluation, such as diagnosis) and/or prognosis of the prostate cancer. Prognosis refers to predicting the likely outcome of the prostate cancer for the subject. By diagnosis is meant identifying the presence of prostate cancer. In other embodiments, the characterization is related to predicting a response to a cancer treatment, such as a prostate cancer treatment, wherein the results of the biomarker panel are used to predict the likelihood that a treatment will be successful, i.e., have favorable results, or unsuccessful, i.e., have unfavorable results.

Where used herein the terms "favorable" or "responds favorably" may be defined as an "increased response rate" as measured by reduction in tumor size, reduction in PSA levels, reduction in circulating tumor cells, prolonged disease free interval, prolonged time to radiographic progression (metastasis), decreased morbidity due to treatment, increased overall survival, whereas the terms "unfavorable" "or "responds unfavorably" may be defined as a "decreased response rate" as measured by increase in tumor size, increase in PSA levels, increase in circulating tumor cells, decreased disease free interval, decreased time to progression, decreased time to radiographic progression (metastasis), increased morbidity due to treatment, decreased overall survival.

In certain embodiments, the characterization of and/or prognosis for the prostate cancer may comprise, consist essentially of, or consist of predicting an increased likelihood of recurrence. The characterization of and/or prognosis for the prostate cancer may comprise, consist essentially of or consist of predicting a reduced time to recurrence. Recurrence may be clinical recurrence or biochemical recurrence. In one embodiment, biochemical recurrence refers to a rise in the level of prostate specific antigen (PSA) of at least 0.4 ng/ml in a subject after treatment for prostate cancer. Biochemical recurrence may indicate that the prostate cancer has not been treated effectively or has recurred.

The characterization of and/or prognosis for the prostate cancer may comprise, consist essentially of or consist of predicting an increased likelihood of metastasis. Metastasis, or metastatic disease, is the spread of a cancer from one organ or part to another non-adjacent organ or part. The new occurrences of disease thus generated are referred to as metastases. Characterization of and/or prognosis for the prostate cancer may also comprise, consist essentially of or consist of determining whether the prostate cancer has a poor prognosis. A poor prognosis may be a reduced likelihood of cause-specific, i.e. cancer-specific, or long-term survival. Survival is a net survival measure representing cancer survival in the absence of other causes of death. Cancer survival may be for 6, 7, 8, 9, 10, 11, 12 months or 1, 2, 3, 4, 5, to 10 to 20 years or more. Long-term survival may be survival for 1 year, 5 years, 10 years or 20 years following diagnosis. A prostate cancer with a poor prognosis may be aggressive, fast growing, and/or show resistance to treatment.

In certain embodiments the methods described herein comprise comparing the gene expression level of at least one of CDC45, CENPI, CLSPN, ERCCOL, EXO1, NCAPG, BUB1B, CDK1, E2F7, GSG2, NUSAP1, RAD51, and RRM2 to a reference value or to the expression level in one or more control samples. The cells of the control sample may be normal cells (i.e. cells characterized by an independent method as non-cancerous). The one or more control samples may consist of non-cancerous cells or may include a mixture of cancer cells and non-cancerous cells. The expression level may be compared to the expression level of the same gene in one or more control samples.

The reference value may be a threshold level of expression of at least one gene set by determining the level or levels in a range of samples from subjects with and without prostate cancer. The prostate cancer may be prostate cancer with or without an increased likelihood of recurrence and/or metastasis and/or a poor prognosis. Suitable methods for setting a threshold are well known to those skilled in the art.

The threshold may be mathematically derived from a training set of patient data. The score threshold thus separates the test samples according to presence or absence of the particular condition. The interpretation of this quantity, i.e. the cut-off threshold may be derived in a development or training phase from a set of patients with known outcome. The threshold may therefore be fixed prior to performance of the claimed methods from training data by methods known to those skilled in the art.

The reference value may also be a threshold level of expression of at least one gene set by determining the level of expression of the at least one gene in a sample from a subject at a first time point. The determined levels of expression at later time points for the same subject are then compared to the threshold level. Thus, the methods of the present disclosure may be used in order to monitor progress of disease in a subject, i.e., to provide an ongoing characterization and/or prognosis of disease in the subject. For example, the methods may be used to identify a prostate cancer that has developed into a more aggressive or potentially metastatic form. This may be used to guide treatment decisions as discussed in further detail herein.

For genes whose expression level does not differ between normal cells and cells from a prostate cancer that does not have an increased likelihood of recurrence and/or metastasis and/or a poor prognosis the expression level of the same gene in normal cells in the same sample can be used as a control.

The methods described herein may further comprise determining the expression level of a reference gene. A reference gene may be required if the target gene expression level differs between normal cells and cells from a prostate cancer that does not have an increased likelihood of recurrence and/or metastasis and/or a poor prognosis.

In certain embodiments the expression level of at least one of CDC45, CENPI, CLSPN, ERCC6L, EXO1, NCAPG, BUB1B, CDK1, E2F7, GSG2, NUSAP1, RAD51, and RRM2 is compared to the expression level of a reference gene.

The reference gene may be any gene with minimal expression variance across all prostate cancer samples. Thus, the reference gene may be any gene whose expression level does not vary with likelihood of recurrence and/or metastasis and/or a poor prognosis. The skilled person is well able to identify a suitable reference gene based upon these criteria. In particular, the reference gene may be TPT1, RPS14 or RPL37A.

The expression level of the reference gene may be determined in a different sample. The different sample may be a control sample as described above. The expression level of the reference gene may be determined in normal and/or prostate cancer cells in a sample.

The expression level of the at least one gene in the sample from the subject may be analyzed using a statistical model. In specific embodiments where the expression level of at least 2 genes is measured the genes may be weighted. As used herein, the term "weight" refers to the relative importance of an item in a statistical calculation. The weight of each gene may be determined on a data set of patient samples using analytical methods known in the art. An overall score may be calculated and used to provide a characterization of and/or prognosis for the prostate cancer.

Methods for determining the expression levels of the markers are described in greater detail herein. Typically, the methods may involve contacting a sample obtained from a subject with a detection agent, such as primers/probes/antibodies specific for the marker and detecting expression products. A comparison is made against expression levels determined in a control sample to provide a characterization and/or a prognosis for the prostate cancer. According to all aspects of the present disclosure the expression level of the gene or genes may be measured by any suitable method. In certain embodiments the expression level is determined at the level of protein, RNA or epigenetic modification.

The expression level may be determined by immunohistochemistry. By immunohistochemistry is meant the detection of proteins in cells of a tissue sample by using a binding reagent (capture molecule) such as an antibody or aptamer that binds specifically to the proteins. Thus, the expression level as determined by immunohistochemistry is a level of a protein produced by expression of the gene. The sample may be a prostate tissue sample and may comprise prostate cancer (tumor) cells, prostatic intraepithelial neoplasia (PIN) cells, vesicles and/or exosomes from tumor cells or other portions of tumor cells, normal prostate epithelium, stroma and, optionally, infiltrating immune cells. In some embodiments the expression level of the at least one gene in the sample is compared to the expression level of the same gene (and/or a reference gene) in the normal cells in the same sample. In some embodiments the expression level of the at least one gene in the sample is compared to the expression level of the same gene (and/or a reference gene) in the control sample. The normal cells may comprise, consist essentially of or consist of normal (non-cancer) prostate epithelial cells. In yet further embodiments the expression level of the at least one gene in the sample is scored using a method based on intensity, proportion and/or localization of expression in the tumor cells (without comparison to normal cells). The scoring method may be derived in a development or training phase from a set of patients with known outcome.

Accordingly, in certain embodiments, the disclosure is directed to methods of using one or more antibodies or aptamers that bind specifically to a protein product of at least one of CDC45, CENPI, CLSPN, ERCC6L, EXO1, NCAPG, BUB1B, CDK1, E2F7, GSG2, NUSAP1, RAD51, and RRM2.

The antibody may be of monoclonal or polyclonal origin. The term "antibody" as used herein refers to whole antibodies, as well as antibody fragments and derivative portions thereof, chimeric antibodies, Fab fragments, ScFv, single domain antibodies, nanoantibodies, heavy chain antibodies, and aptamers which retain protein or peptide-specific binding function. Such antibodies are useful in the methods of the present disclosure. They may be used to measure the level of a particular protein, or in some instances one or more specific isoforms of a protein which are expressed from the genes of the biomarker panels described herein. The skilled person is well able to identify epitopes that permit specific isoforms to be discriminated from one another. Methods for generating specific antibodies are known to those skilled in the art. Antibodies may be of human or non-human origin (e.g. rodent, such as rat or mouse) and be humanized etc. according to known techniques. Antibodies with binding specificity to the proteins expressed from the biomarker panel disclosed herein may be referred to as "capture molecules" in the assay systems and methods disclosed herein.

In certain embodiments the expression level is determined using an antibody or aptamer conjugated to a label. By label is meant a component that permits detection, directly or indirectly. For example, the label may be an enzyme, optionally a peroxidase, or a fluorophore.

A label is an example of a detection agent. By detection agent is meant an agent that may be used to assist in the detection of the antibody-protein complex. Where the antibody is conjugated to an enzyme the detection agent may be comprise a chemical composition such that the enzyme catalyzes a chemical reaction to produce a detectable product. The products of reactions catalyzed by appropriate enzymes can be, without limitation, fluorescent, luminescent, or radioactive or they may absorb visible or ultraviolet light. Examples of detectors suitable for detecting such detectable labels include, without limitation, x-ray film, radioactivity counters, scintillation counters, spectrophotometers, colorimeters, fluorometers, luminometers, and densitometers. In certain embodiments the detection agent may comprise a secondary antibody. The expression level is then determined using an unlabeled primary antibody that binds to the target protein and a secondary antibody conjugated to a label, wherein the secondary antibody binds to the primary antibody. In certain embodiments, the present disclosure also relates to use of an antibody as described above for characterizing and/or prognosing a prostate cancer in a subject.

Additional techniques for determining expression level at the level of protein include, for example, Western blot, immunoprecipitation, immunocytochemistry, mass spectrometry, ELISA and others known to persons having ordinary skill in the art. To improve specificity and sensitivity of an assay method based on immunoreactivity, monoclonal antibodies are often used because of their specific epitope recognition. Polyclonal antibodies have also been successfully used in various immunoassays because of their increased affinity for the target as compared to monoclonal antibodies.

Measuring mRNA in a biological sample may be used as a surrogate for detection of the level of the corresponding protein or level of gene expression in the biological sample. Thus, the expression level of any of the genes described herein can also be detected by detecting the appropriate RNA. Accordingly, in specific embodiments the expression level may be determined using a flow cell, a capture surface, microarray, coated beads, northern blotting, RNA-SEQ (RNA sequencing), in situ RNA detection or nucleic acid amplification, or multiplex RNA quantitation using molecular barcoding ("nanostrings"). Nucleic acid amplification includes PCR and all variants thereof such as real-time and end point methods and qPCR. Other nucleic acid amplification techniques are well known in the art, and include methods such as nucleic acid sequence-based amplification (NASBA), self-sustained sequence replication (3SR) and Transcription Mediated Amplification (TMA). Other suitable amplification methods include the ligase chain reaction (LCR), selective amplification of target polynucleotide sequences (e.g., U.S. Pat. No. 6,410,276), consensus sequence primed polymerase chain reaction (e.g., U.S. Pat. No. 4,437,975), arbitrarily primed polymerase chain reaction (e.g., WO 90/06995), invader technology, strand displacement technology, and nick displacement amplification (e.g., WO 2004/067726). This list is not intended to be exhaustive; any nucleic acid amplification technique may be used provided the appropriate nucleic acid product is specifically amplified. Design of suitable primers and/or probes is within the capability of one skilled in the art. Various primer design tools are freely available to assist in this process such as the NCBI Primer-BLAST tool. Primers and/or probes may be at least 15, 16, 17, 18, 19, 20, 21, 22, 23, 24 or 25 (or more) nucleotides in length. mRNA expression levels may be measured by reverse transcription quantitative polymerase chain reaction (RT-PCR followed with qPCR). RT-PCR is used to create a cDNA from the mRNA. The cDNA may be used in a qPCR assay to produce fluorescence as the DNA amplification process progresses. By comparison to a standard curve, qPCR can produce an absolute measurement such as number of copies of mRNA per cell. Northern blots, microarrays, Invader assays, and RT-PCR combined with capillary electrophoresis have all been used to measure expression levels of mRNA in a sample.

Multiplex RNA quantitation using molecular barcoding, also referred to herein as multiplex RNA quantitation using nanoreporters, is an RNA analysis technique developed by Nanostring Technologies, Inc. in which RNA molecules are tagged or "barcoded" then to form "nanostrings" which are then affixed to a capture surface which is analyzed for the presence and quantity of specific RNA molecules. Examples of the technology are shown in U.S. Pat. Nos. 9,714,446; 10,246,700; 10,077,466; 8,492,094; 8,519,115; 8,986,926; 9,371,563; 9,920,380; and 9,856,519, for example, each of which is expressly incorporated herein by reference in its entirety;

RNA-SEQ uses next-generation sequencing to measure changes in gene expression. RNA may be converted into cDNA or directly sequenced. Next generation sequencing techniques include pyrosequencing, SOLID sequencing. Ion Torrent semiconductor sequencing. Illumina dye sequencing, single-molecule real-time sequencing or DNA nanoball sequencing.

In situ RNA detection involves detecting RNA without extraction from tissues and cells. In situ RNA detection includes In situ hybridization (ISH) which uses a labeled (e.g. radio labelled, antigen labelled or fluorescence labelled) probe (complementary DNA or RNA strand) to localize a specific RNA sequence in a portion or section of tissue, or in the entire tissue (whole mount ISH), or in cells. The probe labeled with either radio-, fluorescent- or antigen-labeled bases (e.g., digoxigenin) may be localized and quantified in the tissue using either autoradiography, fluorescence microscopy or immunohistochemistry, respectively. ISH can also use two or more probes to simultaneously detect two or more transcripts. A branched DNA assay can also be used for RNA in situ hybridization assays with single molecule sensitivity. This approach includes ViewRNA assays. Samples (cells, tissues) are fixed, then treated to allow RNA target accessibility (RNA un-masking). Target-specific probes hybridize to each target RNA. Subsequent signal amplification is predicated on specific hybridization of adjacent probes (individual oligonucleotides that bind side by side on RNA targets). A typical target-specific probe contains, for example, 40 oligonucleotides. Signal amplification is achieved via a series of sequential hybridization steps. A pre-amplifier molecule hybridizes to each oligo pair on the target-specific RNA, then multiple amplifier molecules hybridize to each pre-amplifier. Next, multiple label probe oligonucleotides (conjugated to an enzyme such as alkaline phosphatase or directly to fluorophores) hybridize to each amplifier molecule. Separate but compatible signal amplification systems enable multiplex assays.

The signal can be visualized by measuring fluorescence or light emitted depending upon the detection system employed. Detection may involve using a high content imaging system, or a fluorescence or brightfield microscope in some embodiments.

Thus, further embodiments of the present disclosure include kits for (in situ) characterizing and/or prognosing prostate cancer in a subject comprising one or more oligonucleotide probes specific for an RNA product of at least one of CDC45, CENPI, CLSPN, ERCC6L, EXO1, NCAPG, BUB1B, CDK1, E2F7, GSG2, NUSAP1, RAD51, and RRM2. The kit may further comprise one or more of a blocking probe, a preamplifier, an amplifier and/or a label molecule. The components of the kit may be nucleic acid-based molecules, optionally DNA (or RNA). The blocking probe is a molecule that acts to reduce background signal by binding to sites on the target not bound by the target specific probes (probes specific for the RNA product of the at least one gene of the disclosure). The preamplifier is a molecule capable of binding to a (a pair of) target specific probe(s) when target bound. The amplifier is a molecule capable of binding to the preamplifier. Alternatively, the amplifier may be capable of binding directly to a (a pair of) target specific probe(s) when target bound. The amplifier has binding sites for multiple label molecules (which may be label probes). In certain embodiments, the present disclosure may include using the kit for characterizing and/or prognosing prostate cancer.

RNA expression may be determined by hybridization of RNA to a set of probes. The probes may be arranged in a flow cell, on a capture surface, on a test strip or in an array. Microarray platforms include those manufactured by companies such as Affymetrix, Illumina, and Agilent.

The probes may also be incorporated into the kits of the present disclosure. The probe sequences may also be used in order to design primers for detection of expression, for example by RT-PCR. Such primers may also be included in the kits of the present disclosure.

The methods described herein may further comprise extracting total nucleic acid or RNA from the sample. Suitable methods are known in the art and include use of commercially available kits such as Rneasy and GeneJET RNA purification kit.

The sample for testing may comprise, consist essentially of, or consist of prostate cells or portions of such cells such as exosomes or vesicles. The sample for testing may comprise, consist essentially of, or consist of prostate cancer (tumor) cells or portions of such cells such as exosomes or vesicles. The sample may be obtained by any suitable technique. Examples include a biopsy procedure, optionally a fine needle aspirate biopsy procedure, or tissue from a prostate gland excised during radical prostatectomy or other surgical procedure. Body fluid samples may also be utilized to collect samples of circulating cells or portions thereof. Examples of such fluids include but are not limited to blood (whole blood, serum, and/or plasma), urine, and semen.

The methods of the disclosure may comprise selecting a treatment for prostate cancer in a subject and optionally performing the treatment. In certain embodiments if the characterization of and/or prognosis for the prostate cancer is an increased likelihood of recurrence and/or metastasis and/or a poor prognosis, the treatment selected may be one or more of an anti-hormone treatment, a cytotoxic agent, a biologic, radiotherapy, targeted therapy, cryotherapy, and surgery.

By anti-hormone treatment (a.k.a., hormone therapy, or androgen deprivation therapy (ADT)) is meant a form of treatment which reduces the level and/or activity of selected hormones, in particular testosterone, or the level of and activity of androgen receptor. The hormones may promote tumor growth and/or metastasis. Examples of such treatments include but are not limited to a luteinizing hormone blocker, such as goserelin (also called Zoladex), buserelin, leuprorelin (also called Prostap), histrelin (Vantas) and triptorelin (also called Decapeptyl), a gonadotrophin release hormone (GnRH) blocker such as degarelix (Firmagon) or an anti-androgen such as flutamide (also called Drogenil) and bicalutamide (also called Casodex), bicalutamide and/or abiraterone, and MDV3100 (enzalutamide).

The cytotoxic agent may be a platinum-based agent and/or a taxane. In specific embodiments the platinum-based agent is selected from cisplatin, carboplatin and oxaliplatin. The taxane may be paclitaxel, cabazitaxel or docetaxel. The cytotoxic agent may also be a vinca alkaloid, such as vinorelbine or vinblastine. The cytotoxic agent may be a topoisomerase inhibitor such as etoposide or an anthracycline (antibiotic) such as doxorubicin. The cytotoxic agent may be an alkylating agent such as estramustine.

By biologic is meant a medicinal product that is created by a biological process. A biologic may be, for example, a vaccine, blood or blood component, cells, gene therapy, tissue, or a recombinant therapeutic protein. Optionally the biologic is an antibody and/or a vaccine.

In certain embodiments the radiotherapy is extended radiotherapy, preferably extended-field radiotherapy.

Surgery may comprise radical prostatectomy or TURP. By radical prostatectomy is meant removal of the entire prostate gland, the seminal vesicles and the vas deferens. In further embodiments surgery comprises tumor resection i.e. removal of all or part of the tumor.

By targeted therapy is meant treatment using targeted therapeutic agents which are directed towards a specific drug target for the treatment of prostate cancer. In specific embodiments this may mean inhibitors directed towards targets such as PARP, AKT, MET, VEGFR, etc. PARP inhibitors are a group of pharmacological inhibitors of the enzyme poly ADP ribose polymerase (PARP). Several forms of cancer are more dependent on PARP than regular cells, making PARP an attractive target for cancer therapy. Examples include iniparib, olaparib, rucaparib, veliparib, CEP 9722, MK 4827, BMN-673 and 3-aminobenzamide, AKT, also known as Protein Kinase B (PKB), is a serine/threonine-specific protein kinase that plays a key role in multiple cellular processes such as glucose metabolism, apoptosis, cell proliferation, transcription and cell migration. AKT is associated with tumor cell survival, proliferation, and invasiveness. Examples of AKT inhibitors include VQD-002, Perifosine, Miltefosine and AZD5363. MET is a proto-oncogene that encodes hepatocyte growth factor receptor (HGFR). The hepatocyte growth factor receptor protein possesses tyrosine-kinase activity. Examples of kinase inhibitors for inhibition of MET include K252a, SU11274, PHA-66752, ARQ197, Foretinib, SGX523 and MP470. MET activity can also be blocked by inhibiting the interaction with HGF. Many suitable antagonists including truncated HGF, anti-HGF antibodies and uncleavable HGF are known. VEGF receptors are receptors for vascular endothelial growth factor (VEGF). Various inhibitors are known such as lenvatinib, motesanib, pazopanib and regorafenib.

Embodiments of the present disclosure further include a system or test kit for characterizing and/or prognosing prostate cancer, or response to a specific prostate cancer therapy in a subject, comprising: a) one or more testing devices for determining the expression level of at least one of CDC45, CENPI, CLSPN, ERCC6L, EXO1, NCAPG, BUB1B, CDK1, E2F7, GSG2, NUSAP1, RAD51, and RRM2 in a sample from the subject, (b) a processor; and (c) storage medium comprising a computer application that, when executed by the processor, is configured to: (i) access and/or calculate the determined expression levels of the at least one of CDC45, CENPI, CLSPN, ERCC6L, EXO1, NCAPG, BUB1B, CDK1, E2F7, GSG2, NUSAP1, RAD51, and RRM2 in the sample on the one or more testing devices, (ii) calculate whether there is an increased or decreased level of the at least one of CDC45, CENPI, CLSPN, ERCC6L, EXO1, NCAPG, BUB1B, CDK1, E2F7, GSG2, NUSAP1, RAD51, and RRM2 in the sample; and (iii) output from the processor the characterization of and/or prognosis for the prostate cancer.

By testing device is meant a combination of components that allows the expression level of a gene to be determined. The components may include any of those described above with respect to the methods for determining expression level at the level of protein, RNA or epigenetic modification. For example, the components may be antibodies, primers, detection agents and so on. Components may also include one or more of the following: microscopes, microscope slides, x-ray film, radioactivity counters, scintillation counters, spectrophotometers, colorimeters, fluorometers, luminometers, and densitometers. In certain embodiments the system or test kit further comprises a display for the output from the processor.

The disclosure also relates to a computer application or storage medium comprising a computer application as defined above.

Reagents, tools, and/or instructions for performing the methods described herein can be provided in a kit. Such a kit can include reagents for collecting a tissue sample from a patient, such as by biopsy, and reagents for processing the tissue. The kit can also include one or more reagents for performing a expression level analysis, such as reagents for performing nucleic acid amplification, including RT-PCR and qPCR, RNA SEQ, NGS, oligonucleotide probes for multiplex RNA quantitation using molecular barcoding, northern blot, proteomic analysis, or immunohistochemistry to determine expression levels of biomarkers in a sample of a patient. For example, primers for performing RT-PCR, probes for performing northern blot analyses, and/or antibodies or aptamers, as discussed herein, for performing proteomic analysis such as Western blot, immunohistochemistry and ELISA analyses can be included in such kits. Appropriate buffers for the assays can also be included. Detection reagents required for any of these assays can also be included. The kits may be array or PCR based kits for example and may include additional reagents, such as a polymerase and/or dNTPs for example. The kits featured herein can also include instructions describing how to perform the assays for measuring expression levels.

The kit may include one or more primers or primer pairs or oligonucleotide probes complementary to at least one of CDC45, CENPI, CLSPN, ERCC6L, EXO1, NCAPG, BUB1B, CDK1, E2F7, GSG2, NUSAP1, RAD51, and RRM2. The kit may also include one or more primers or primer pairs or oligonucleotide probes complementary to a reference gene. Informational material included in the kits can be descriptive, instructional, marketing or other material that relates to the methods described herein and/or the use of the reagents for the methods described herein. For example, the informational material of the kit can contain contact information, e.g., a physical address, email address, website, or telephone number, where a user of the kit can obtain substantive information about performing a gene expression analysis and interpreting the results. The kit may further comprise a computer application or storage medium as described above.

In the present work, the expression pattern of type 1 transmembrane protein with epidermal growth factor and two follistatin motifs 2 (TMEFF2) in human prostate tissues was investigated and the potential of a TMEFF2 associated gene signature as a biomarker for disease prognosis was explored. It's reported herein that low TMEFF2 expression is associated with decreased disease free survival (DFS) in the Memorial Sloan Kettering Cancer Center (MSKCC) Prostate Oncogenome Project dataset. Using transcriptional profiling of cell lines and publicly available PCa clinical data, low TMEFF2 driven gene signatures of poor clinical outcome, comprising sets of cell cycle related genes with increased gene expression, were identified and were validated in cohorts of prostate cancer patients for disease progression. TMEFF2 is a transmembrane protein whose expression is regulated by androgens, and in the adult is restricted to brain and prostate. A recent report lists TMEFF2 as one of the top 100 mRNA transcripts with the highest levels of inter-tumor variability in primary PCa tissues. We hypothesized that molecular subtypes of primary prostate cancers may exist that have gene expression patterns associated with changes in the expression of these highly variable genes. Prior studies in PCa have demonstrated a role of TMEFF2 as a tumor suppressor, inhibiting allograft growth, and functioning as a metabolic regulator of one-carbon metabolism, and cell motility. Furthermore, studies using limited numbers of clinical samples, revealed changes in the expression of TMEFF2 with disease stage in PCa and gliomas, supporting a role of TMEFF2 in these diseases. In an alternate embodiment of the disclosure, low expression of TMEFF2 and/or of circulating TMEFF2 ectodomain in a sample as defined herein, wherein low expression is defined as expression of the gene or protein product below a predetermined threshold level, can be used as a biomarker for aggressive prostate cancer disease, or another cancer as described herein.

The results disclosed herein not only provide new insights into the clinical relevance of TMEFF2 in cancer, but also specify groups of cell cycle related proteins as prognostic and therapeutic targets.

EXAMPLES

Certain novel embodiments of the present disclosure, having now been generally described, will be more readily understood by reference to the following examples, which are included merely for purposes of illustration of certain aspects and embodiments of the present disclosure, and are not intended to be limiting. The following examples are to be construed, as noted above, only as illustrative, and not as limiting of the present disclosure in any way whatsoever. Those skilled in the art will promptly recognize appropriate variations from the various compositions, structures, components, procedures and methods.

Experimental Data

Materials and Methods

Mammalian Cell Culture and Treatment

The LNCaP and 22Rv1 cell lines were purchased from American Type Culture Collection (ATCC) and maintained in Dulbecco's modified eagle medium (DMEM) and RPMI respectively, supplemented with 10% FBS, 2 mmol/L of L-glutamine and 100 units/mL penicillin-streptomycin at 37° C. in a humidified atmosphere containing 5% $CO_2$. Dihydrotestosterone was used at a concentration of 10 nM. For TMEFF2 knockdown, LNCaP and 22Rv1 cells were transduced with pLKO.1 lentiviral vectors with antisense TMEFF2 sequences shTMEFF2-0 (TRCN0000073518), shTMEFF2-1 (TRCN0000073519) and shTMEFF2-2 (TRCN0000073521). Knockdown efficiency was assayed using immunoblotting and quantitative PCR. For cell cycle analysis, cells were synchronized by treatment with Aphidicolin at a final concentration of 2 g/ml for 24 hours. Flow cytometric analysis was performed as described in (Chen X, Overcash R, Green T, et al: The tumor suppressor activity of the transmembrane protein with epidermal growth factor and two follistatin motifs 2 (TMEFF2) correlates with its ability to modulate sarcosine levels. J Biol Chem 286:16091-100, 2011) from cells released from the drug at the indicated timepoints, using a FACSCalibur device (BD Biosciences) and the ModFit LT V4.1.7 software.

Western Blotting

LNCaP cell expressing sh_TMEFF2 or the sh_scramble control were grown for 24 hrs in hormone deplete media and stimulated with 10 nM DHT (or ethanol as vehicle control) for an additional 24 hrs before harvesting. Cell lysates were prepared in RIPA buffer containing a protease inhibitor mixture. Western blot analysis was conducted as described before, using the following antibodies: TMEFF2 (Sigma HPA015587) at a 1:1000 dilution; AR (Santa Cruz Biotechnology, Inc) at a 1:1000 dilution; and Calnexin (Abcam) at a dilution of 1:4000.

Real-Time Polymerase Chain Reaction (RT-PCR)

Total RNA was extracted with RNeasy mini kit (Qiagen) and cDNA was synthesized with iScript™ Reverse Transcription Supermix for RT-qPCR (BioRad). Quantitative RT-PCR (qRT-PCR) was performed using the SsoAdvanced™ Universal SYBR R; Green (BioRad), and gene specific primers on the Biorad CFX96™ Touch Real-Time PCR Detection System. Calnexin was used as normalization control. All RT-PCR experiments were performed using three biological replicates.

RNA Extraction and RNA-Seq

LNCaP cell expressing shTMEFF2 or the shRNA scramble control were grown for 24 hrs in hormone deplete media and stimulated with 10 nM DHT (or ethanol as vehicle control) for an additional 24 hrs prior to harvesting for RNA extraction. Each sample was run in triplicate. Total RNA was extracted with RNeasy mini kit (Qiagen) and cDNA was synthesized with SuperScript III First-Strand synthesis system (Life Technologies). RNA integrity and quantity was assessed using the Agilent Bioanalyzer. Raw 75 bp paired-end sequences were generated from an Illumina NextSeq 500 sequencer. Sequenced reads first underwent quality control with the FASTQC tool and then aligned to a contaminant genome to filter out reads which align to human ribosomal RNA, poly-A, poly-C, phiX virus or mitochondrial DNA sequence. The filtered reads were trimmed using Trimmomatic, as well as read clipping based on quality over a sliding window, retaining reads with a minimum length of 15 bp. Trimmed, filtered reads were pseudoaligned to the human reference transcriptome (version GRCh38) using kallisto version 0.42.3, with enabled bias correction and 50 bootstrapping rounds. Expression values for 173259 unique transcripts were measured and transcripts with an average of 5 count per million (CPM) or less across all samples were removed from further analysis. To perform differential expression analysis (LNCaP-shTMEFF2 vs. LNCaP-shRNA scramble control). CPM values were summarized at the gene level and normalized with the R packages and DESeq2 to identify significantly differentially expressed genes (DEGs) with fold change≥1.5 and FDR-adjusted p-value≤0.05.

Expression Data

TMEFF2 mRNA expression in benign and malignant samples of PCa was interrogated using Oncomine Compendium of Expression Array data (Rhodes D R, Yu J, Shanker K, et al: ONCOMINE: a cancer microarray database and integrated data-mining platform. Neoplasia 6:1-6, 2004). We selected the following cohorts: Varambally et al. (n=19; GSE3325; Varambally S, Yu J, Laxman B, et al: Integrative genomic and proteomic analysis of prostate cancer reveals signatures of metastatic progression. Cancer Cell 8:393-406, 2005), Vanaja et al. (n=40); Vanaja D K, Cheville J C, Iturria S J, et al: Transcriptional silencing of zinc finger protein 185 identified by expression profiling is associated with prostate cancer progression. Cancer Res 63:3877-82, 2003), Grasso et al. (n=122; GSE35988; Grasso C S, Wu Y M, Robinson D R, et al: The mutational landscape of lethal castration-resistant prostate cancer. Nature 487:239-43, 2012), and Taylor et al. (or MSKCC; n=185; GSE21032; Taylor B S, Schultz N, Hieronymus H, et al: Integrative genomic profiling of human prostate cancer. Cancer Cell 18:11-22, 2010). These last two datasets were also used to interrogate mRNA levels of the genes encompassing the TMCC11 signature (see validation cohorts).

Signature Selection Process

An initial group of 25 genes were identified as significantly upregulated (Log 2 fold change≥1.8, ≤3.1; FDR<0.05) by DHT in the LNCaP-TMEFF2 knockdown cells as compared to control cells (TABLE 1). The HUGO gene nomenclature ID numbers of the 25 initial genes are shown in TABLE 18. From these 25 genes, the 21 top-ranking differentially regulated genes (Log 2 fold change≥2.0) were selected for further downstream knowledge-based validation. cBioPortal (Cerami E, Gao J, Dogrusoz U, et al: The cBio Cancer Genomics Portal: An Open Platform for Exploring Multidimensional Cancer Genomics Data. Cancer Discovery 2:401, 2012) was utilized to interrogate the MSKCC Prostate Project dataset (n=150) for evidence of clinical validation of this subset. Since TMEFF2 mRNA is downregulated in a subset of those patients, 11 genes from the initial cell cycle group whose expression inversely correlate with Tmeff2 (i.e. were upregulated) in at least 4 of those patients, and that maintain a strong functional association as demonstrated using the STRING (Szklarczyk D, Morris J H, Cook H, et al: The STRING database in 2017: quality-controlled protein-protein association networks, made broadly accessible. Nucleic Acids Res 45: D362-d368, 2017) and IPA pathway analyses were selected (TABLE 2). Two other signatures were derived from these results and were used for SigCheck analysis. The TMCC13 is a modified TMCC11 signature including two additional genes, E2F7 and GSG2 (from the TMEFF2 21 top-ranking differentially regulated genes, TABLE 1), selected based on their individual prognostic values, type of expression change in tumor samples (mRNA upregulation) and lack of overlap with genes from the Cuzick signature (Cuzick J, Swanson G P, Fisher G, et al: Prognostic value of an RNA expression signature derived from cell cycle proliferation genes in patients with prostate cancer: a retrospective study. Lancet Oncol 12:245-55, 2011). Another signature subset of TMCC11 designated herein as TMCC3, comprises the CDC45, NCAPG and CLSPN genes and is effective in predicting time to BCR in the Stockholm dataset. For this purpose, the dependence of time to BCR on the signature gene expression was modeled using GLM cox regression, and the search for the best subset relied on elastic net regularization, a standard features selection procedure implemented in the R package glmnet.

TABLE 1

Genes significantly upregulated by DHT in LNCaP-TMEFF2 knockdown cells.

| Gene Symbol | sh_TMEFF2 (+DHT/no DHT) Fold change | FDR | sh_scramble (+DHT/noDHT) Fold change | FDR |
|---|---|---|---|---|
| RP11-382M14.1 | 3.092773377 | 0.000663391 | 2.165563429 | 0.598515374 |
| RUNX2 | 2.515827497 | 0.000249432 | 1.751690394 | 1 |
| MNS1 | 2.390074548 | 5.77E−05 | 1.596859582 | 1 |
| NCAPG | 2.353243381 | 0.000809975 | 1.344868217 | 1 |
| RAD51 | 2.331124269 | 0.001787314 | 1.364654902 | 1 |
| E2F7 | 2.300464846 | 0.000376823 | 1.711779292 | 1 |
| CENPI | 2.298897724 | 0.002238783 | 1.295324973 | 1 |
| RRM2 | 2.207407293 | 0.00142813 | 1.653034558 | 1 |
| GSG2 | 2.171547595 | 0.032705901 | 1.301043815 | 1 |
| CLSPN | 2.141504825 | 0.009864019 | 1.683146651 | 1 |
| HELLS | 2.133141748 | 9.57E−05 | 1.279038318 | 1 |
| CDC45 | 2.130885055 | 0.012661108 | 1.643396628 | 1 |
| EXO1 | 2.106583459 | 0.025610316 | 1.424119278 | 1 |
| NUSAP1 | 2.104325295 | 0.001604695 | 1.223684172 | 1 |
| ERCC6L | 2.103509184 | 0.007160287 | 1.660048505 | 1 |
| RMI2 | 2.071681029 | 0.026784969 | 1.637249724 | 1 |
| CDK1 | 2.037651859 | 0.000155421 | 1.299371971 | 1 |
| CD3EAP | 2.031929741 | 0.007160287 | 1.32711219 | 1 |
| PRIM1 | 2.007661793 | 0.017585389 | 1.458188646 | 1 |
| DSCC1 | 2.002758567 | 0.030999479 | 1.377536916 | 1 |
| BUB1B | 2.000173748 | 0.032103672 | 1.149249659 | 1 |
| WDHD1 | 1.969581694 | 0.010823181 | 1.502685125 | 1 |
| TRIP13 | 1.960781561 | 0.010646515 | 1.325213423 | 1 |
| TCF19 | 1.899936301 | 0.025610316 | 1.461581177 | 1 |
| MCM8 | 1.862494154 | 0.004018069 | 1.57306463 | 1 |

RNA-sequence data showing increased androgen induction of cell cycle related genes in LNCaP cells in which TMEFF2 has been silenced thru shRNA (shTMEFF2) when compared to the cells expressing sh-scramble control.

Patient Categories and Score Development

Patients were divided in two categories (high and low) based on the TMCC11 gene signature, by calculating the mean expression over all the genes in the signature for each sample. The distribution for the population was calculated, and samples were included in the high group when their mean fell within the upper tertile (above the $67^{th}$ percentile) and in the low group when below the $67^{th}$ percentile.

Validation Cohorts

The following four prostate cancer cohorts, with available gene expression and follow-up data, were used in this study to establish the prognostic value of the TMCC11 signature: MSKCC (Taylor et al., 2010, op cit.); Cambridge (CAM, Ross-Adams H, Lamb A D, Dunning M J, et al: Integration of copy number and transcriptomics provides risk stratification in prostate cancer: A discovery and validation cohort study. EBioMedicine 2:1133-44, 2015) and Stockholm (STO, Ross-Adams, 2015, op, cit.), are microarray datasets, and the TCGA PRAD (TCGA Research Network: cancergenome.nih.gov), a RNA sequencing (RNA Seq) cohort of prostate adenocarcinomas. Cancer samples for all cohorts were from radical prostatectomy specimens. Disease recurrence was the follow-up endpoint. Clinical and histopathological data of the cohorts are listed in TABLE 3 below.

Databases and Statistics

The following databases/platform were used during this study: cBioportal, Oncomine, the R2 genomic analysis and visualization platform (r2. amc.nl); the STRING database; and SurvExpress (Aguirre-Gamboa R, Gomez-Rueda H, Martinez-Ledesma E, et al: SurvExpress: An Online Biomarker Validation Tool and Database for Cancer Gene Expression Data Using Survival Analysis. PLOS ONE 8: e74250, 2013). The parameters used are referenced in the corresponding figure legends if applicable. For publicly available microarray or RNA-Seq expression data sets, the normalized expression data was downloaded from the Oncomine, the cBioportal or the R2 databases.

Data analysis was performed by non-parametric Wilcoxon multiple comparison test or Student t-test as indicated in figure legends. Statistical significance was defined as $P<0.05$ unless otherwise stated. Time-to-event outcomes were evaluated using Kaplan-Meyer analysis and survival-time differences compared using the log-rank test. Univariate, multivariate, and C-statistics were used to assess the independent effect of biomarker status on clinical outcome. Univariate hazard ratios and p-values were obtained using the Cox proportional hazard model. Multivariate analysis was performed using the Cox proportional hazard model. A stepwise model selection procedure coupled with Cox proportional hazard model was used to define the final model. The Harrell's method was used to compute the concordance statistics. Covariates included in the multivariate models were Biopsy and/or surgical Gleason score, PSA, pathological T-stage, positive surgical margins and/or extracapsular extension, and were adjusted as follow: Gleason—High ($\geq 4+3$): Low ($\leq 3+4$); PSA—High ($\geq 10$): Low ($<10$); Path Stage—High ($\geq T3$):Low ($\leq T2$); Positive surgical margins-Y:N; Extracapsular extension (ECE)—Y:N. These analyses were conducted using SAS 9.4 and a p-value of less than 0.05 or 0.01 if indicated, was deemed statistically significant.

Gene Signature Analysis With SigCheck

We analyzed the prognostic potential and specificity of the TMCC11 signature using the Bioconductor package SigCheck (Stark R N, J.: SigCheck: Check a gene signature's prognostic performance against random signatures, known signatures, and permuted data/metadata. R package version 2.10.0., 2017). This software allows comparison of a gene signature prognostic performance against random and known gene signatures. In a first analysis, we compared the prognostic power of the TMCC11 gene signature and a total of 253 oncogenic signatures available from literature. The prognostic power of a gene signature was quantified by the log-rank test p-value for the difference between the time to BCR in high versus low risk groups according to overall signature gene expression. Mean expression over all the genes in the signature for each sample was computed and high versus low expression was considered as over or below the 67th percentile respectively. Log-rank P-values for each signature were computed using the Stockholm, Cambridge and MSKCC datasets downloaded from the GEO website. In a second analysis, we comparatively assessed the superiority of the TMCC11 and the other 253 oncogenic signatures against randomly constructed predictors. For each signature under study, 10,000 signatures of the same number genes were selected at random and for each log-rank p-value scores of their predictive power were computed as described above. A bootstrap p-value was then determined as the proportion of random gene signatures scoring better than the original gene signature. Stockholm, Cambridge and MSKCC datasets were also used for this analysis.

Results

TMEFF2 is Expressed in a Subset of Prostate Tumors

It was previously demonstrated that TMEFF2 behaves as a tumor suppressor in prostate cancer cell lines and in allograft mouse models (Chen X, Corbin J M, Tipton G J, et al: The TMEFF2 tumor suppressor modulates integrin expression, RhoA activation and migration of prostate cancer cells. Biochim Biophys Acta 1843:1216-24, 2014; Chen X, Overcash R, Green T, et al: The tumor suppressor activity of the transmembrane protein with epidermal growth factor and two follistatin motifs 2 (TMEFF2) correlates with its ability to modulate sarcosine levels. J Biol Chem 286: 16091-100, 2011; Corbin J M, Overcash R F, Wren J D, et al: Analysis of TMEFF2 allografts and transgenic mouse models reveals roles in prostate regeneration and cancer. Prostate 76:97-113, 2016). The cell growth inhibitory function of TMEFF2 led us to determine the relationship of TMEFF2 expression alterations to the clinicopathologic features of PCa. The pattern and prevalence of the TMEFF2 protein in PCa tissue was evaluated by immunohistochemistry in a series of prostate tumors revealing tumor associated changes in expression. TMEFF2 expression was higher in patients with localized disease as compared to non-tumor samples, but when patients were stratified by tumor stage (pathological T) the percentage of tumor with TMEFF2 stain significantly decreased with more advanced clinical stage of the disease.

Figure 2:
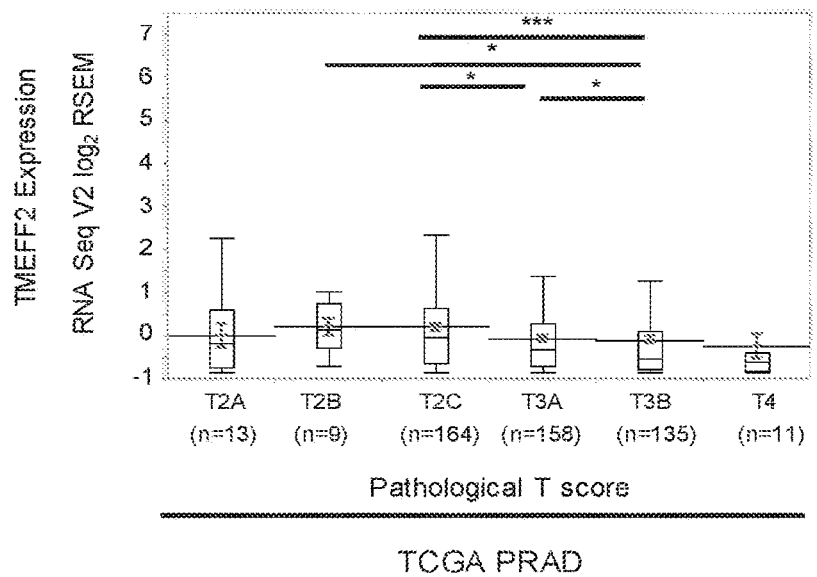
FIG. 2 shows RNA Sequence data from the TCGA PRAD dataset comparing TMEFF2 mRNA expression levels in samples from patients with tumors of different pathological T score. TMEFF2 expression decreases with advanced disease. Expression levels and clinical data retrieved from cBioportal. Expression levels are presented as boxplots and statistical analysis was done using a Wilcoxon multiple comparison test. *$P<0.05$; $P<0.01$; *$P<0.001$; ****$P<0.0001$.
Figure 3:
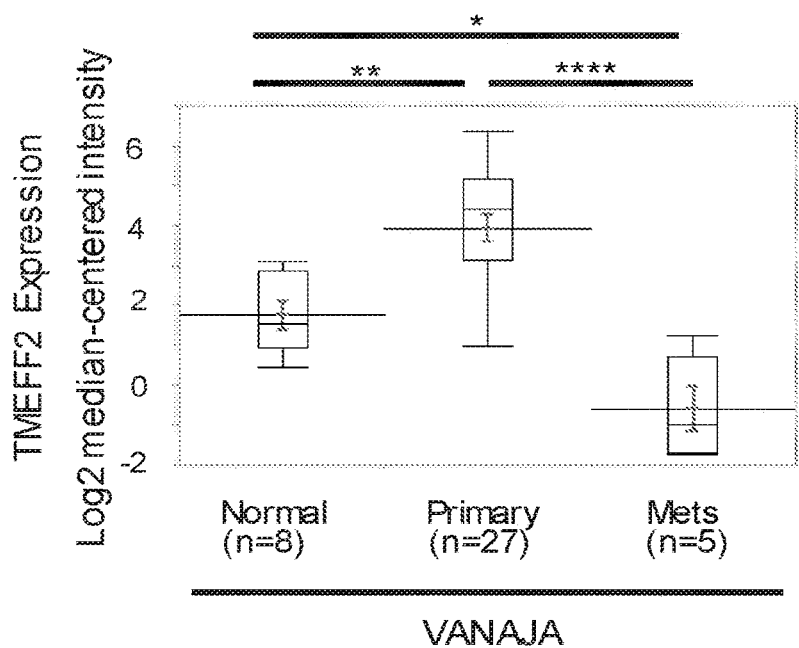
FIG. 3 is a box plot showing TMEFF2 expression levels in normal, primary and metastatic tissue from patients from the Vanaja prostate cancer cohort. Low expression of TMEFF2 is associated with advanced disease (metastatic). Expression levels were obtained from Oncomine and are compared using a Wilcoxon multiple comparison test. *$P<0.05$; $P<0.01$; *$P<0.001$.
Figure 4:
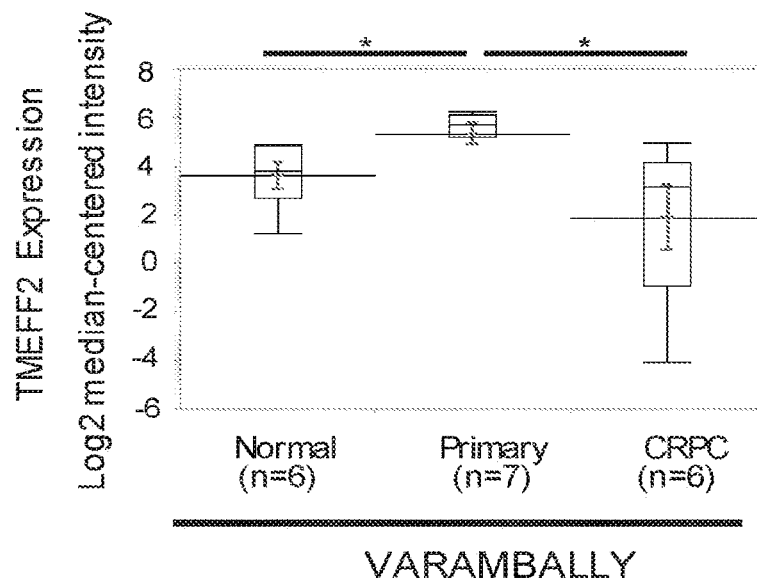
FIG. 4 is a box plot showing TMEFF2 expression levels in normal, primary and castration resistant prostate cancer (CRPC) tissue from patients from the Varambally prostate cancer cohort. Low expression of TMEFF2 is associated with advanced disease (metastatic/CRPC). Expression levels were obtained from Oncomine and are compared using a Wilcoxon multiple comparison test. *$P<0.05$.
Figure 5:
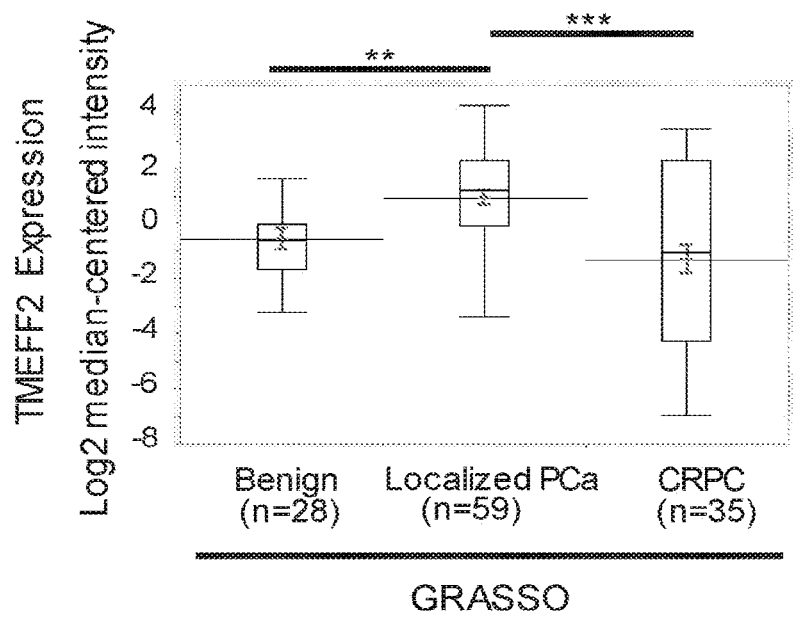
FIG. 5 is a box plot showing TMEFF2 expression levels in normal, primary and metastatic/CRPC tissue from patients from the Grasso prostate cancer cohort. Low expression of TMEFF2 is associated with advanced disease (metastatic/CRPC). Expression levels were obtained from Oncomine and are compared using a Wilcoxon multiple comparison test. $P<0.01$; *$P<0.001$.
Figure 6:
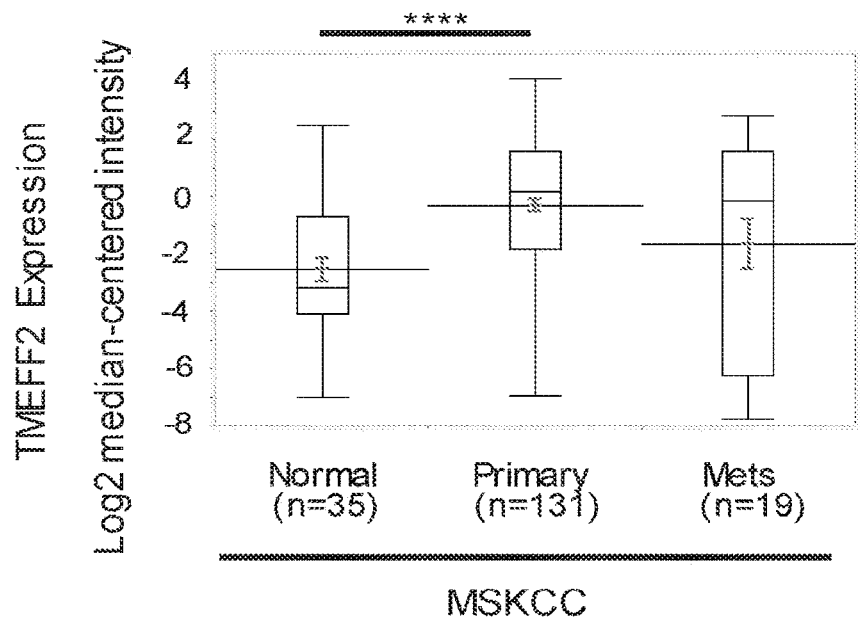
FIG. 6 is a box plot showing TMEFF2 expression levels in normal, primary and metastatic tissue from patients from the MSKCC prostate cancer cohort. While TMEFF2 expression increases in samples from patients with primary tumors, it decreases with advanced disease (metastatic). Expression levels were obtained from Oncomine and are compared using a Wilcoxon multiple comparison test. ****$P<0.0001$.

Supporting these data, analysis of Tmeff2 mRNA expression levels in clinical samples showed decreased expression to be associated with increasing disease burden (i.e. pathological stage and Gleason score) in a set of 150 prostate tumors with mRNA expression data from the Memorial Sloan Kettering Cancer Center (MSKCC) Prostate Oncogenome Project dataset cohort (FIG. 1). Similar results were obtained using patient samples from the Prostate adenocarcinoma cohort from The Cancer Genome Atlas (PRAD-TCGA) (FIG. 2). All together these data are consistent with the tumor suppressor role of TMEFF2.

Low Expression of TMEFF2 is Associated With Advanced Disease and is Prognostic of Clinical Outcome To further examine the clinical significance of TMEFF2 expression, we analyzed expression data of PCa patients samples using Oncomine to identify alterations of Tmeff2 mRNA expression at different stages of prostate tumorigenesis. The expression of Tmeff2 mRNA is significantly increased in the primary tumors of patients with PCa when compared to normal tissue, in multiple independent datasets (FIGS. 3-6). However, in samples from metastases (FIGS. 3 and 6) and CRPC (FIGS. 4 and 5), the levels of TMEFF2 mRNA are either unchanged or decreased compared to normal prostate, and are significantly decreased (P<0.05) when compared to primary tumors. In the Grasso dataset (FIG. 5), a significant downregulation of Tmeff2 mRNA expression in heavily pretreated samples of metastatic castration-resistant prostate cancer (mCRPC) was demonstrated compared with localized PCa. Altogether, these data suggest a negative correlation between Tmeff2 mRNA expression and progression to the advanced stages of PCa.

Figure 7:
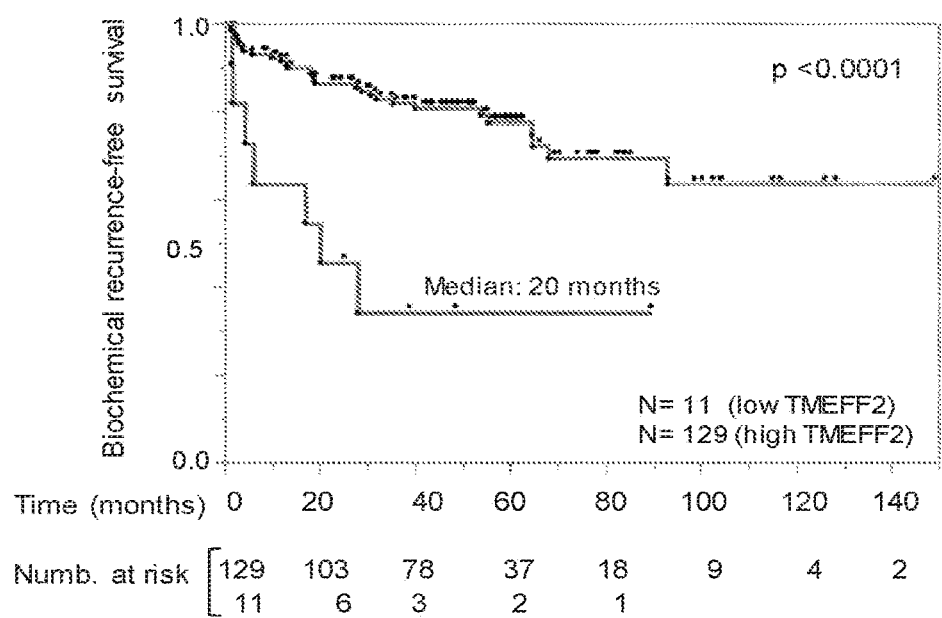
FIG. 7 shows a Kaplan-Meier analysis showing biochemical-relapse free survival of patients from the MSKCC prostate cohort stratified by TMEFF2 expression (n=11; lowest expression in the cohort) vs. the rest of the patients. Patients with low TMEFF2 expression (bottom curve) have poor clinical outcome with a median survival of 20 months.

Based on these observations, we analyzed the MSKCC dataset (TABLE 3 for clinical characteristics of the dataset) to determine the prognostic value of TMEFF2 mRNA expression in PCa. Kaplan-Meier analysis demonstrated a significant ($p<0.0001$) correlation between TMEFF2 levels and disease progression (assessed by biochemical recurrence, BCR). Patients with the lowest TMEFF2 mRNA expression had higher BCR (20 vs. 110 months; FIG. 7).

Figure 10:
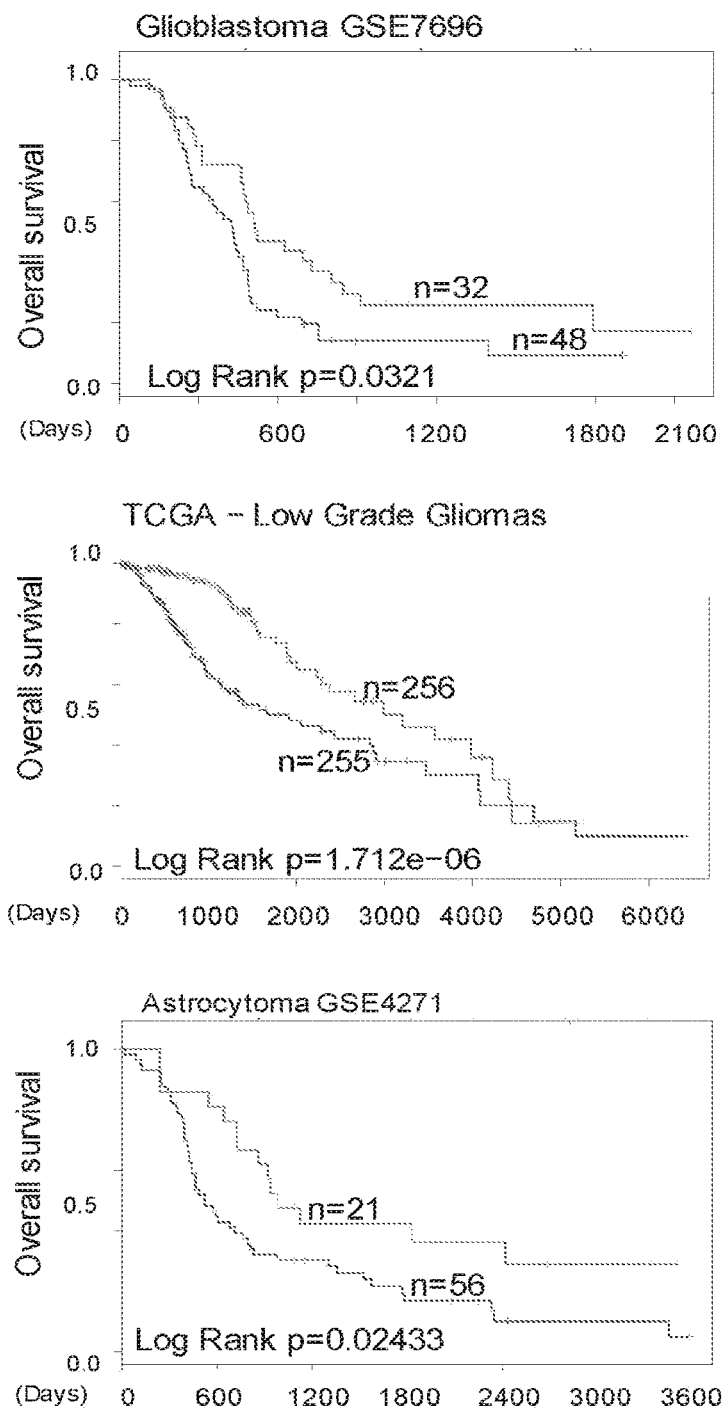
FIG. 10 shows that TMEFF2 expression correlates with overall survival in brain tumors. Kaplan-Meier curves showing overall survival in patients from different brain tumor cohorts stratified by risk. High risk correlates with low TMEFF2 mRNA expression. Data was obtained using the Surv Express database. The lower curve in each graph corresponds to the low TMEFF2 expression group. The upper curve in each graph corresponds to the high TMEFF2 expression group. For each dataset the parameters used for survival analysis were as follows: duplicate gene-average gene probe expression and maximize risk groups. For the TCGA cohort the risk groups were split into two groups of the same size.

In addition to prostate, TMEFF2 is expressed in normal brain and it is downregulated in a subset of brain tumors. Data from several glioma and glioblastoma clinical datasets revealed that low TMEFF2 mRNA is significantly associated with decreased overall survival (OS) for those patients (FIG. 10), supporting published data. All together, these findings underscore the clinical significance of TMEFF2 in cancer.

Figure 8:
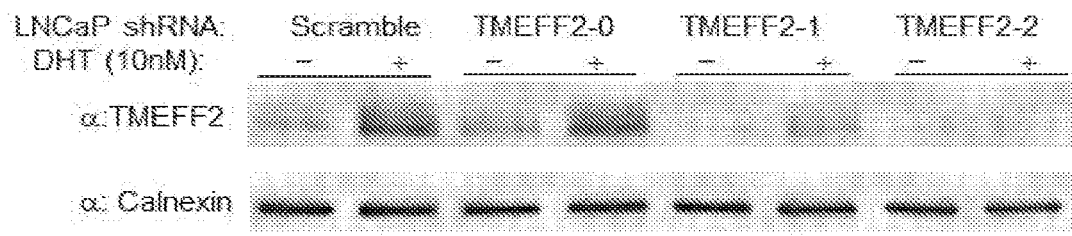
FIG. 8 shows TMEFF2 silencing in PCa cells. A Western Blot analysis is used to determine knockdown of TMEFF2 in LNCaP cells using three different Tmeff2 targeted sh_RNAs. Only sh_TMEFF2-1 and sh_TMEFF2-2 appreciably silenced Tmeff2 expression. Tmeff2 is an androgen regulated gene and therefore respond to dihydrotestosterone (DHT) treatment. Calnexin was used as normalization control.
Figure 11:
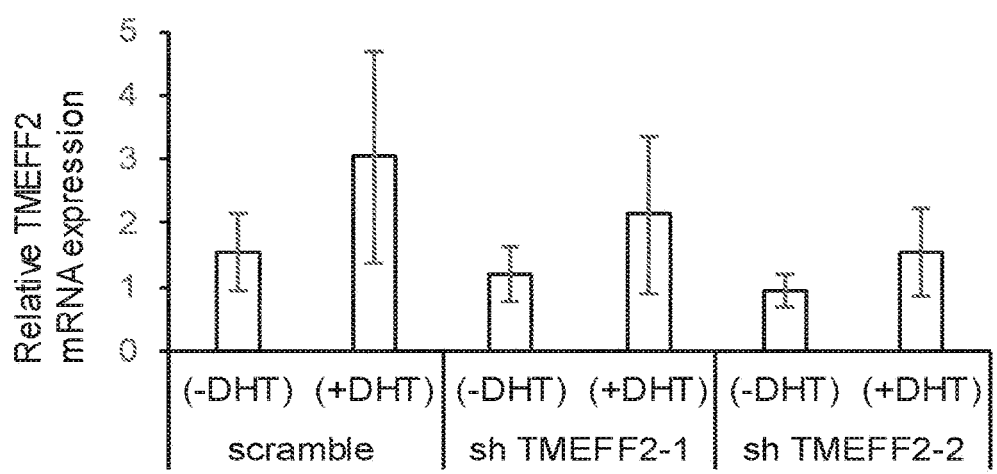
FIG. 11 shows TMEFF2 mRNA levels by qRT-PCR in LNCaP cells transduced with the TMEFF2 silencing shRNAs or the scramble control when grown in the presence or absence of DHT. Tmeff2 is an androgen regulated gene and responds to DHT treatment.
Figure 12:
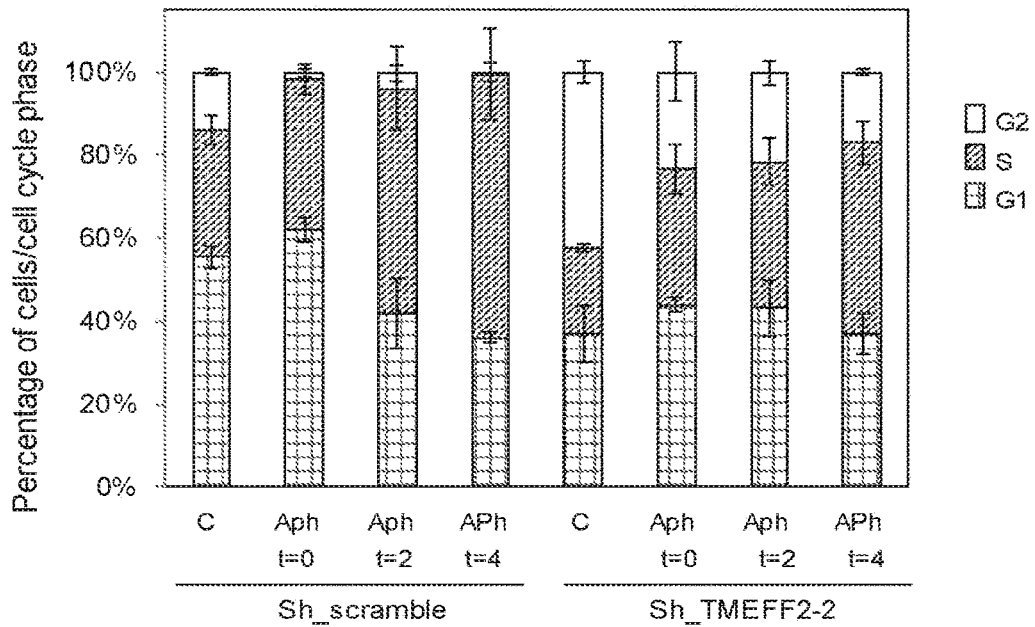
FIG. 12 shows the effect of TMEFF2 silencing on cell cycle progression. Cell cycle analysis of 22Rv1 PCa cells transduced with scramble control or TMEFF2-2 silencing shRNAs. The percentage of cells in each phase of the cycle (G2, S, G1) under the specific treatments is indicated in the Y-axis. C=control (DMSO), Aph=cells treated with aphidicolin (2 g/ml), and released from treatment for the indicated amount of time (t; in hours).
Figure 13A:
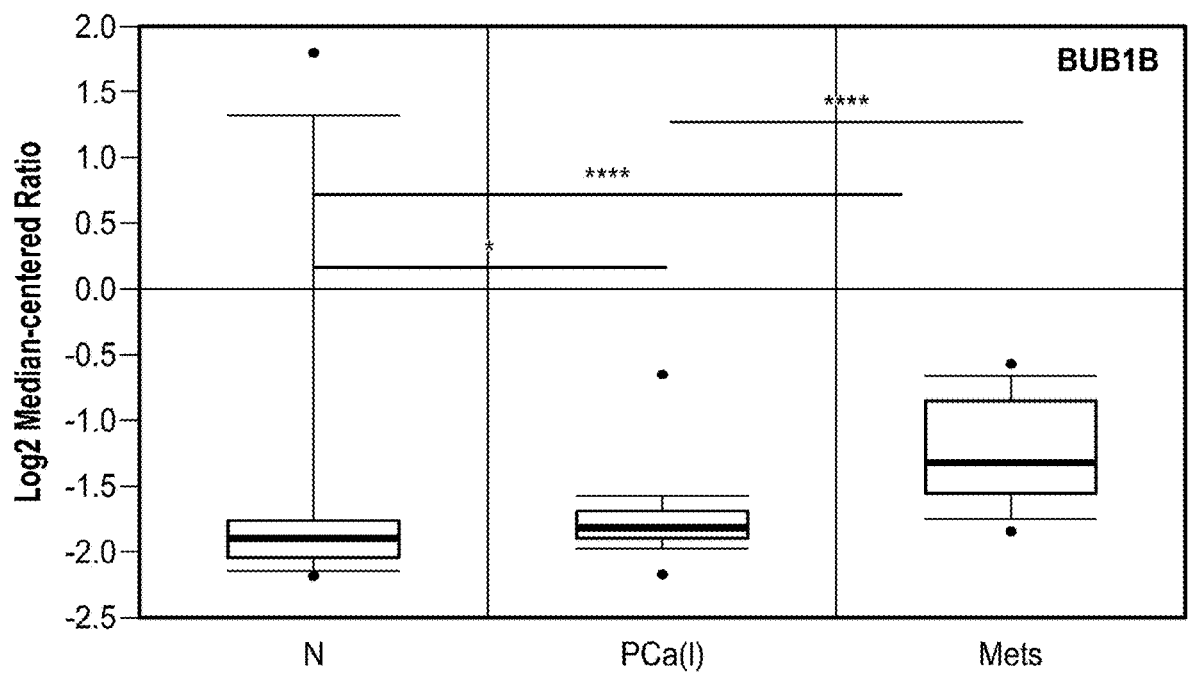
FIG. 13A shows that the individual TMCC11 signature genes are highly expressed in metastatic prostate cancer. Expression levels of the BUB1B and CDC45 mRNA in benign, localized and metastatic prostate samples from patients from the PCa MSKCC dataset. N: normal. PCa(l): localized PCa, Mets: Metastatic PCa. Expression levels are presented as boxplots and statistical analysis was done using a Wilcoxon multiple comparison test. Data obtained from the Oncomine database. *P<0.05; P<0.01; **P<0.0001.
Figure 13A:
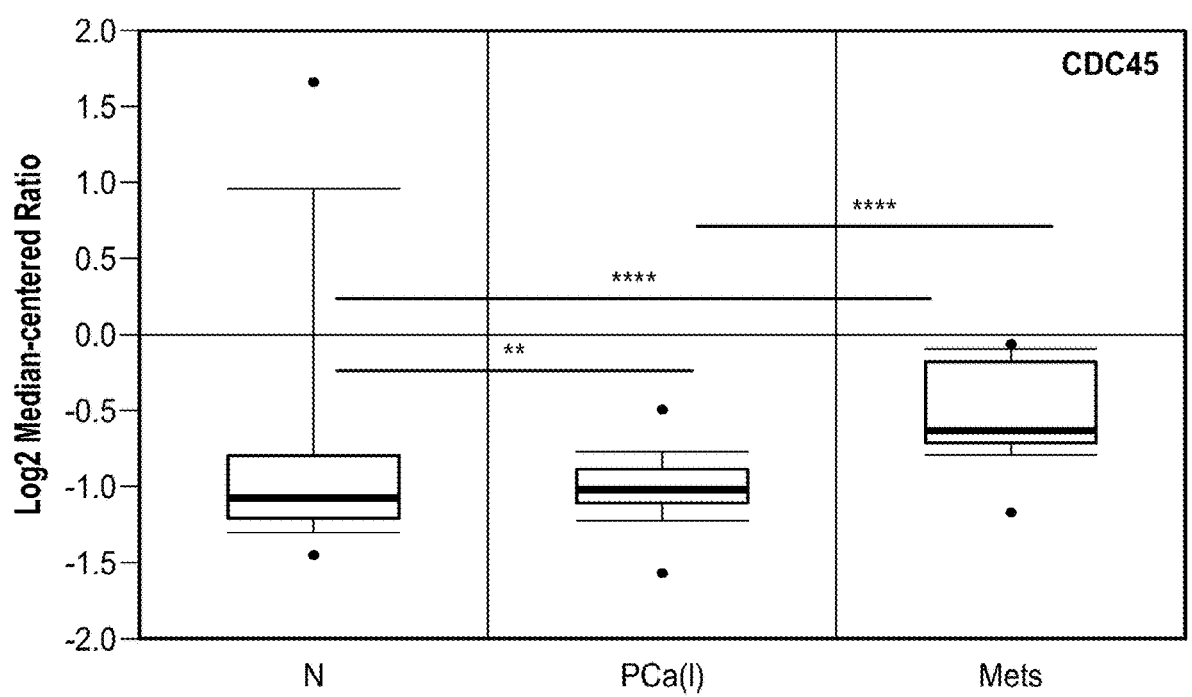
Figure 13B:
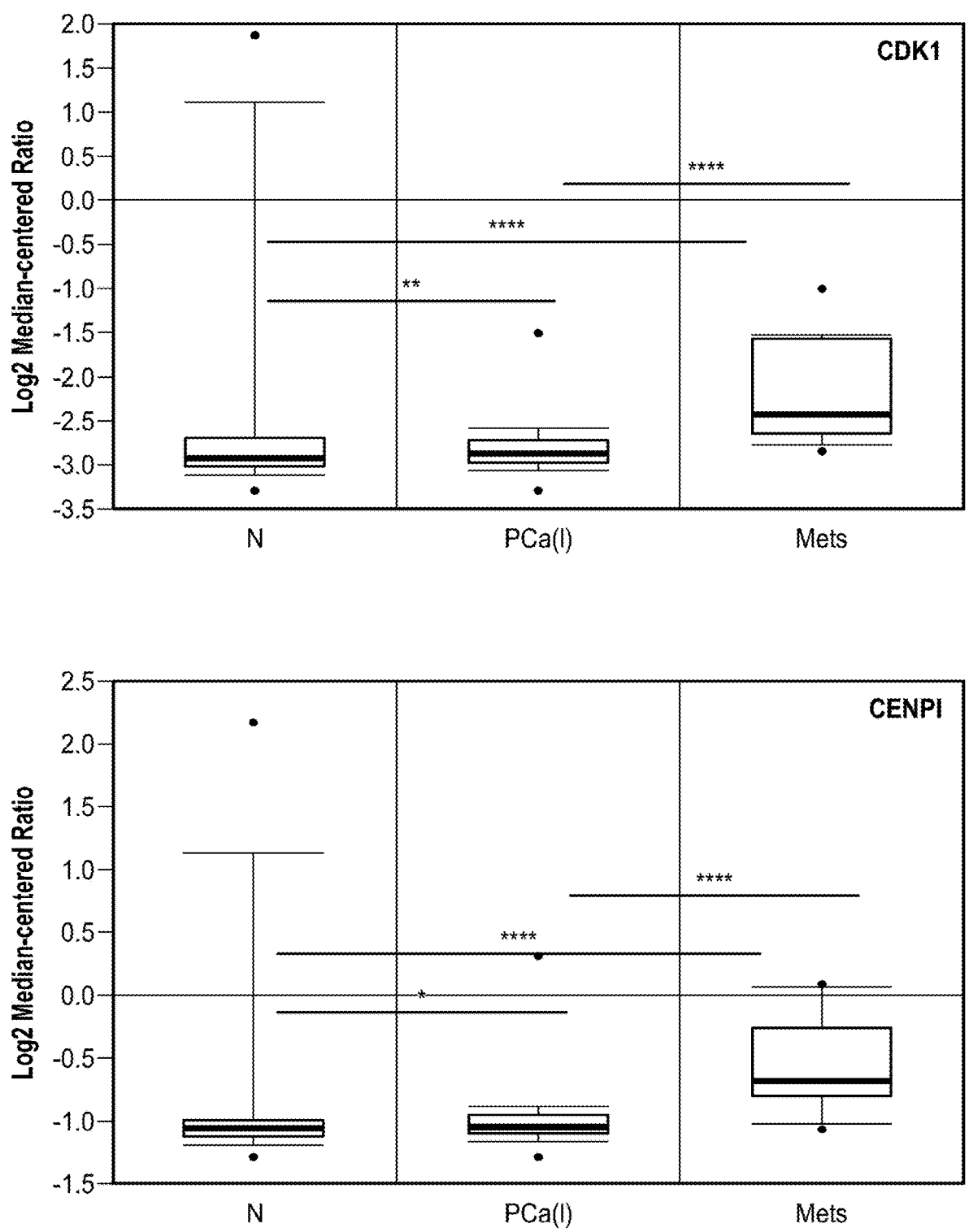
FIG. 13B shows that the individual TMCC11 signature genes are highly expressed in metastatic prostate cancer. Expression levels of the CDK1 and CENPI mRNA in benign, localized and metastatic prostate samples from patients from the PCa MSKCC dataset. N: normal, PCa(l): localized PCa, Mets: Metastatic PCa. Expression levels are presented as boxplots and statistical analysis was done using a Wilcoxon multiple comparison test. Data obtained from the Oncomine database. *P<0.05; P<0.01; **P<0.0001.
Figure 13C:
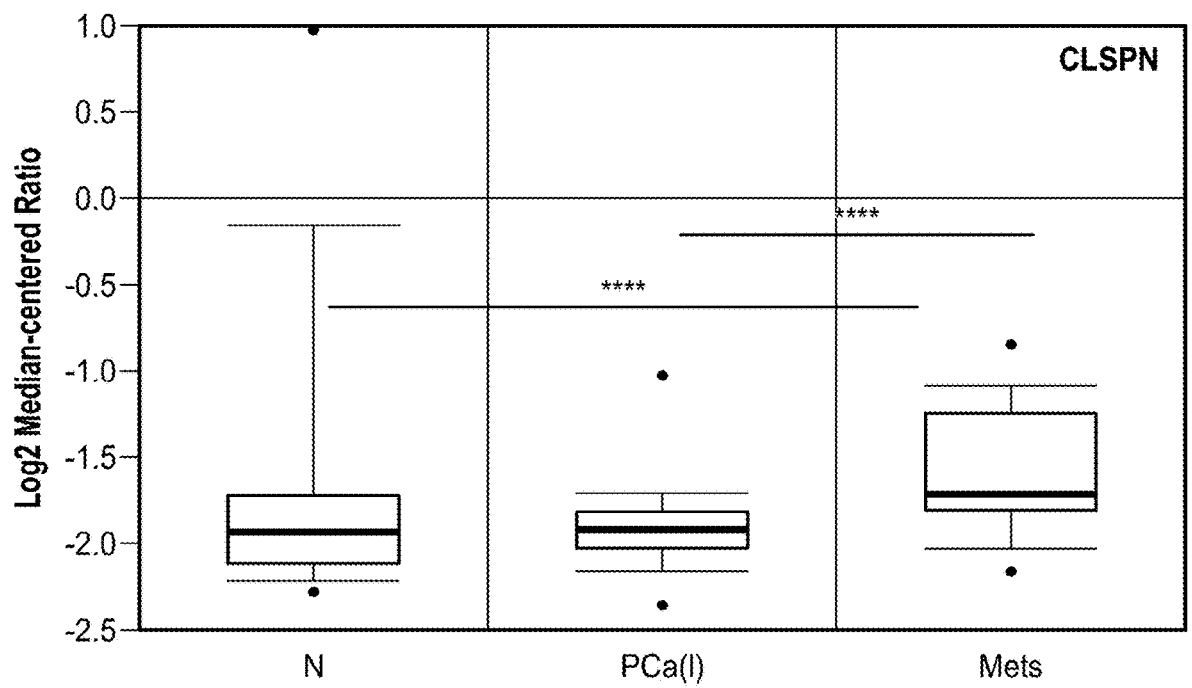
FIG. 13C shows that the individual TMCC11 signature genes are highly expressed in metastatic prostate cancer. Expression levels of the CLSPN and ERCC6L mRNA in benign, localized and metastatic prostate samples from patients from the PCa MSKCC dataset. N: normal, PCa(l): localized PCa, Mets: Metastatic PCa. Expression levels are presented as boxplots and statistical analysis was done using a Wilcoxon multiple comparison test. Data obtained from the Oncomine database. *P<0.05; ****P<0.0001.
Figure 13C:
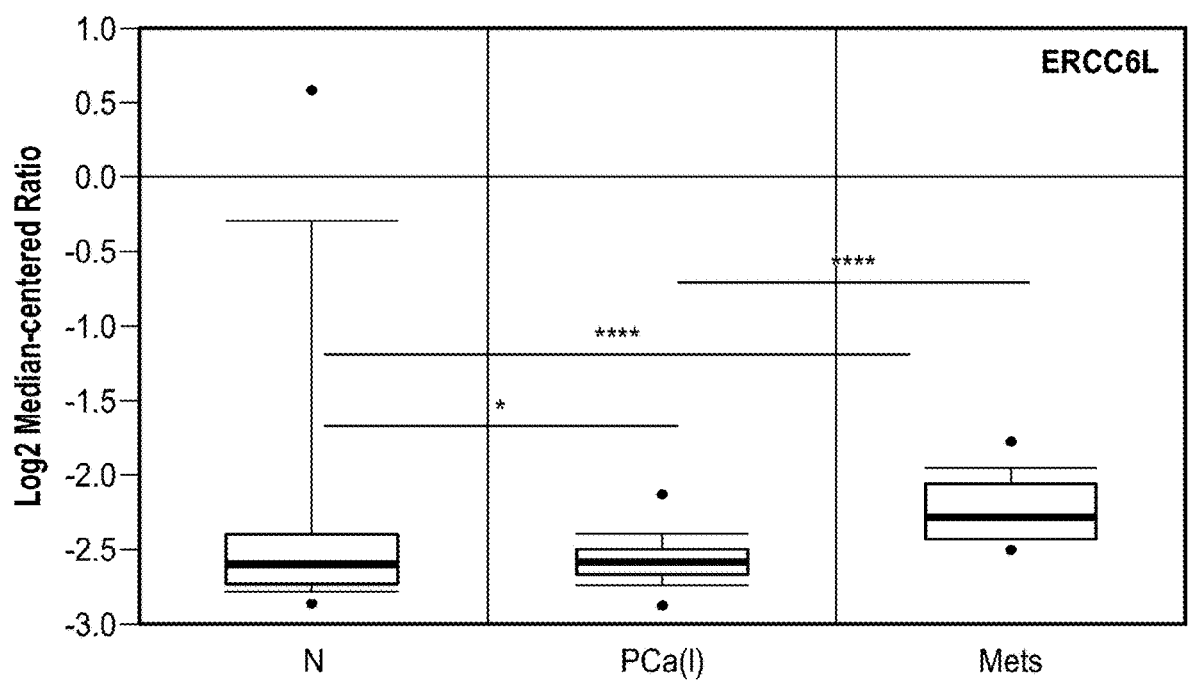
Figure 13D:
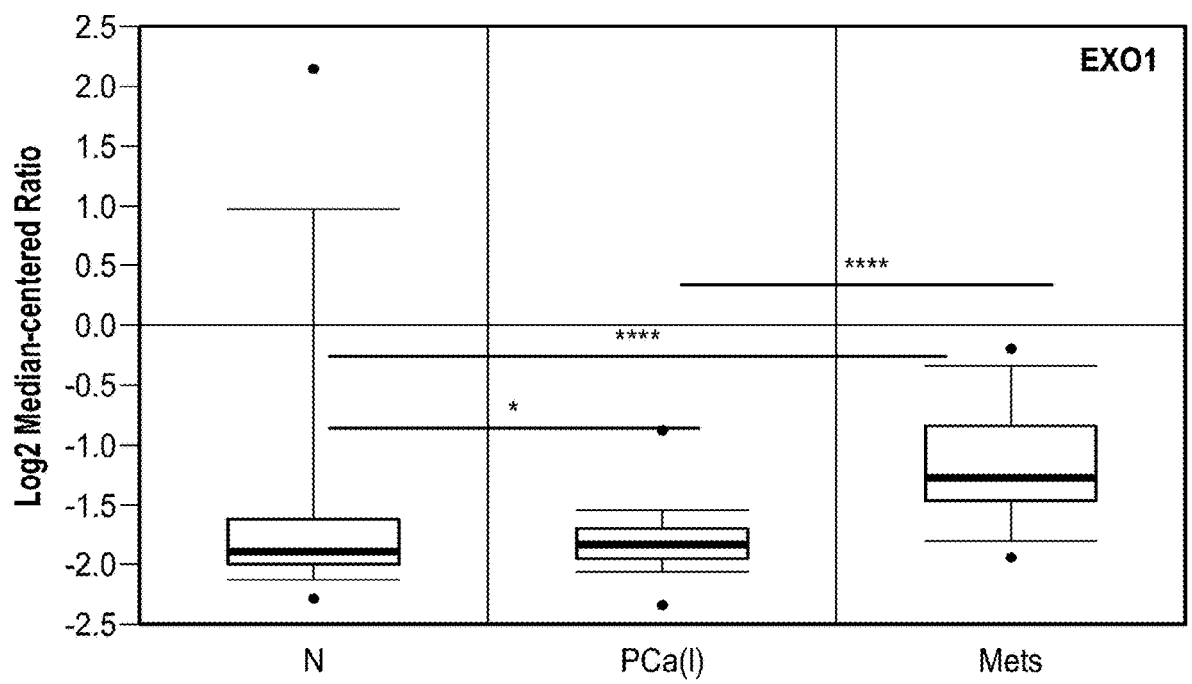
FIG. 13D shows that the individual TMCC11 signature genes are highly expressed in metastatic prostate cancer. Expression levels of the EXO1 and NCAPG mRNA in benign, localized and metastatic prostate samples from patients from the PCa MSKCC dataset. N: normal, PCa(l): localized PCa, Mets: Metastatic PCa. Expression levels are presented as boxplots and statistical analysis was done using a Wilcoxon multiple comparison test. Data obtained from the Oncomine database. *P<0.05; ****P<0.0001.
Figure 13D:
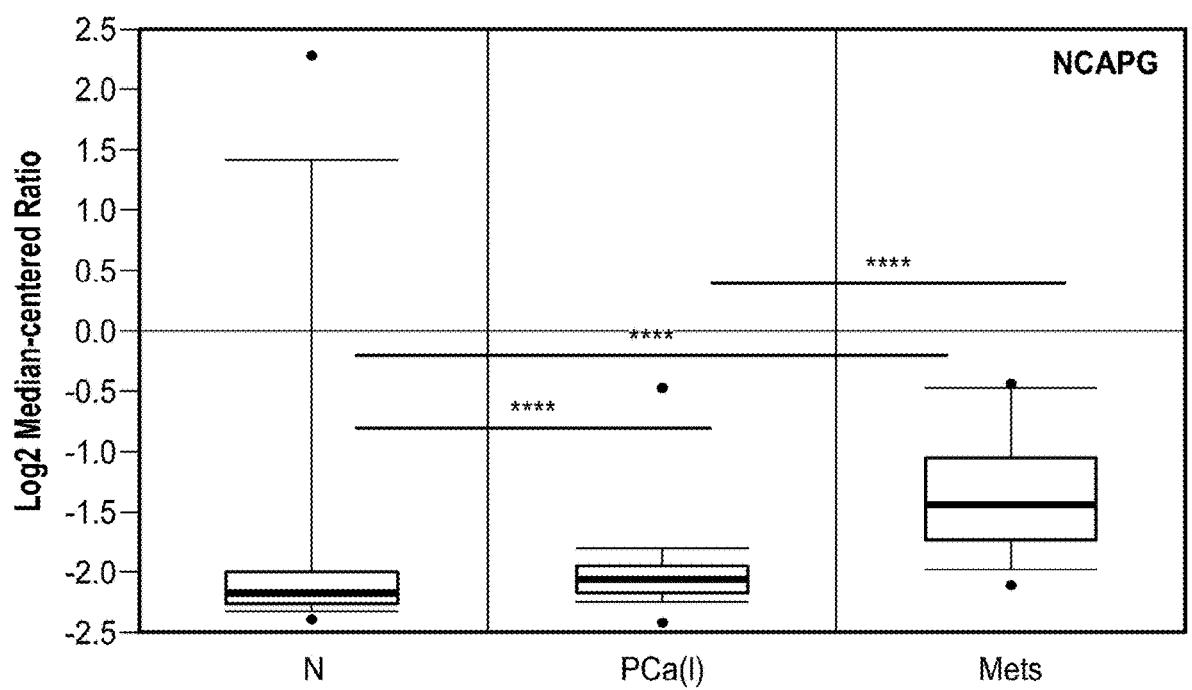
Figure 13E:
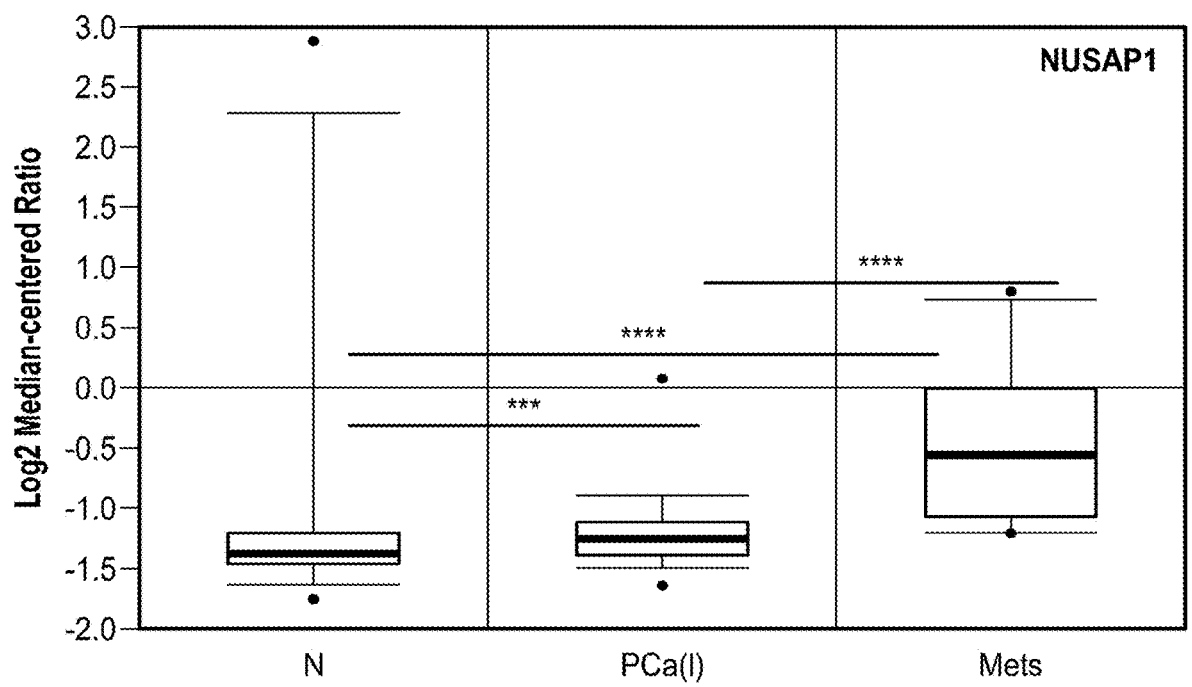
FIG. 13E shows that the individual TMCC11 signature genes are highly expressed in metastatic prostate cancer. Expression levels of the NUSAP1 and RAD51 mRNA in benign, localized and metastatic prostate samples from patients from the PCa MSKCC dataset. N: normal, PCa(l): localized PCa, Mets: Metastatic PCa. Expression levels are presented as boxplots and statistical analysis was done using a Wilcoxon multiple comparison test. Data obtained from the Oncomine database. *P<0.001; **P<0.0001.
Figure 13E:
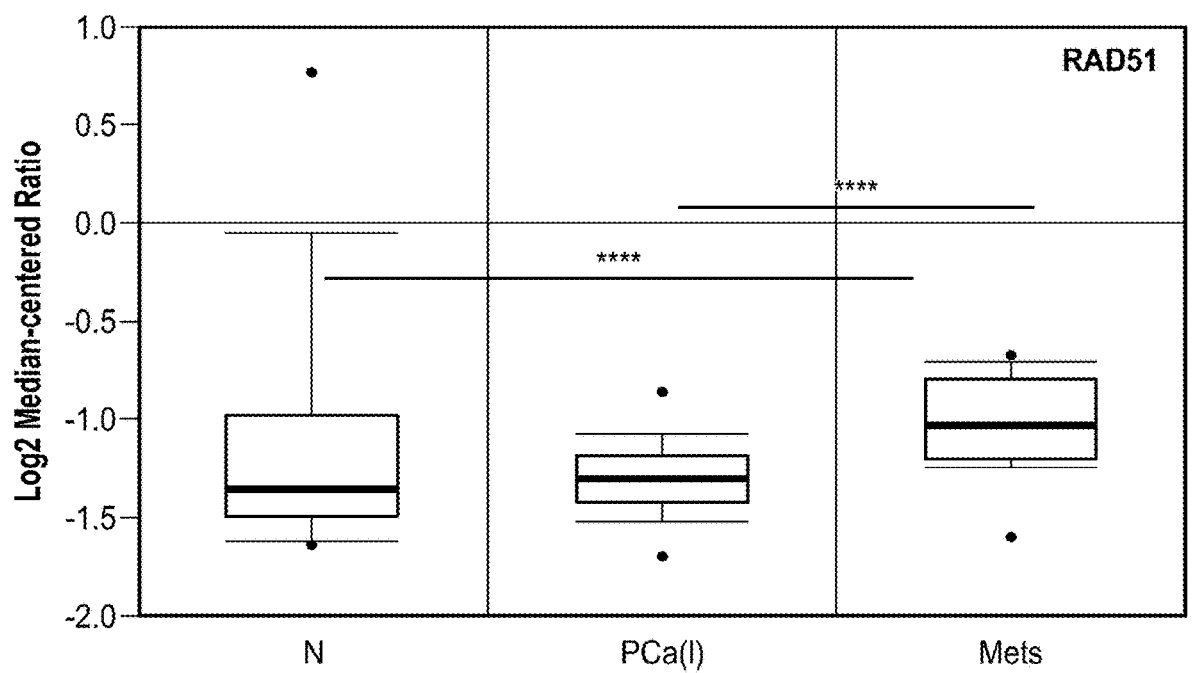
Figure 13F:
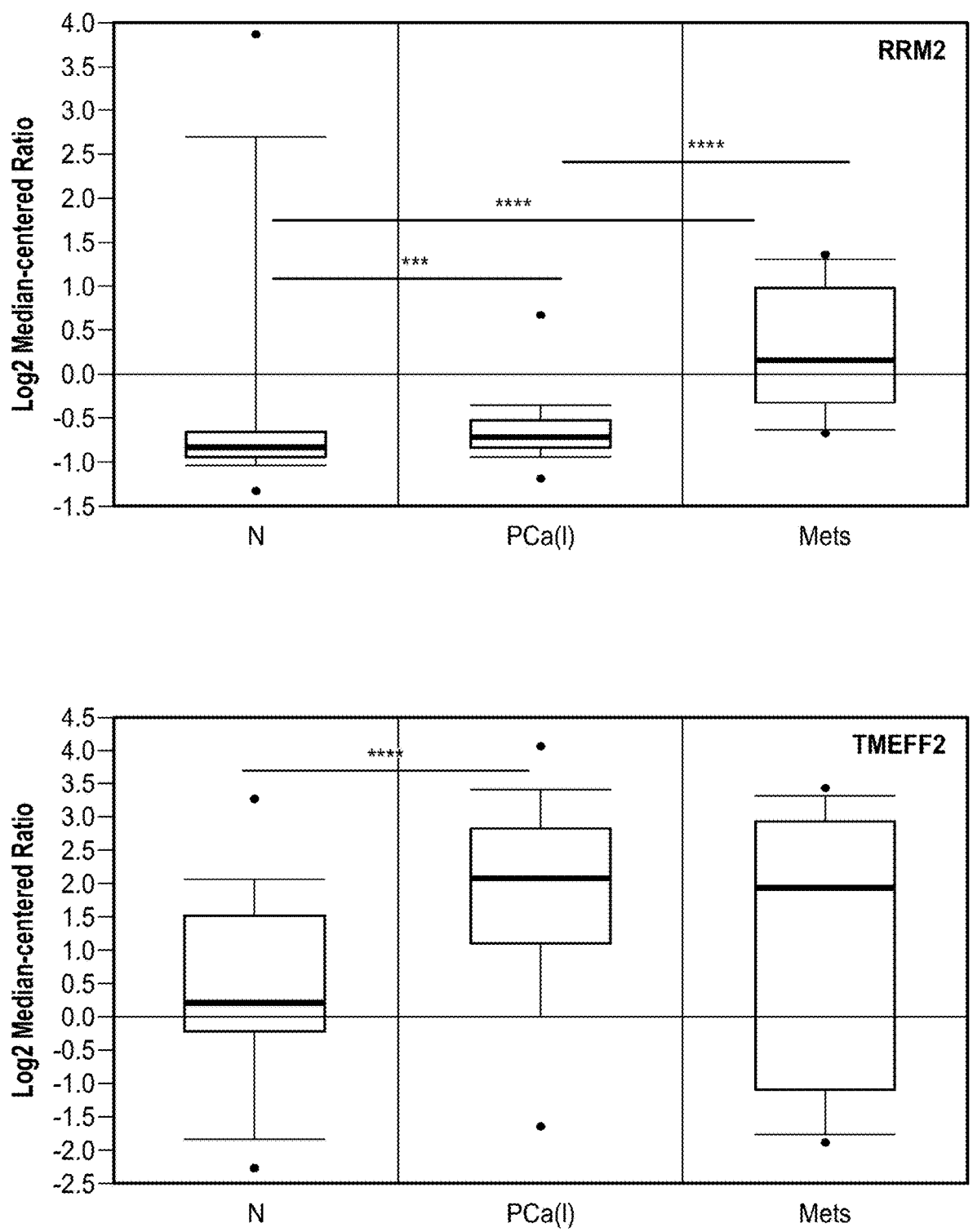
FIG. 13F shows that the individual TMCC11 signature genes are highly expressed in metastatic prostate cancer. Expression levels of the RRM2 mRNA in benign, localized and metastatic prostate samples from patients from the PCa MSKCC dataset. Expression of the TMEFF2 mRNA is shown in the bottom graph as control. N: normal, PCa(l): localized PCa, Mets: Metastatic PCa. Expression levels are presented as boxplots and statistical analysis was done using a Wilcoxon multiple comparison test. Data obtained from the Oncomine database. *P<0.001; **P<0.0001.
Figure 14A:
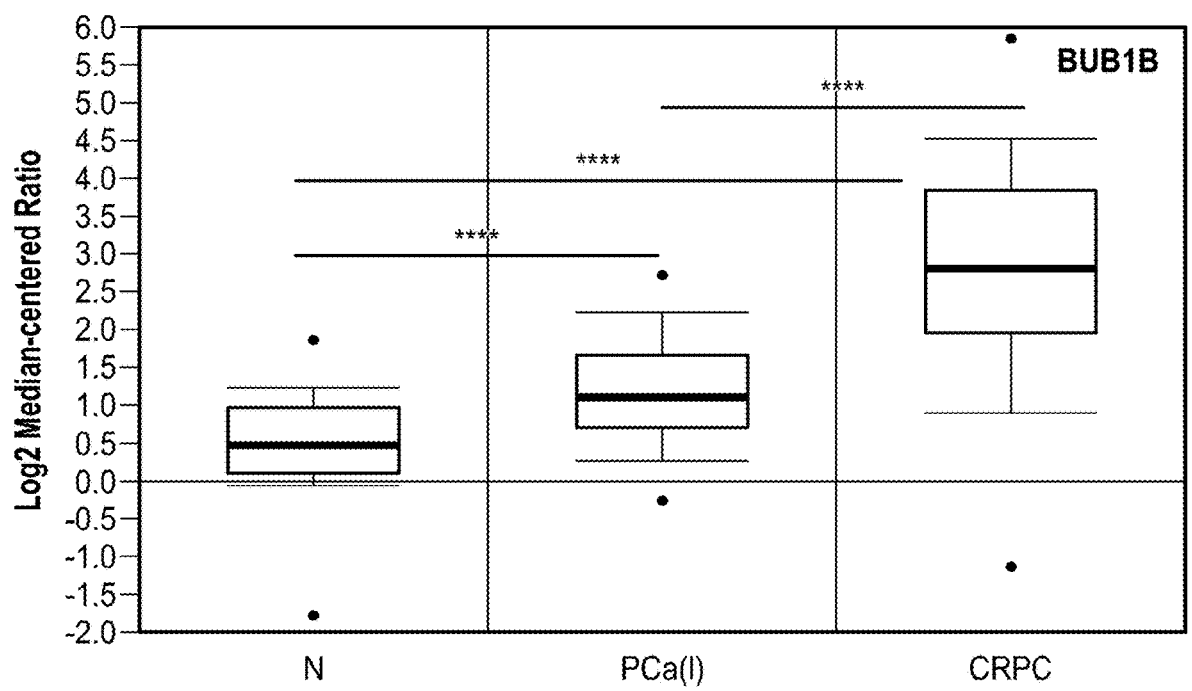
FIG. 14A shows that the individual TMCC11 signature genes are highly expressed in metastatic CRPC prostate cancer. Expression levels of the BUB1B and CDC45 mRNA in benign, localized and metastatic CRPC prostate samples from patients from the PCa Grasso dataset. N: normal, PCa(l): localized PCa, CRPC: Castration resistant PCa. Expression levels are presented as boxplots and statistical analysis was done using a Wilcoxon multiple comparison test. Data obtained from the Oncomine database. P<0.01; **P<0.0001.
Figure 14A:
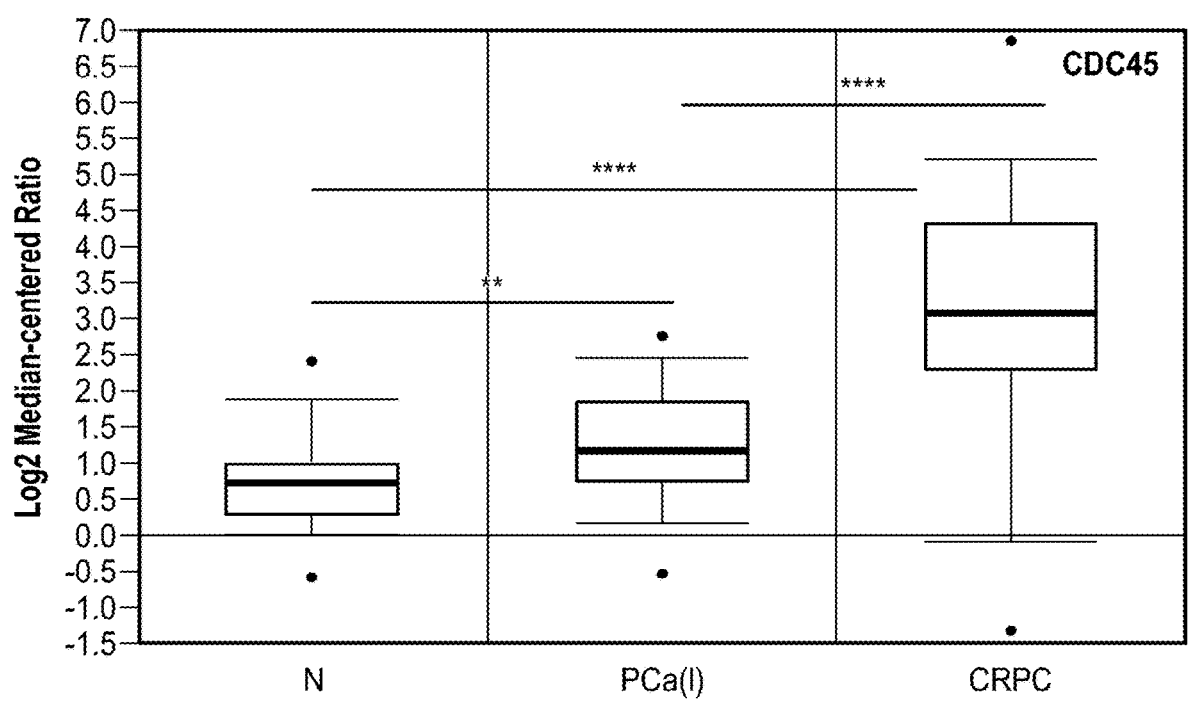
Figure 14B:
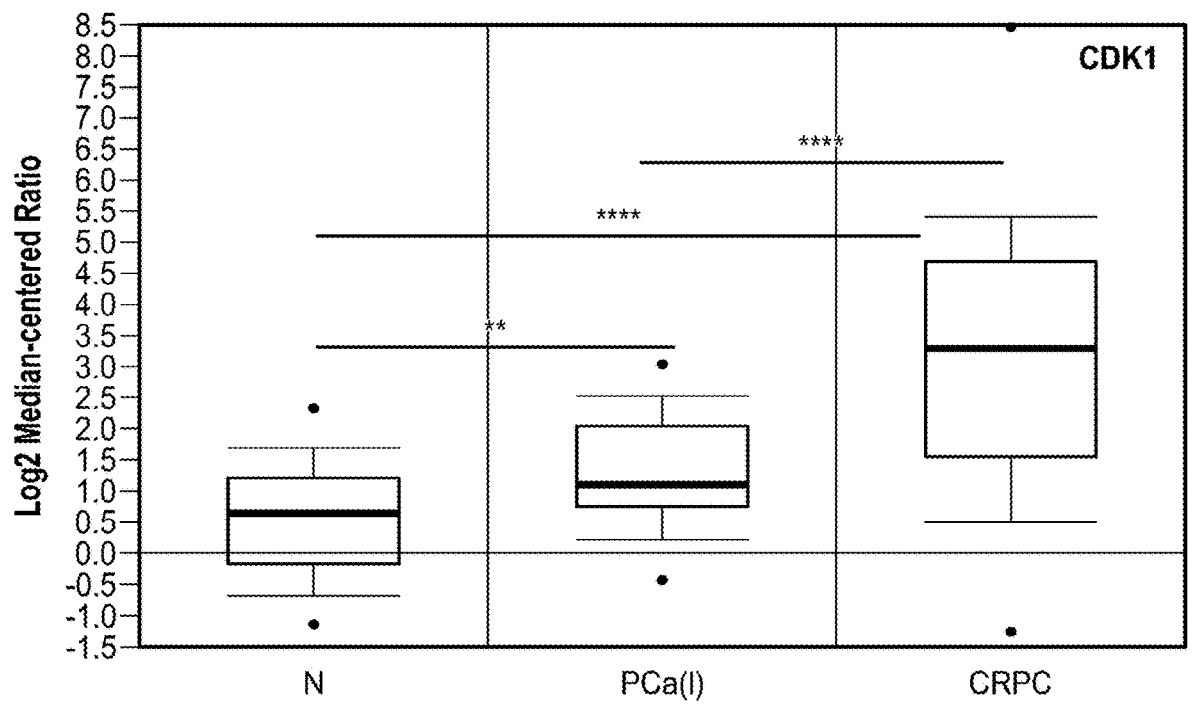
FIG. 14B shows that the individual TMCC11 signature genes are highly expressed in metastatic CRPC prostate cancer. Expression levels of the CDK1 and CENPI mRNA in benign, localized and metastatic CRPC prostate samples from patients from the PCa Grasso dataset. N: normal, PCa(l): localized PCa, CRPC: Castration resistant PCa. Expression levels are presented as boxplots and statistical analysis was done using a Wilcoxon multiple comparison test. Data obtained from the Oncomine database. P<0.01; **P<0.0001.
Figure 14B:
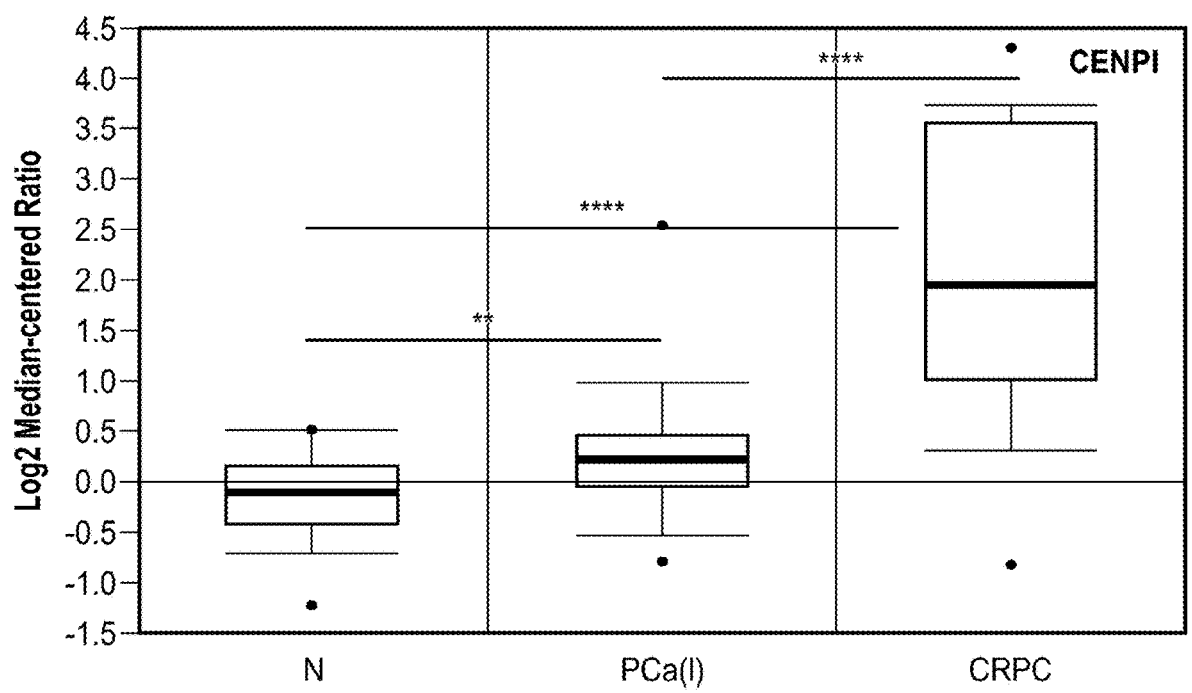
Figure 14C:
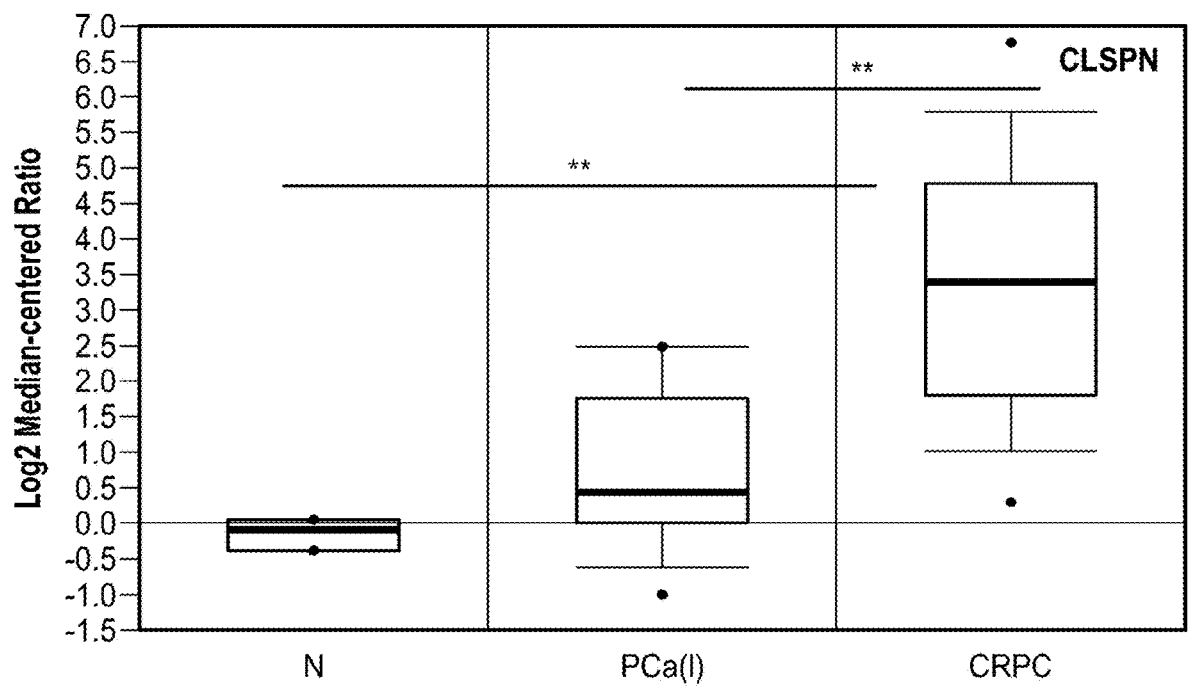
FIG. 14C shows that the individual TMCC11 signature genes are highly expressed in metastatic CRPC prostate cancer. Expression levels of the CLSPN and EXO1 mRNA in benign, localized and metastatic CRPC prostate samples from patients from the PCa Grasso dataset. N: normal, PCa(l): localized PCa, CRPC: Castration resistant PCa. Expression levels are presented as boxplots and statistical analysis was done using a Wilcoxon multiple comparison test. Data obtained from the Oncomine database. P<0.01; **P<0.0001.
Figure 14C:
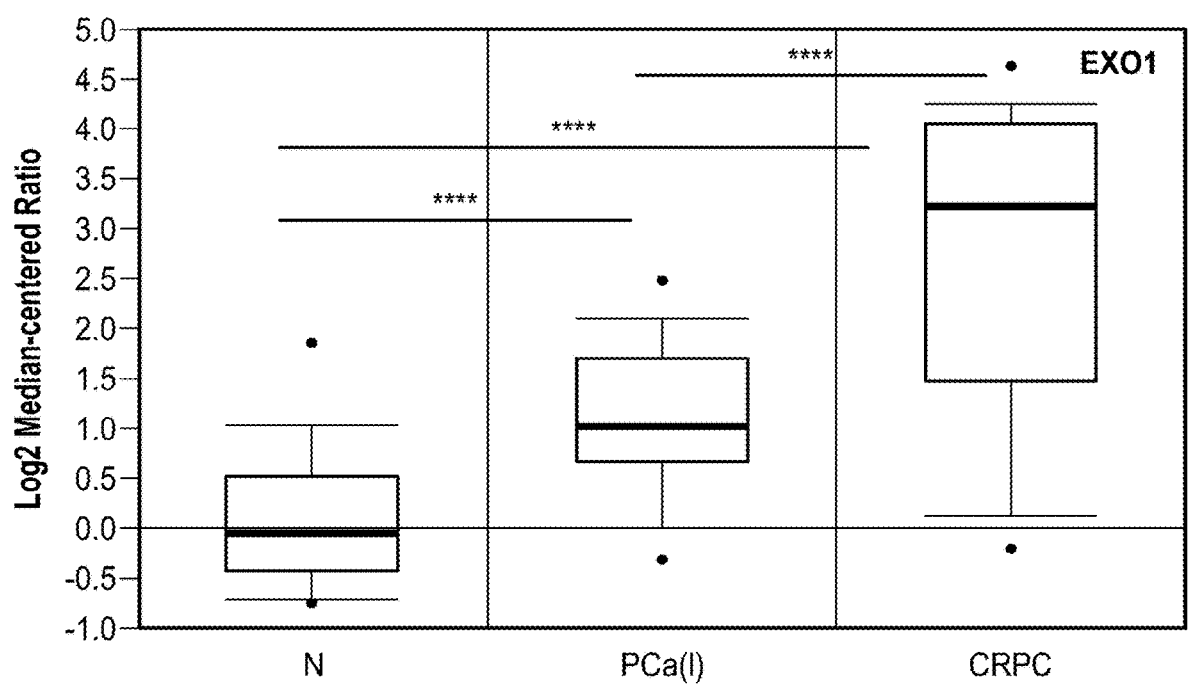
Figure 14D:
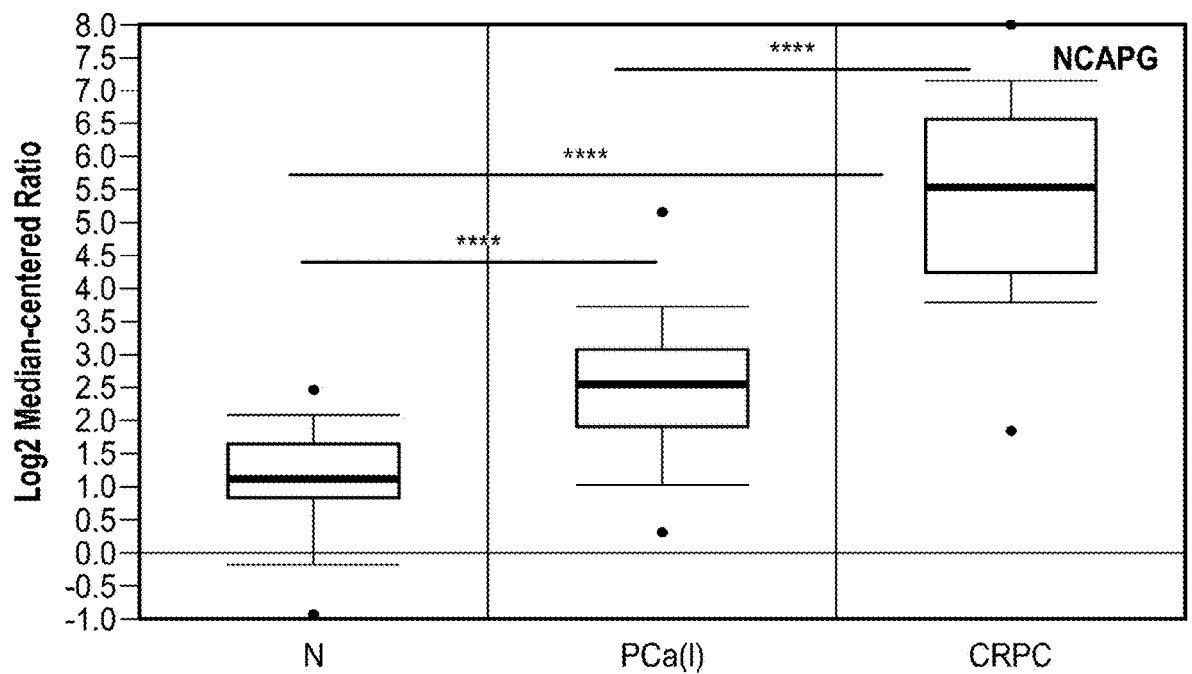
FIG. 14D shows that the individual TMCC11 signature genes are highly expressed in metastatic CRPC prostate cancer. Expression levels of the NCAPG and NUSAP1 mRNA in benign, localized and metastatic CRPC prostate samples from patients from the PCa Grasso dataset. N: normal, PCa(l): localized PCa, CRPC: Castration resistant PCa. Expression levels are presented as boxplots and statistical analysis was done using a Wilcoxon multiple comparison test. Data obtained from the Oncomine database. *P<0.001; **P<0.0001.
Figure 14D:
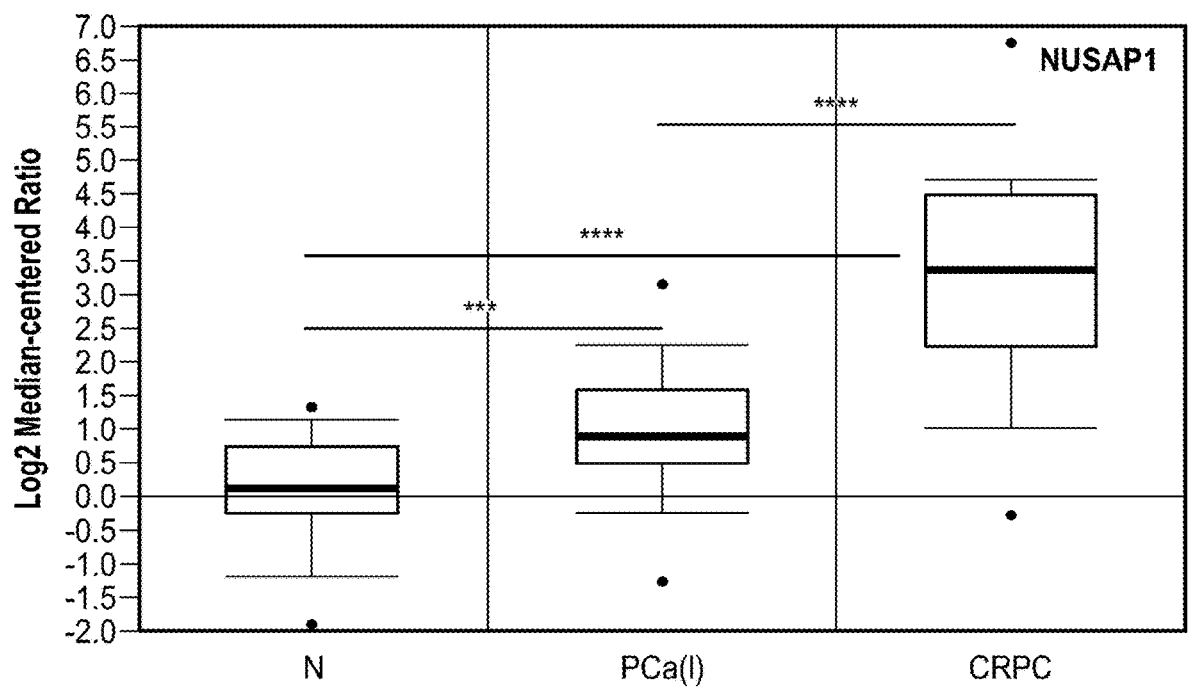
Figure 14E:
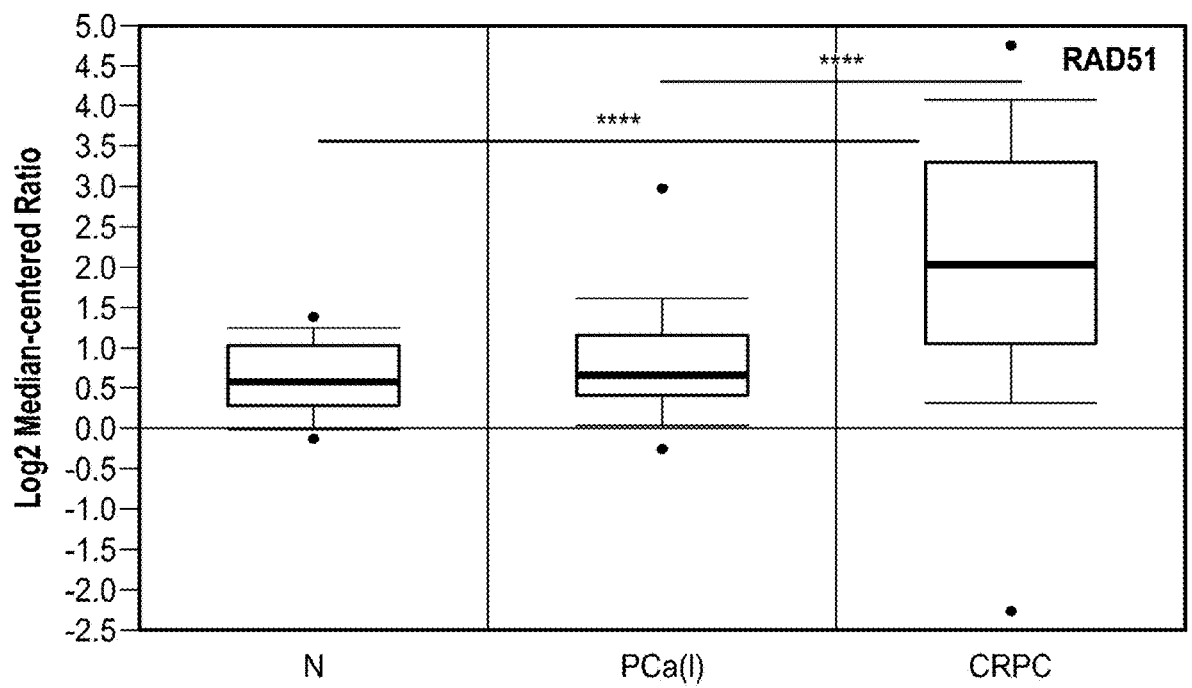
FIG. 14E shows that the individual TMCC11 signature genes are highly expressed in metastatic CRPC prostate cancer. Expression levels of the RAD51 and RRM2 mRNA in benign, localized and metastatic CRPC prostate samples from patients from the PCa Grasso dataset. Expression of the TMEFF2 mRNA is shown in the bottom graph as control. N: normal, PCa(l): localized PCa, CRPC: Castration resistant PCa. Expression levels are presented as boxplots and statistical analysis was done using a Wilcoxon multiple comparison test. Data obtained from the Oncomine database. *P<0.001; **P<0.0001.
Figure 14E:
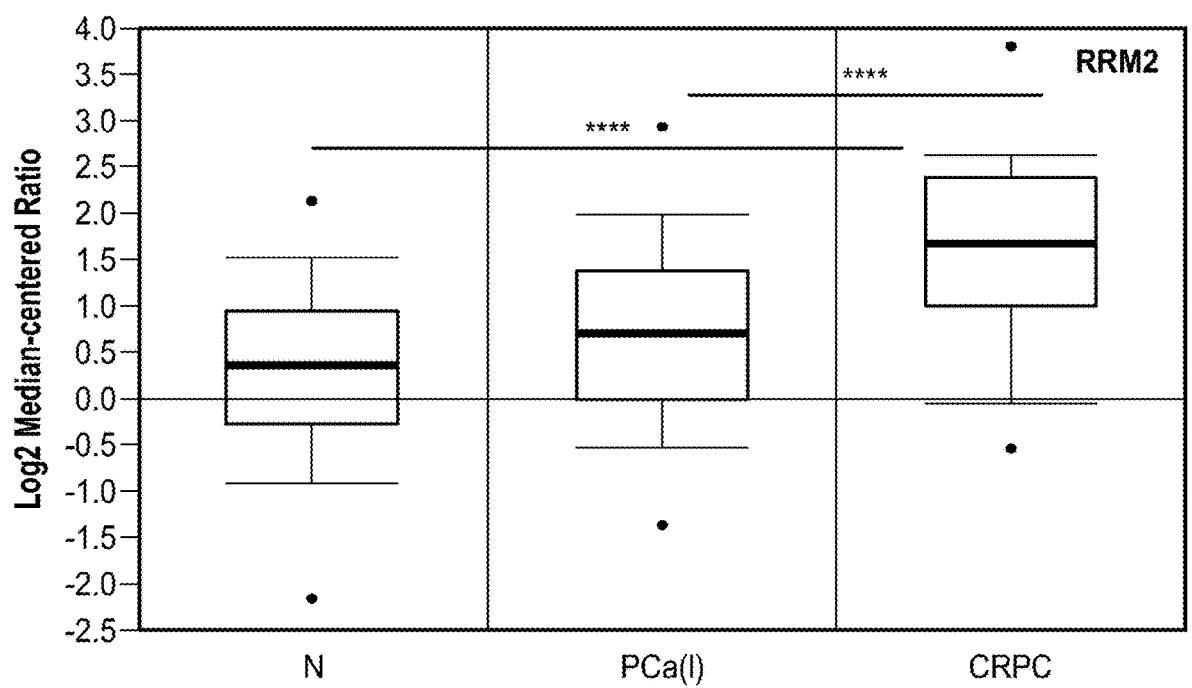
Figure 14E:
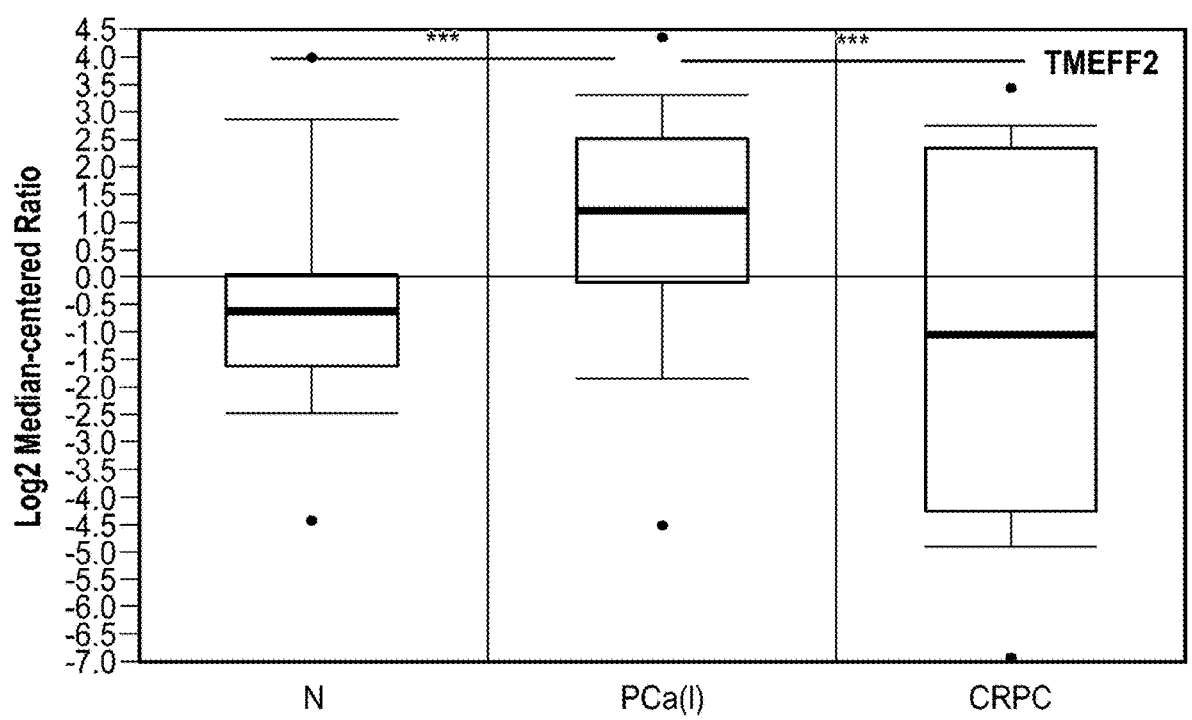

TMEFF2 Silencing in the LNCaP Cell Line Increases Androgen-Driven Expression of a Group of Cell-Cycle Related Genes TMEFF2 is one of the top 100 mRNA transcripts with the highest levels of inter-tumor variability in patient samples from several publicly available datasets. To begin understanding the molecular consequences of decreased Tmeff2 expression and its potential to define a prognostic gene signature, TMEFF2-targeted RNA interference experiments were conducted. Preliminary observations indicated that TMEFF2 silencing alters expression of androgen receptor (AR) targets, suggesting the possibility that TMEFF2 effects on growth may be driven by TMEFF2-modulated AR-mediated expression of genes involved in cell cycle related processes. Using shRNA, we silenced expression of TMEFF2 in LNCaP cells (FIG. 8 and FIG. 11), a PCa cell line that expresses high levels of TMEFF2, and analyzed the DHT mediated induction of gene expression using RNA-Seq analysis. We identified a group of 25 genes that were moderately but significantly upregulated (Log 2 fold change$\geq 1.8$, $\leq 3.1$; FDR<0.05) by DHT in the LNCaP-TMEFF2 knockdown cells as compared to control cells (transduced with scramble shRNA-expressing lentivirus; TABLE 1). STRING pathway analysis suggested that most of these genes are functionally associated (see FIG. 12 in U.S. Provisional Application Ser. No. 62/694,323).

Figure 9:
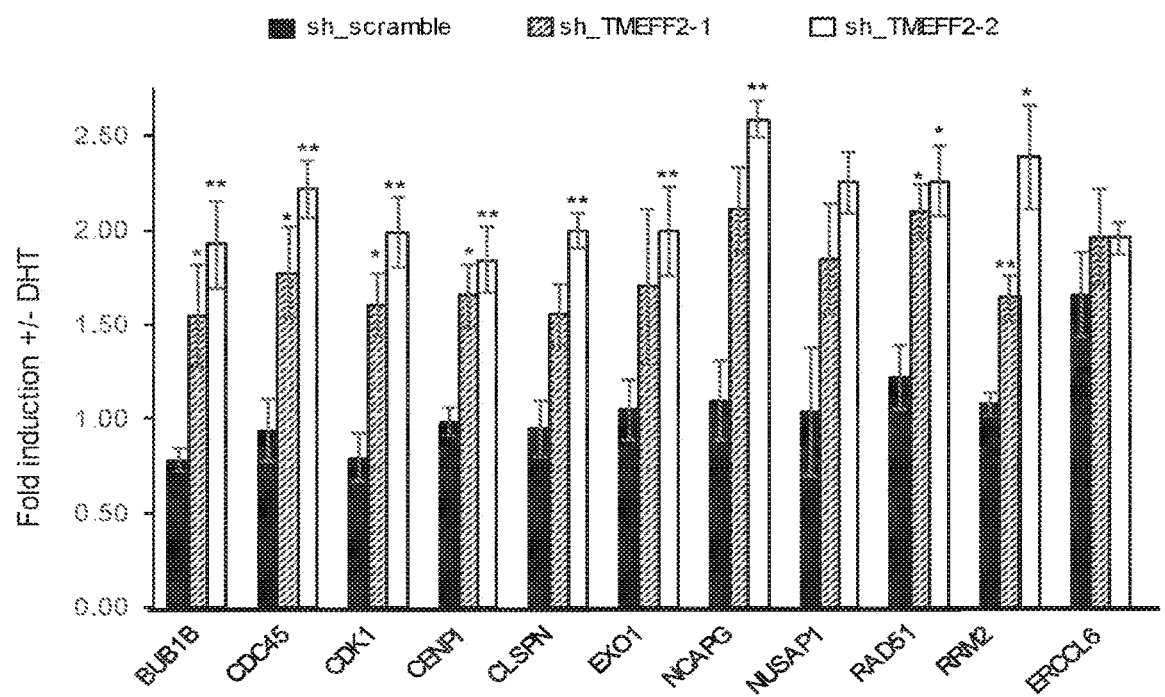
FIG. 9 shows TMEFF2 silencing in PCa cells induces androgen-driven expression of cell cycle/DNA damage response genes. qRT-PCR data in the LNCaP-sh_TMEFF2 cells confirms increased expression of the cell cycle/DNA damage response genes selected for the TMEFF2 modulated cell cycle 11 gene signature (TMCC11) in response to androgen stimulation when compared to the LNCaP-sh_ scramble cells. Data is the average of 3 independent repeats and was analyzed using T-test. Error bars correspond to standard error of the mean (s.e.m.) *P<0.05; **P<0.01.

Out of the initial group of genes, 11 were selected (TABLE 2) as described above and are referred to herein as the "TMEFF2 modulated cell cycle 11 (TMCC11)" gene signature. qRT-PCR analysis in LNCaP cells confirmed that DHT-mediated induction of the TMCC11 genes was significantly increased in LNCaP cells in which TMEFF2 expression was low compared to control cells (FIG. 9). These 11 genes are all functionally associated and tightly related to cell-cycle and DNA replication and repair processes (see FIG. 13 in U.S. Provisional Application Ser. No. 62/694, 323). Moreover, silencing of TMEFF2 in 22Rv1 prostate cancer cells affects cell cycle progression (FIG. 12) supporting the role of TMEFF2 in modulating expression of cell-cycle related genes.

TABLE 2

Genes selected as the 11-gene TMEFF2 modulated cell cycle (TMCC11) gene signature.

| Gene Symbol | sh_TMEFF2 (+DHT/noDHT) | | sh_scramble (+DHT/noDHT) | |
|---|---|---|---|---|
| | Fold change | FDR | Fold change | FDR |
| NCAPG | 2.353243381 | 0.000809975 | 1.344868217 | 1 |
| RAD51 | 2.331124269 | 0.001787314 | 1.364654902 | 1 |
| CENPI | 2.298897724 | 0.002238783 | 1.295324973 | 1 |
| RRM2 | 2.207407293 | 0.00142813 | 1.653034558 | 1 |
| CLSPN | 2.141504825 | 0.009864019 | 1.683146651 | 1 |
| CDC45 | 2.130885055 | 0.012661108 | 1.643396628 | 1 |
| EXO1 | 2.106583459 | 0.025610316 | 1.424119278 | 1 |
| NUSAP1 | 2.104325295 | 0.001604695 | 1.223684172 | 1 |
| ERCC6L | 2.103509184 | 0.007160287 | 1.660048505 | 1 |
| CDK1 | 2.037651859 | 0.000155421 | 1.299371971 | 1 |
| BUB1B | 2.000173748 | 0.032103672 | 1.149249659 | 1 |

For each of the TMCC11 genes, the fold change in response to DHT treatment in LNCaP expressing the shTMEFF2 RNA or the scramble control is shown.

In clinical samples from the MSKCC and Grasso datasets (FIGS. 13A-F, and 14A-E, respectively), the expression of the individual genes from the TMCC11 signature is significantly increased in CRPC and metastatic disease samples when compared to normal tissue, and inversely correlated with the expression of TMEFF2 in the same samples. In addition, mRNA coexpression analysis using the PCa MSKCC and PRAD TCGA datasets (see FIGS. 17 and 18, respectively, in U.S. Provisional Application Ser. No. 62/694,323) indicates that these genes are highly significantly co-expressed.

Figure 15:
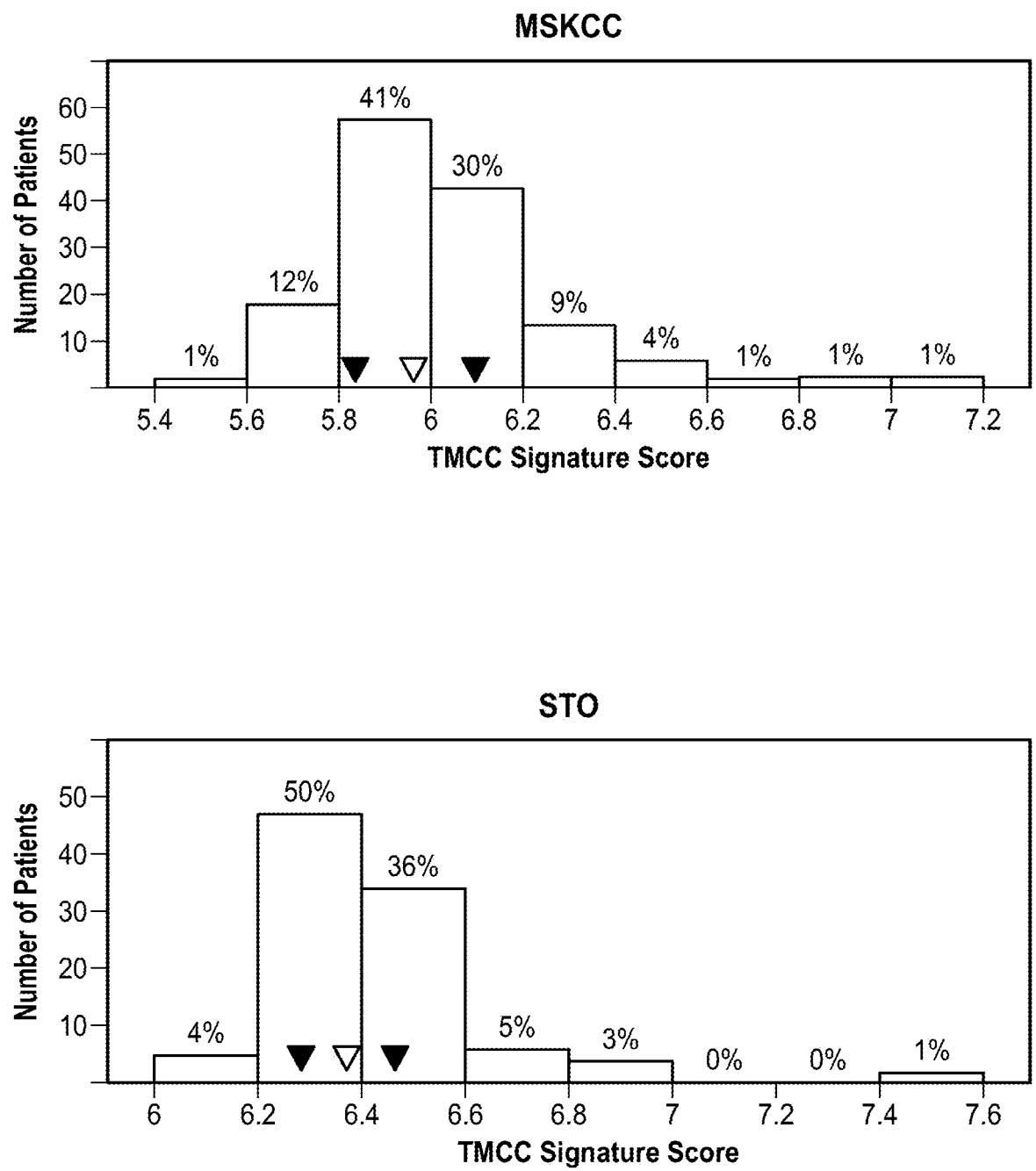
FIG. 15 shows the distribution of the TMCC11 signature score in patients from the MSKCC (upper panel) and STO (lower panel) datasets used herein. Median (center white arrowhead) and quartiles (left and right black arrowheads) are marked.
Figure 16:
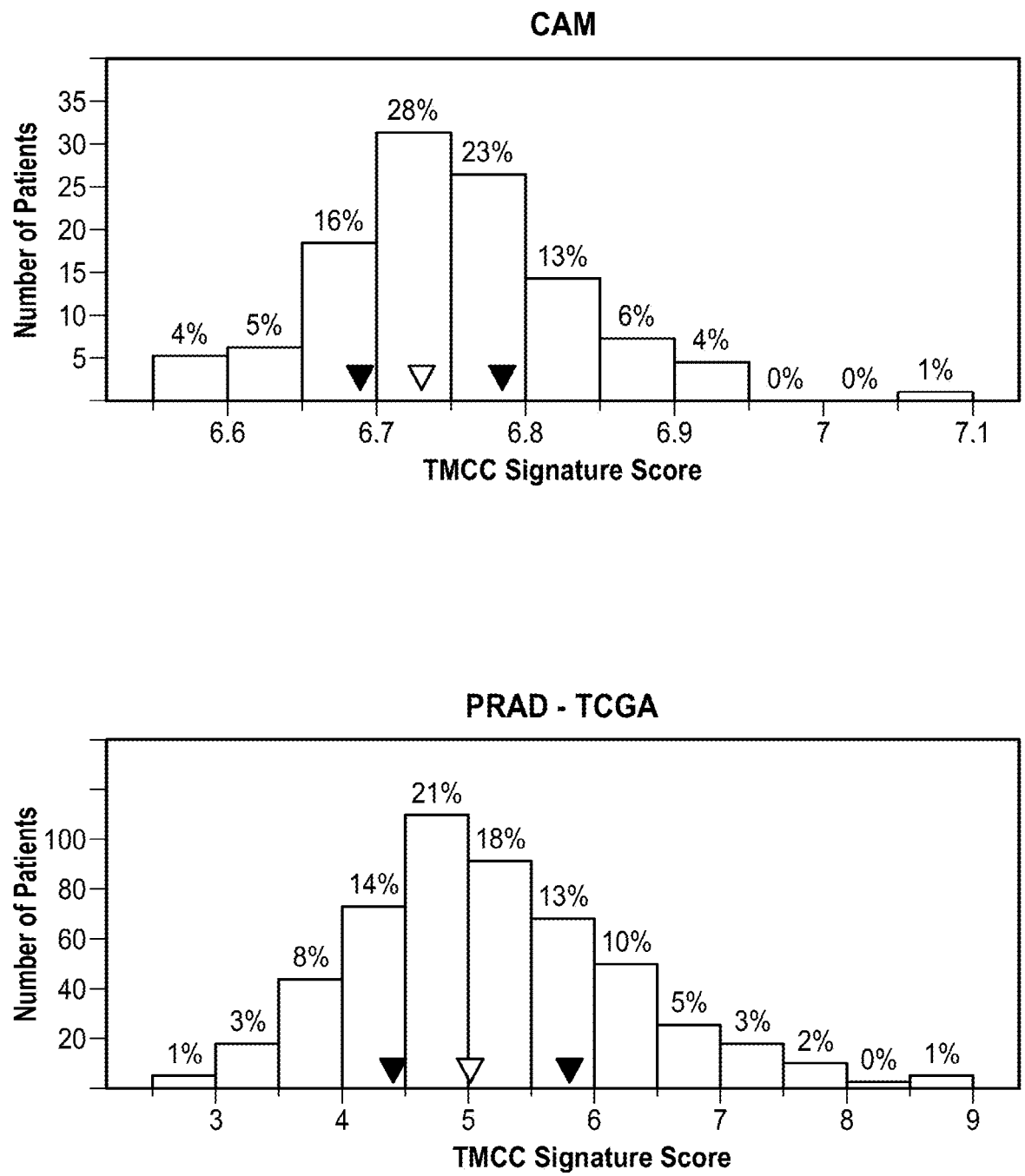
FIG. 16 shows the distribution of the TMCC11 signature score in patients from the CAM (upper panel) and PRAD-TCGA (lower panel) datasets used herein. Median (center white arrowhead) and quartiles (left and right black arrowheads) are marked.

The TMEFF2-Modulated Gene Signature is an Independent Marker of Recurrence after Prostatectomy in Multiple Clinical Datasets Based on results suggesting that loss of TMEFF2 predates aggressive/metastatic disease, it was postulated that the TMEFF2-modulated TMCC11 gene signature could have prognostic value. This hypothesis was evaluated herein using biochemical recurrence (BCR) as the clinical endpoint in the PCa MSKCC dataset. TABLE 3 shows the clinical characteristics of the samples used in this study. FIGS. 15 and 16 provide additional information on the samples/cohorts.

TABLE 3

Clinical and pathological characteristics of the prostate cancer datasets.

| | MSKCC (Taylor et al.) n = 140 | Cambridge (Ross-Adams et al.) n = 112 | Stockholm (Ross-Adams et al.) n = 92 | TCGA-PRAD (TOGA) n = 490 |
|---|---|---|---|---|
| Age (years) | | | | |
| Mean | 58.04 | 62 | | 61 |
| Range | 37.3-83.0 | 41-73 | | 41-78 |
| PSA | | | | |
| Median | 6.15 | 7.9 | 7.95 | |
| <10 | 104 | 80 | 56 | |
| ≥10 | 34 | 31 | 34 | |
| Unknown | 2 | 1 | 2 | |
| Biopsy Gleason | | | | |
| ≤3 + 4 | 128 | 77 | 68 | |
| ≥4 + 3 | 12 | 27 | 22 | |
| Unknown | | 8 | 2 | |
| Suraical | | | | |

TABLE 3-continued

Clinical and pathological characteristics of the prostate cancer datasets.

| | MSKCC (Taylor et al.) n = 140 | Cambridge (Ross-Adams et al.) n = 112 | Stockholm (Ross-Adams et al.) n = 92 | TCGA-PRAD (TOGA) n = 490 |
|---|---|---|---|---|
| Gleason | | | | |
| ≤3 + 4 | 94 | 83 | 56 | 197 |
| ≥4 + 3 | 44 | 29 | 34 | 293 |
| Unknown | 2 | | 2 | |
| Extra-capsular ext. | | | | (mri + ct scan combined) |
| Y | 97 | 77 | 42 | 31 |
| N | 43 | 35 | 48 | 199 |
| NA/equivocal | | | 2 | 260 |
| Positive suraical margins | | | | |
| Y | 33 | 26 | 42 | 165 |
| N | 107 | 86 | 50 | 311 |
| Unknown | | | | 14 |
| Recurrence | | | | |
| Y | 36 | 19 | 45 | 91 |
| N | 104 | 93 | 47 | 399 |
| Patholoay Stage | | | | |
| pT2a-c | 87 | 35 | 47 | 184 |
| pT3a-c | 46 | 77 | 42 | 290 |
| pT4 | 7 | | 3 | 10 |
| Unknown | | | | 6 |

Figure 17:
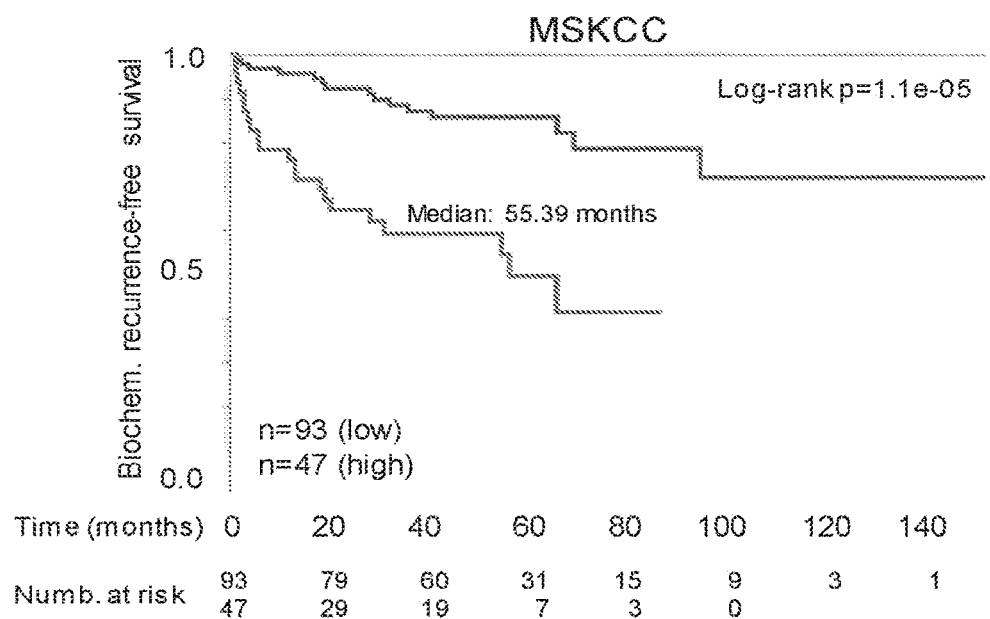
FIG. 17 is a Kaplan-Meier plot showing that high TMCC11 expression correlates with decreased biochemical-recurrence free survival in the MSKCC PCa dataset. Patients were divided in two categories with the upper tertile of the TMCC11 used as the cut point. The lower curve is the high TMCC11 expression group showing worst clinical outcome with a median survival of 55.39 months. The upper curve is the low TMCC11 expression group.
Figure 18:
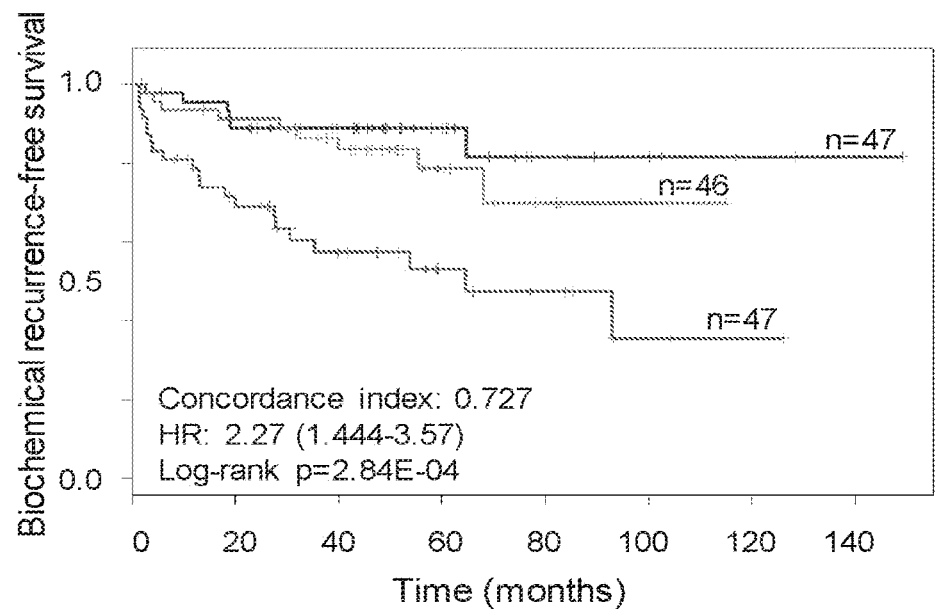
FIG. 18 shows that high expression of TMCC11 correlates with poor prognosis in the MSKCC dataset using the SurvExpress platform for analysis. Kaplan-Meier survival curves of the MSKCC prostate dataset stratified by risk groups (3 groups of the same size, n) and censored by biochemical recurrence (BCR). The bottom curve is high expression of TMCC11, the middle curve is median expression of TMCC11, and the top curve is low expression of TMCC11. CI=Concordance Index: HR=Risk Group Hazard Ratio.
Figure 19:
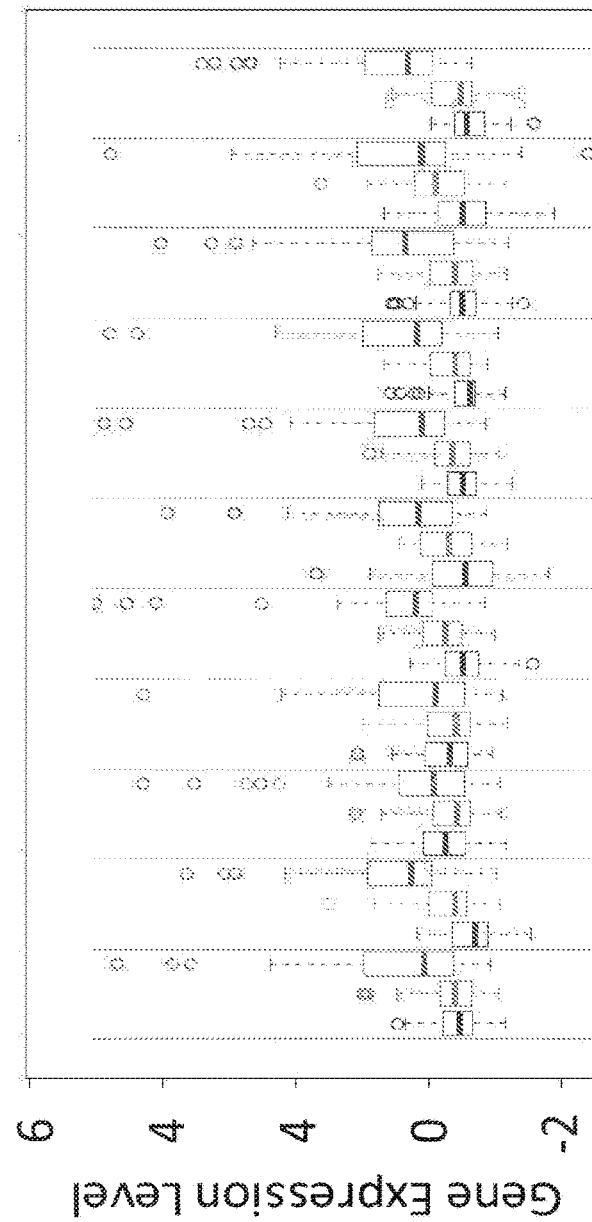
FIG. 19 shows the expression level for each individual TMCC11 gene, stratified by risk group, as in FIG. 18. The results indicate that high risk of biochemical recurrence (BCR) correlates with high expression of the individual TMCC11 genes. The left box for each gene corresponds to low risk. The middle box for each gene corresponds to medium risk. The right box for each gene corresponds to high risk.

The MSKCC dataset includes a number of prostatectomy samples from patients with wide range of times to BCR as measured by increased levels of PSA. Individually, increased expression of each of the genes comprising TMCC11 was statistically significant (P<0.01) in predicting BCR (except for CLSPN p=0.0137) In Kaplan-Meier analyses, high expression of the TMCC11 signature as a whole was associated with a median time to progression of 55.39 months vs. greater than 150 months for patients with low expression of TMCC11 (log-rank P value=1.11e−05; FIG. 17). These results indicate that the TMCC11 signature is a powerful predictor of aggressive PCa, segregating the tumors into high and low-risk groups based on time to BCR. We obtained similar results using the SurvExpress database for analysis (FIGS. 18-19). In Cox regression analyses, TMCC11 was a significant prognostic variable (p<0.001) with a hazard ratio (HR) of 4.1 (TABLE 4). In multivariate analysis, and a model constructed using a forward stepwise selection process coupled with Cox proportional hazard, TMCC11 remained a significant prognostic variable with a HR of 2.27 and 2.35 respectively (TABLE 4). The final model also selected pathological T-score and surgical Gleason score as significant predictors of BCR (TABLE 4).

Figure 20:
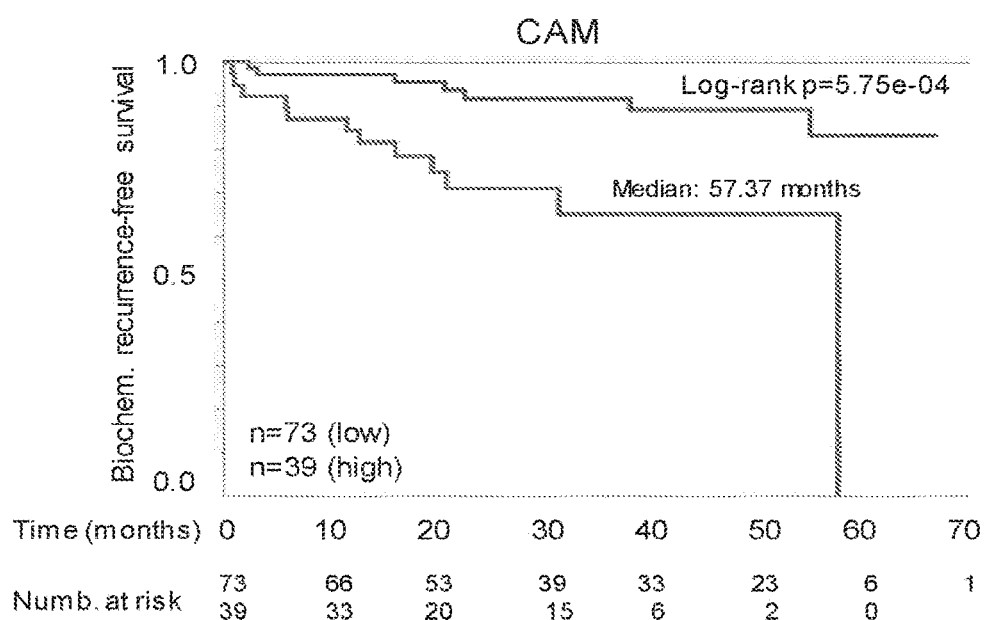
FIG. 20 is a Kaplan-Meier plot showing that high TMCC11 expression correlates with decreased biochemical-recurrence free survival in the Cambridge PCa dataset. Patients were divided in two categories with the upper tertile of the TMCC11 used as the cut point. The lower curve is the high TMCC11 expression group showing worst clinical outcome with a median survival of 57.37 months. The upper curve is the low TMCC11 expression group.
Figure 21:
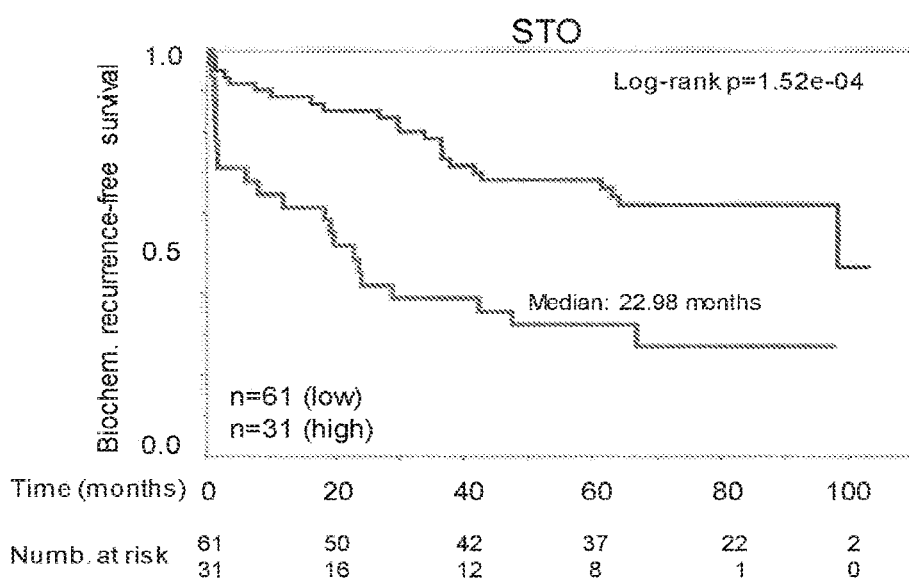
FIG. 21 is a Kaplan-Meier plot showing that high TMCC11 expression correlates with decreased biochemical-recurrence free survival in the Stockholm PCa dataset. Patients were divided in two categories with the upper tertile of the TMCC11 used as the cut point. The lower curve is the high TMCC11 expression group showing worst clinical outcome with a median survival of 22.98 months. The upper curve is the low TMCC11 expression group.
Figure 22:
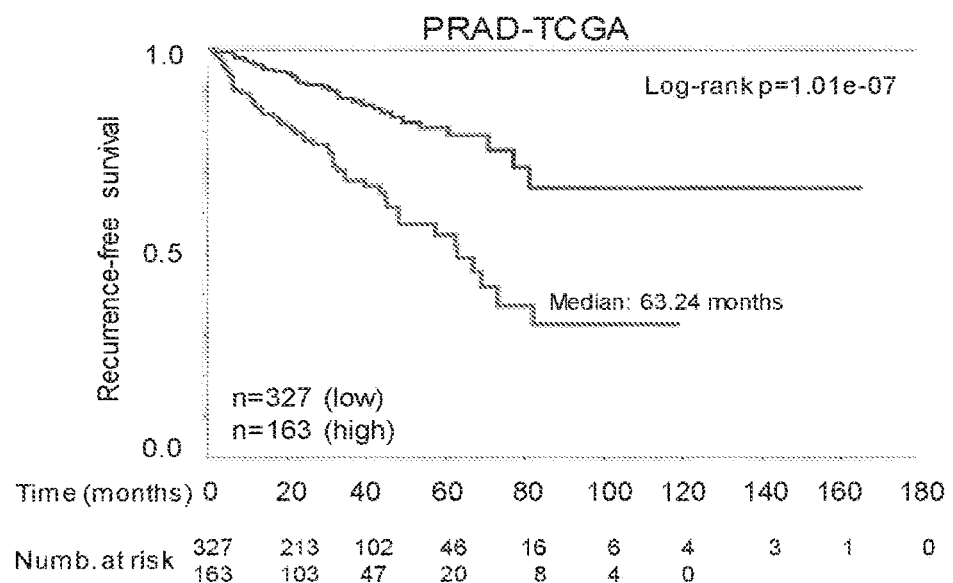
FIG. 22 is a Kaplan-Meier plot showing that high TMCC11 expression correlates with decreased recurrence free survival in the PRAD-TGCA PCa dataset. Patients were divided in two categories with the upper tertile of TMCC11 used as the cut point. The lower curve is the high TMCC11 expression group showing worst clinical outcome with a median survival of 63.24 months. The upper curve is the low TMCC11 expression group.

The prognostic findings were validated in other independent publicly available datasets (see TABLE 3, and FIGS. 15-16). Survival analysis demonstrated that TMCC11 was a significant (log-rank p=5.75e−05 and 1.52e−04 respectively) predictor of outcome in the Cambridge (CAM; n=112) and Stockholm (STO; n=92) cohorts, segregating patients with better/worse prognosis based on BCR data over 60 to 100 months respectively (FIGS. 20 and 21). Results using multivariate Cox regression analysis including expression level of the TMCC11 signature and several clinical variables, demonstrate that the TMCC11 signature is an independent predictor of recurrence after prostatectomy in both of these datasets (TABLES 5 and 6, respectively). Last, we interrogated the PRAD TCGA (n=498; TABLE 3 and FIG. 16), a dataset with a longer-term follow-up than the CAM and STO datasets, for changes in the expression of the TMCC11 gene subset, and outcome prediction. All of the reported alterations of the TMCC11 genes in the tumor samples correspond to mRNA upregulation (not shown). Survival analysis demonstrated a statistically significant (P=1.01e−07) decrease in DFS for patients with higher expression of the TMCC11 genes (63.24 months vs. >150; FIG. 22). Multivariate Cox proportional regression analysis using Gleason, pathology score and TMCC11 expression level demonstrated that higher TMCC11 was independently associated with shorter DFS (TABLE 7). Taken together, these data suggest that the TMCC11 signature is prognostic for risk of disease recurrence after radical prostatectomy, and has an added benefit in the context of standard clinical variables in several independent datasets.

TABLE 4

Univariate and multivariate Cox regression analyses of disease recurrence in the MSKCC PCa dataset.
MSKCC

| | UNIVARIATE ANALYSIS | | MULTIVARIATE ANALYSIS | | FINAL MODEL | |
|---|---|---|---|---|---|---|
| | HR (95% CI) | p-value | HR (95% CI) | p-value | HR (95% CI) | p-value |
| TMCC11 | 4.10 (2.08, 8.1) | <0.001 | 2.27 (1.05, 4.91) | 0.038 | 2.35 (1.14, 4.87) | 0.021 |
| Biop. Gleason | 4.26 (1.93, 9.42) | <0.001 | 0.96 (0.36, 2.59) | 0.943 | | |
| PSA | 2.98 (1.53, 5.83) | 0.001 | 1.66 (0.79, 3.49) | 0.372 | | |
| Path Stage | 4.62 (2.30, 9.27) | <0.001 | 4.15 (1.56, 11.04) | 0.459 | 2.99 (1.42, 6.29) | 0.004 |
| Pos. surg. margins | 2.07 (1.06, 4.06) | 0.034 | 0.90 (0.42, 1.95) | 0.776 | | |
| ECE | 2.10 (0.92, 4.80) | 0.79 | 0.42 (0.12, 1.29) | 0.415 | | |
| Surg. Gleason | 10.56 (4.87, 22.86) | <0.001 | 7.92 (3.16, 19.87) | <0.001 | 6.78 (2.92, 15.73) | <0.001 |

TABLE 5

Univariate and multivariate Cox regression analyses of disease recurrence in the Cambridge PCa dataset.
CAMBRIDGE

| | UNIVARIATE ANALYSIS | | MULTIVARIATE ANALYSIS | | FINAL MODEL | |
|---|---|---|---|---|---|---|
| | HR (95% CI) | p-value | HR (95% CI) | p-value | HR (95% CI) | p-value |
| TMCC11 | 4.76 (1.80, 12.59) | 0.002 | 4.28 (1.53, 11.99) | 0.006 | 3.53 (1.31, 9.51) | 0.013 |
| Biop. Gleason | 3.25 (1.32, 8.02) | 0.011 | 1.10 (0.25, 4.93) | 0.897 | | |
| PSA | 1.50 (0.57, 3.95) | 0.412 | 2.82 (1.00, 7.98) | 0.050 | | |
| Surg. Gleason | 4.68 (1.88, 11.63) | <0.001 | 5.12 (1.07, 24.55) | 0.041 | 4.31 (1.70, 10.91) | 0.002 |
| Pos. surg. margins | 1.64 (0.62, 4.35) | 0.324 | 2.08 (0.76, 5.71) | 0.156 | | |
| ECE | 1.82 (0.60, 5.48) | 0.288 | 0.85 (0.28, 2.64) | 0.780 | | |

TABLE 6

Univariate and multivariate Cox regression analyses of disease recurrence in the Stockholm PCa dataset.
STOCKHOLM

| | UNIVARIATE ANALYSIS | | MULTIVARIATE ANALYSIS | | FINAL MODEL | |
|---|---|---|---|---|---|---|
| | HR (95% CI) | p-value | HR (95% CI) | p-value | HR (95%CI) | p-value |
| TMCC11 | 3.00 (1.65, 5.44) | <0.001 | 2.69 (1.46, 6.11) | 0.003 | 2.89 (1.56, 5.36) | <0.001 |
| Pre-op. Gleason | 2.67 (1.44, 4.96) | 0.002 | 1.40 (0.66, 2.99) | 0.381 | 2.12 (1.12, 4.02) | 0.021 |
| PSA | 1.61 (0.89, 2.92) | 0.116 | 1.05 (0.56, 1.98) | 0.879 | | |
| Surg. Gleason | 3.62 (2.00, 6.58) | <0.001 | 1.77 (0.84, 3.74) | 0.136 | | |

TABLE 6-continued

Univariate and multivariate Cox regression analyses of disease recurrence in the Stockholm PCa dataset.

STOCKHOLM

| | UNIVARIATE ANALYSIS | | MULTIVARIATE ANALYSIS | | FINAL MODEL | |
|---|---|---|---|---|---|---|
| | HR (95% Cl) | p-value | HR (95% Cl) | p-value | HR (95%Cl) | p-value |
| Pos. surg. margins | 1.99 (1.10, 3.59) | 0.023 | 1.84 (0.96, 3.54) | 0.068 | | |
| ECE | 4.21 (2.19, 8.09) | <0.001 | 2.98 (1.46, 6.11) | 0.003 | 3.69 (1.89, 7.20) | <0.001 |

TABLE 7

Univariate and multivariate Cox regression analyses of disease recurrence in the PRAD-TCGA PCa dataset.

PRAD-TCGA

| | UNIVARIATE ANALYSIS | | MULTIVARIATE ANALYSIS | | FINAL MODEL | |
|---|---|---|---|---|---|---|
| | HR (95% Cl) | p-value | HR (95% Cl) | p-value | HR (95% Cl) | p-value |
| TMCC11 | 2.94 (1.94, 4.46) | <0.0001 | 1.96 (1.26, 3.05) | 0.003 | 1.96 (1.26, 3.05) | 0.003 |
| Gleason | 4.08 (2.27, 7.34) | <0.0001 | 2.29 (1.20, 4.38) | 0.012 | 2.29 (1.20, 4.38) | 0.012 |
| Path Stage | 3.68 (2.07, 6.51) | <0.0001 | 2.25 (1.22, 4.15) | 0.010 | 2.25 (1.22, 4.15) | 0.010 |

The prognostic value of the TMCC11 signature was further evident using C-statistics (TABLE 8). The TMCC11 signature was a significant predictor across all datasets. In the TCGA-PRAD it performed better (C-index, 0.64; confidence interval, 0.58-0.70; p<0.001) than Gleason (C-index, 0.62; confidence interval, 0.58-0.67; p<0.001) or pathological score (C-index, 0.61; confidence interval, 0.57-0.66; p<0.001). Moreover, in all the datasets, the TMCC11 signature significantly improved prognostic ability when combined with other clinical variables (TABLE 8). The persistence of the interaction terms as significant effects proves that the TMCC11 predictive effectiveness might vary with the levels of the other clinical variables.

Figure 27:
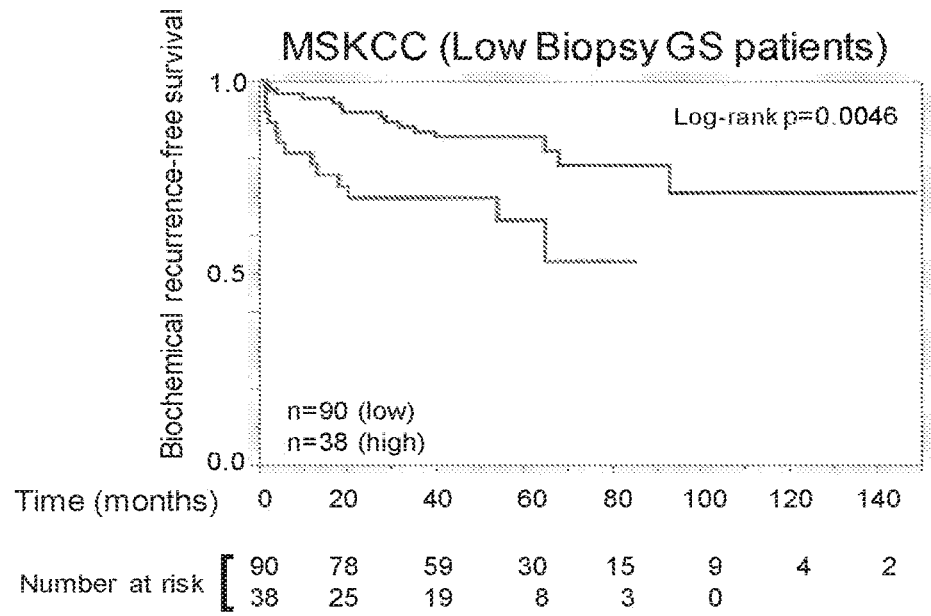
FIG. 27 shows that TMCC11 stratifies patients presenting with low biopsy Gleason score in the MSKCC dataset. Kaplan-Meier curves for TMCC11 were calculated for biochemical recurrence endpoint using only samples with low biopsy Gleason score (≤3+4). The lower curves correspond to the high TMCC11 groups. The upper curves correspond to the low TMCC11 expression groups.
Figure 28:
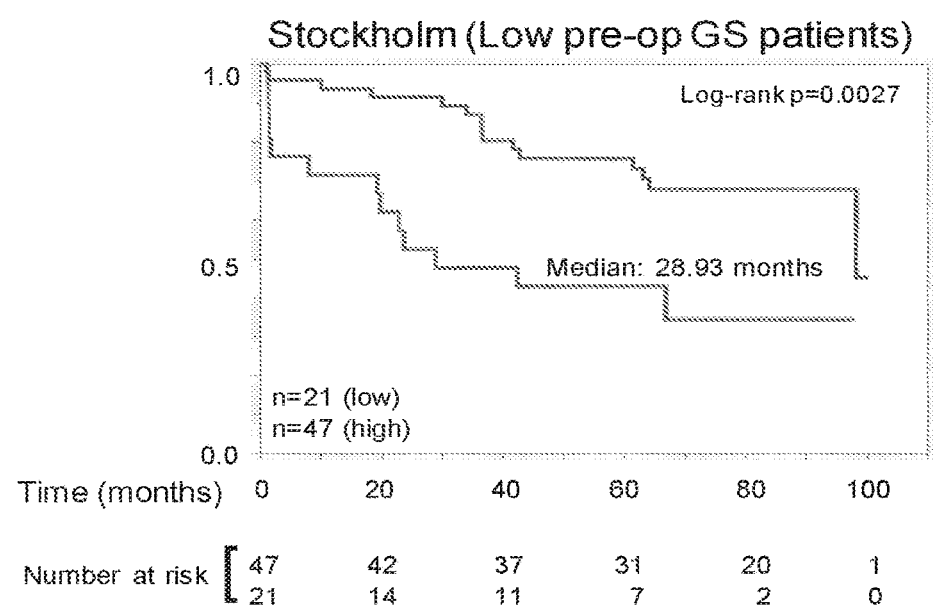
FIG. 28 shows that TMCC11 stratifies patients presenting with low pre-operative Gleason score in the Stockholm dataset. Kaplan-Meier curves for TMCC11 were calculated for biochemical recurrence endpoint using only samples with low pre-operative Gleason score (≤3+4). The lower curves correspond to the high TMCC11 groups. The upper curves correspond to the low TMCC11 expression groups.

In selected patients from the MSKCC (FIGS. 23 and 24, and TABLES 9 and 10) and TCGA-PRAD (FIGS. 25 and 36, and TABLES 11 and 12) datasets with high pathological T (≥T3) or Gleason (≥4+3) scores, high TMCC11 significantly stratified men at risk for disease recurrence. TMCC11 provides prognostic information in high-risk patients beyond that provided by established clinicopathological prognostic features as demonstrated using multivariate analysis (TABLES 9,10, 11 and 12). These results suggest that TMCC11 has prognostic value in men with high-grade tumors, after RP. TMCC11 failed to stratify patients with low surgical Gleason score, however, preliminary data using the MSKCC and Stockholm datasets (FIGS. 27-28, respectively) indicate that TMCC11 can stratify patients presenting with low biopsy Gleason score, suggesting that the signature may be informative for PCa management after a positive biopsy.

TABLE 8

C-statistical analysis for time to disease recurrence comparing the performance of TMCC11 in combination with other clinical variables in the MSKCC, Cambridge, Stockholm, and PRAD-TCGA datasets.

| | C-Stat | 95% Cl | P-value |
|---|---|---|---|
| MSKCC | | | |
| TMCC11 | 0.67 | 0.59, 0.75 | <0.001 |
| Surg. Gleason | 0.78 | 0.71, 0.84 | <0.001 |
| Path. Stage | 0.72 | 0.65, 0.79 | <0.001 |
| TMCC11 + Surg. Gleason | 0.80 | 0.73, 0.88 | <0.001 |
| TMCC11 + Path. Stage | 0.78 | 0.71, 0.86 | <0.001 |
| Surg. Gleason + Path. Stage | 0.82 | 0.75, 0.86 | <0.001 |
| TMCC11+ Surg. Gleason + Path. Stage | 0.83 | 0.75, 0.90 | <0.001 |
| CAMBRIDGE | | | |
| TMCC11 | 0.68 | 0.58, 0.79 | <0.001 |
| Surg. Gleason | 0.69 | 0.57, 0.80 | 0.001 |
| TMCC11 + Surg. Gleason | 0.76 | 0.64, 0.87 | <0.001 |
| STOCKHOLM | | | |
| TMCC11 | 0.64 | 0.57, 0.71 | <0.001 |
| Pre-op Gleason | 0.61 | 0.54, 0.68 | <0.001 |
| ECE | 0.68 | 0.61, 0.74 | 0.008 |
| TMCC11 + Pre-op Gleason | 0.69 | 0.62, 0.76 | <0.001 |
| TMCC11 + ECE | 0.74 | 0.67, 0.81 | <0.001 |
| Pre-op Gleason + ECE | 0.72 | 0.65, 0.79 | <0.001 |
| TMCC11 + Pre-op Gleason + ECE | 0.77 | 0.70, 0.84 | <0.001 |

TABLE 8-continued

C-statistical analysis for time to disease recurrence comparing the performance of TMCC11 in combination with other clinical variables in the MSKCC, Cambridge, Stockholm, and PRAD-TCGA datasets.

| | C-Stat | 95% Cl | P-value |
|---|---|---|---|
| PRAD-TCGA | | | |
| TMCC11 | 0.64 | 0.58, 0.70 | <0.001 |
| Gleason | 0.62 | 0.58, 0.67 | <0.001 |
| Path Stage | 0.61 | 0.57, 0.66 | <0.001 |
| TMCC + Gleason | 0.68 | 0.62, 0.74 | <0.001 |
| TMCC11 + Path Stage | 0.68 | 0.62, 0.74 | <0.001 |
| Gleason + Path Stage | 0.66 | 0.60, 0.71 | <0.001 |
| TMCC11 + Gleason + Path Stage | 0.69 | 0.64, 0.75 | <0.001 |

TABLE 9

Figure 23:
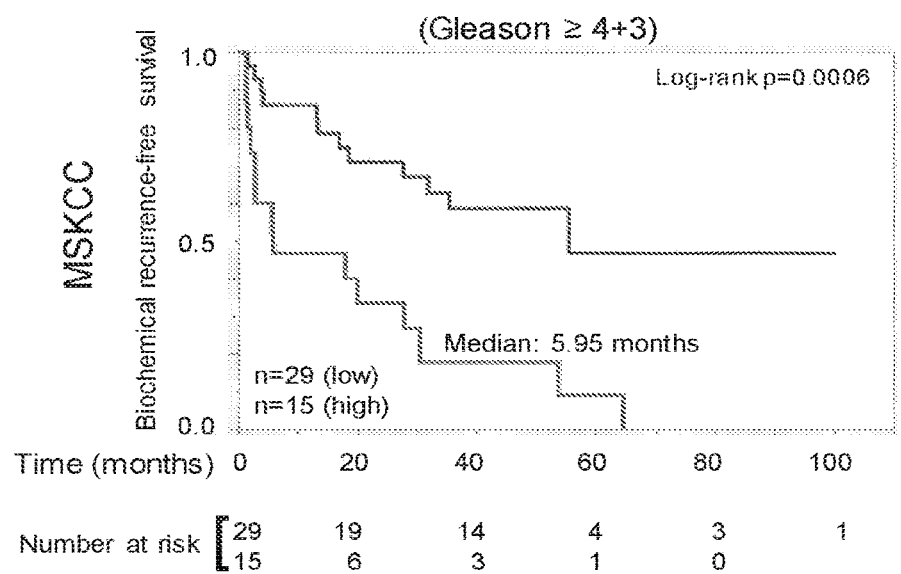
FIG. 23 shows that high TMCC11 gene expression correlates with decreased biochemical-recurrence free survival in subsets of patients with high surgical Gleason score in the MSKCC dataset. Kaplan-Meier curves for TMCC11 for BCR endpoint using only samples with high Gleason score (≥4+3). The upper tertile of TMCC11 for that set of samples was used as the cut point. The lower curve corresponds to the high TMCC11 group. The upper curve is the low TMCC11 expression group.

Multivariate Cox regression analysis of BCR in the same sets of samples shown in FIG. 23. MSKCC

| | MULTIVARIATE ANALYSIS | |
|---|---|---|
| | HR (95% Cl) | p-value |
| TMCC | 3.43 (1.39, 9.35) | 0.0067 |
| Path. stage | 6.52 (2.24, 23.38) | 0.0003 |
| PSA | 2.70 (1.02, 7.29) | 0.045 |
| Biop. Gleason | 0.59 (0.18, 1.68) | 0.3308 |
| SMS | 1.93 (0.77, 5.18) | 0.1596 |

Gleason-High (≥4+3): Low (≤3+4); PSA-High (≥10): Low (<10); Path Stage-High (≥T3): Low (≤T2); Positive surgical margins-Y:N; Extracapsular extension (ECE)-Y:N.

TABLE 10

Figure 24:
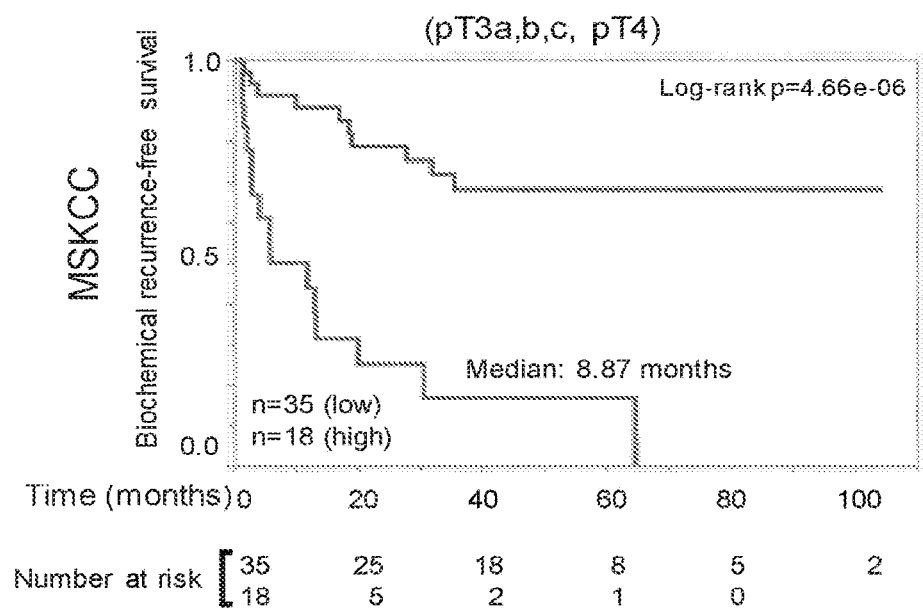
FIG. 24 shows that high TMCC11 gene expression correlates with decreased biochemical-recurrence free survival in subsets of patients with high pathological score in the MSKCC dataset. Kaplan-Meier curves for TMCC11 for BCR endpoint using only samples with high pathological stage (≥pT3a). The upper tertile of TMCC11 for that set of samples was used as the cut point. The lower curve corresponds to the high TMCC11 group. The upper curve is the low TMCC11 expression group.

Multivariate Cox regression analysis of BCR in the same sets of samples shown in FIG. 24. MSKCC

| | MULTIVARIATE ANALYSIS | |
|---|---|---|
| | HR (95% Cl) | p-value |
| TMCC | 2.88 (1.11, 7.92) | 0.0294 |
| Surg. Gleason | 14.0 (3.62, 94.4) | 0.0001 |
| PSA | 2.32 (0.76, 6.82) | 0.2749 |
| Biop. Gleason | 0.65 (0.16, 2.40) | 0.5222 |
| SMS | 1.66 (0.64, 4.54) | 0.3005 |

Gleason-High (≥4+3): Low (≤3+4); PSA-High (≥10): Low (<10); Path Stage-High (≥T3): Low (≤T2); Positive surgical margins-Y:N; Extracapsular extension (ECE)-Y:N.

TABLE 11

Figure 25:
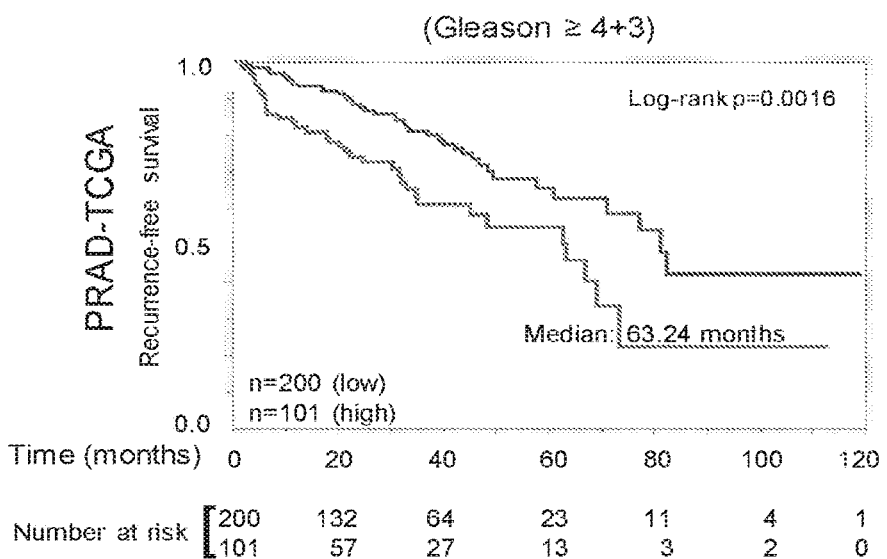
FIG. 25 shows that high TMCC11 gene expression correlates with decreased recurrence-free survival in subsets of patients with high surgical Gleason score in the PRAD-TCGA dataset. Kaplan-Meier curves for TMCC11 for disease recurrence using only samples with high Gleason score (≥4+3). The upper tertile of TMCC11 for that set of samples was used as the cut point. The lower curve corresponds to the high TMCC11 group. The upper curve is the low TMCC11 expression group.

Multivariate Cox regression analysis of disease recurrence in the same sets of samples shown in FIG. 25. Path Stage-High(≥T3): Low(≤T2). PRAD-TCGA

| | MULTIVARIATE ANALYSIS | |
|---|---|---|
| | HR (95% Cl) | p-value |
| TMCC | 1.92 (1.21, 3.11) | 0.0052 |
| Path. Stage | 2.26 (1.14, 5.16) | 0.0174 |

TABLE 12

Figure 26:
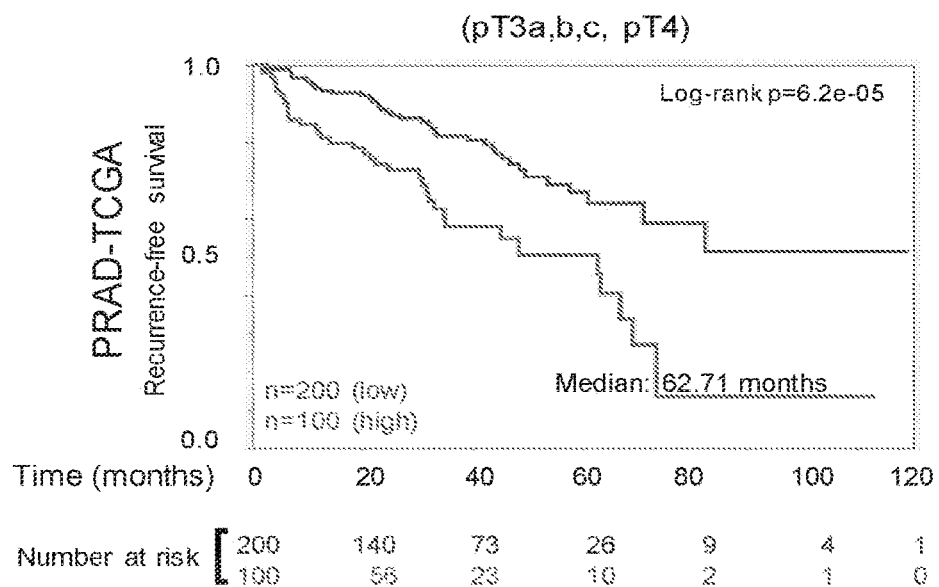
FIG. 26 shows that high TMCC11 gene expression correlates with decreased recurrence-free survival in subsets of patients with high pathological score in the PRAD-TCGA dataset. Kaplan-Meier curves for TMCC11 for disease recurrence using only samples with high pathological stage (≥pT3a). The upper tertile of the TMCC11 for that set of samples was used as the cut point. The lower curve corresponds to the high TMCC11 group. The upper curve is the low TMCC11 expression group.

Multivariate Cox regression analysis of disease recurrence in the same sets of samples shown in FIG. 26. Gleason-High (≥4 + 3): Low (≤3 + 4). PRAD-TCGA

| | MULTIVARIATE ANALYSIS | |
|---|---|---|
| | HR (95% Cl) | p-value |
| TMCC | 2.08 (1.29, 3.45) | 0.0024 |
| Gleason | 2.25 (1.05, 5.56) | 0.0348 |

Several gene signatures have predictive capabilities in PCa. We therefore conducted additional tests to determine the value of the TMCC11 signature when compared to other signatures, using the Bioconductor package SigCheck. This software allows comparison of a gene signature prognostic performance against random and known gene signatures. Initially, we analyzed the prognostic power of TMCC11 and other previously identified oncogenic signatures: 6 signatures for PCa, 189 oncogenic signatures from multiple cancer types in MSigDB, and 48 breast oncogenic signatures (compiled in Venet D, Dumont J E, Detours V: Most Random Gene Expression Signatures Are Significantly Associated with Breast Cancer Outcome. PLOS Computational Biology 7: e1002240, 2011). Overall, only 2 signatures performed better than TMCC11, although performance depends on the dataset used to run the analysis. Considering just the six PCa gene signatures (TABLE 13), only the Cuzick (n=31) signature achieved comparable performance to the TMCC11 across the three datasets for identifying patients with shorter time to biochemical relapse. Five genes within the Cuzick set overlap with the TMCC11 set (BUB1B, CDK1 (referred to as CDC2 in the Cuzick set)), NUSAP1, RAD51, and RRM2). We obtained similar results using two other TMCC11 derived signatures, TMCC13 and TMCC3a. TMCC13 is a modified form of TMCC11 including two additional genes, E2F7 and GSG, while TMCC3a comprised 3 TMCC11 genes that do not overlap with the Cuzick signature (CDC45, CLSPN, and NCAPG). These results underscore the prognostic value of the genes included in the TMCC11 signature.

We then analyzed the performance of TMCC11 signature against 10,000 signatures consisting of the same number of genes (n=11) selected at random. The TMCC11 signature performed in the $97^{th}$ and $99^{th}$ percentiles, with only 3%, 1.2% and 0.18% of the random signatures demonstrating an equal or smaller p-value (empirical p-values of p=0.0305, p=0.012 and p=0.0018) in predicting relapse in the Stockholm, Cambridge and MSKCC datasets respectively (TABLE 14). The same test was conducted with all the oncogenic signatures described above. Considering just the PCa signatures, only the Cuzick (n=31) signature achieved comparable performance to the TMCC11 across the three datasets. When we evaluate all the oncogenic signatures, only 2 signatures performed slightly better than TMCC11, TMCC13 and TMCC3, when tested against random signatures.

TABLE 13

Performance of PCa signatures in different datasets. Comparative TMCC11 and known PCa signatures prognostic potential.

| | P-values (compared to known PCa signatures) Dataset | | |
|---|---|---|---|
| Signature | STO | CAM | MSKCC |
| CUZICK | 0.00466 | 0.01610 | 2.10E−06 |
| TMCC11 | 0.00915 | 0.00479 | 0.000173 |
| HES6 | 0.00544 | 0.00447 | 0.24900 |
| ROSS(100E) | 0.17000 | 0.00720 | 0.06070 |
| IRSHAD | 0.14100 | 0.04040 | 0.14500 |
| ONCOTYPEDX | 0.05380 | 0.15600 | 0.20600 |
| SHARMA | 0.46600 | 0.29700 | 0.60400 |

Performance scored by log-rank test p-value of time to BCR difference between high and low risk groups defined by overall gene expression signature. Data is sorted by first pricipal component of the individual rankings of the 3 columns corresponding to the Cambridge, Stockholm and MSKCC datasets. The Ross (100E) signature corresponds to the genes selected based on the transcriptome profiling only.

TABLE 14

Comparative TMCC11 and known PCa signatures over performance against random signatures.

| | P-values (compared to random sets of genes) Dataset | | |
|---|---|---|---|
| Signature | STO | CAM | MSKCC |
| CUZICK | 0.0182 | 0.0272 | 0.0000 |
| TMCC11 | 0.0305 | 0.0120 | 0.0018 |
| HES6 | 0.0242 | 0.0126 | 0.5834 |
| ROSS(100E) | 0.2609 | 0.0173 | 0.1388 |
| IRSHAD | 0.2208 | 0.0552 | 0.2819 |
| ONCOTYPEDX | 0.1126 | 0.1846 | 0.3586 |
| SHARMA | 0.5489 | 0.3234 | 0.7237 |

For each signature 10000 equal size signatures were generated at random and evaluated for predicting early relapse by log-rank test p-value. An overall bootstrap p-value score was computed as proportion of random signatures performing better than the initial signature. Data is sorted by first principal component of the individual rankings of the 3 columns corresponding to the Cambridge, Stockholm and MSKCC datasets. The Ross (100E) signature corresponds to the genes selected based on transcriptome profiling only.

As noted above, the panel may comprise at least three genes selected from the group consisting of the genes CDC45, CENPI, CLSPN, ERCC6L, EXO1, and NCAPG. The 20 combinations of such three-gene sets are shown in TABLE 15.

TABLE 15

TMCC3 gene sets. Examples of TMCC combinations of three genes.

| Name | 3-gene set |
|---|---|
| TMCC3$_a$ | CDC45, NCAPG, CLSPN |
| TMCC3$_b$ | CDC45, NCAPG, EXO1 |
| TMCC3$_c$ | CDC45, NCAPG, CENPI |
| TMCC3$_d$ | CDC45, EXO1, CLSPN |
| TMCC3$_e$ | CDC45, NCAPG, ERCC6L |
| TMCC3$_f$ | CDC45, EXO1, CENPI |
| TMCC3$_g$ | NCAPG, EXO1, CLSPN |
| TMCC3$_h$ | CDC45, EXO1, ERCC6L |
| TMCC3$_i$ | CDC45, CLSPN, CENPI |
| TMCC3$_j$ | NCAPG, EXO1, CENPI |
| TMCC3$_k$ | CDC45, CLSPN, ERCC6L |
| TMCC3$_l$ | NCAPG, EXO1, ERCC6L |
| TMCC3$_m$ | NCAPG, CLSPN, CENPI |
| TMCC3$_n$ | CDC45, CENPI, ERCC6L |
| TMCC3$_o$ | NCAPG, CLSPN, ERCC6L |
| TMCC3$_p$ | EXO1, CLSPN, CENPI |
| TMCC3$_q$ | NCAPG, CENPI, ERCC6L |
| TMCC3$_r$ | EXO1, CLSPN, ERCC6L |
| TMCC3$_s$ | EXO1, CENPI, ERCC6L |
| TMCC3$_t$ | CLSPN, CENPI, ERCC6L |

As further noted above, the panel may comprise at least four genes selected from the group consisting of the genes CDC45, CENPI, CLSPN, ERCC6L, EXO1, and NCAPG. The 15 combinations of such four-gene sets are shown in TABLE 16.

TABLE 16

TMCC4 gene sets. Examples of TMCC combinations of four genes.

| Name | 4-gene set |
|---|---|
| TMCC4$_a$ | CDC45, NCAPG, CLSPN, EXO1 |
| TMCC4$_b$ | CDC45, NCAPG, CLSPN, CENPI |
| TMCC4$_c$ | CDC45, NCAPG, CLSPN, ERCC6L |
| TMCC4$_d$ | CDC45, NCAPG, EXO1, CENPI |
| TMCC4$_e$ | CDC45, NCAPG, EXO1, ERCC6L |
| TMCC4$_f$ | CDC45, NCAPG, CENPI, ERCC6L |
| TMCC4$_g$ | CDC45, CLSPN, EXO1, CENPI |
| TMCC4$_h$ | CDC45, CLSPN, EXO1, ERCC6L |
| TMCC4$_i$ | CDC45, CLSPN, CENPI, ERCC6L |
| TMCC4$_j$ | CDC45, EXO1, CENPI, ERCC6L |
| TMCC4$_k$ | NCAPG, CLSPN, EXO1, CENPI |
| TMCC4$_l$ | NCAPG, CLSPN, EXO1, ERCC6L |
| TMCC4$_m$ | NCAPG, CLSPN, CENPI, ERCC6L |
| TMCC4$_n$ | NCAPG, EXO1, CENPI, ERCC6L |
| TMCC4$_o$ | CLSPN EXO1, CENPI, ERCC6L |

As noted further above, the panel may comprise at least five genes selected from the group consisting of the genes CDC45, CENPI, CLSPN, ERCC6L, EXO1, and NCAPG. The six combinations of such five-gene sets are shown in TABLE 17.

TABLE 17

TMCC5 gene sets. Examples of TMCC combinations of five genes.

| Name | 5-gene set |
|---|---|
| TMCC5$_a$ | CDC45, NCAPG, CLSPN, EXO1, CENPI |
| TMCC5$_b$ | CDC45, NCAPG, CLSPN, EXO1, ERCC6L |
| TMCC5$_c$ | CDC45, NCAPG, CLSPN, CENPI, ERCC6L |
| TMCC5$_d$ | CDC45, NCAPG, EXO1, CENPI, ERCC6L |
| TMCC5$_e$ | CDC45, CLSPN, EXO1, CENPI, ERCC6L |
| TMCC5$_f$ | NCAPG, CLSPN, EXO1, CENPI, ERCC6L |

TABLE 18

HUGO gene nomenclature ID Numbers for the genes selected for testing.

| HUGO Gene Nomenclature ID No. | Gene Symbol |
|---|---|
| 1149 | BUB1B |
| 1739 | CDC45 |
| 1722 | CDK1 |
| 3968 | CENPI |
| 19715 | CLSPN |
| 20794 | ERCC6L |
| 3511 | EXO1 |
| 24304 | NCAPG |
| 18538 | NUSAP1 |
| 9817 | RAD51 |
| 10452 | RRM2 |
| 23820 | E2F7 |
| 19682 | GSG2 (HASPIN) |
| 10472 | RUNX2 |
| 29636 | MNS1 |
| 4861 | HELLS |
| 28349 | RMI2 |
| 24219 | CD3EAP |
| 9369 | PRIM1 |
| 24453 | DSCC1 |
| 23170 | WDHD1 |
| 12307 | TRIP13 |
| 11629 | TCF19 |
| 16147 | MCM8 |

Discussion

The present disclosure is directed to multi-gene prognostic signatures (such as, but not limited to, TMCC3 which includes at least 3 genes, TMCC4 which includes at least 4 genes, TMCC5 which includes at least 5 genes, TMCC6 which includes at least 6 genes, TMCC11 which includes at least 11 genes, and TMCC13 which includes at least 13 genes) for PCa progression comprising genes associated with cell-cycle and DNA damage response. The prognostic value of these signatures was confirmed on several publicly available cohorts totaling 834 samples from geographically different cohorts of patients that underwent RP. The signatures are independent predictors of biochemical recurrence after RP and add significant prognostic value to standard clinicopathological variables. In a multivariate analysis and using a model constructed using a forward stepwise selection coupled with Cox proportional hazard, TMCC11 was the only variable consistently predictive of BCR in all of the datasets, and it significantly increased risk prediction independently and when combined with other clinical variables. In subsets of patients with high/low surgical Gleason or pathological scores, the TMCC11 signature provided a statistically significant stratification of patients within the high Gleason or pathological scores, identifying high and low risk groups of BCR.

A major obstacle in the clinical management of PCa relates to overdiagnosis and overtreatment of patients with newly diagnosed disease. Many of these patients will present with indolent disease that can be managed by active surveillance, avoiding surgical treatment and potential complications derived from it. Data presented here indicate that TMCC11 can stratify patients that present with low biopsy or pre-operative Gleason scores, thus can provide relevant prognostic information in several clinical scenarios and have an impact not only on the decision of whether to provide adjuvant therapy after RP, but also on treatment management after a positive biopsy.

Currently several tissue-based genomic biomarkers offer prognostic information for patients with PCa either before or after treatment. The Decipher®, Oncotype DX® and Prolaris® are commercially available panels based on measurement of gene expression changes at the RNA level. The Prolaris® panel examines the expression of 31 genes involved in cell cycle progression. Five genes used in the Prolaris® panel also occur in the presently disclosed TMCC11 panel. Using the SigCheck Bioconductor package, a similar prognostic performance for the Prolaris® and the TMCC11 signatures was observed when compared against random size-matched signatures. In this analysis, the prognostic power (based on p-value) of the TMCC11 signature vs. Prolaris® was dependent on the dataset utilized, but they were similarly informative and both behaved as strong risk predictors, although the TMCC11 panel used 20 fewer markers than Prolaris®. Using the Cambridge dataset, the TMCC11 was a better predictor (p=0.00479) than the Prolaris® signature (p=0.0161), but in the Stockholm dataset, the Prolaris® (p=0.00466) was slightly stronger than TMCC11 (p=0.00915). The smaller size of the TMCC11 signature (11 genes vs. 31 of Prolaris®) is an advantage in clinical use since smaller signatures are more amenable to testing with reduced RNA quantities (i.e. biopsy samples) or even assayed with immunohistochemistry. In addition, TMCC3a, a signature comprising a three gene subset of the TMCC11 signature, and that does not overlap with the Prolaris® gene set, demonstrated good prognostic ability in SigCheck analysis. Finally, the fact that the present studies have independently led to the identification of a cell-cycle based signature validates the value of using cell cycle genes as prognostic markers in PCa.

Accordingly, further to the above, the present disclosure is directed to at least the following non-limiting embodiments:

Clause 1. A method for generating quantitative data for a subject, comprising determining an expression level of a biomarker panel in a sample obtained from the subject, the biomarker panel comprising at least one biomarker selected from a first biomarker group consisting of the genes CDC45, CENPI, CLSPN, ERCC6L, EXO1, NCAPG, and optionally at least one additional biomarker selected from a second biomarker group consisting of the genes BUB1B, CDK1, E2F7, GSG2, NUSAP1, RAD51, and RRM2 in any combination, wherein the expression level is obtained by measuring expression of the biomarker panel in the sample, and wherein the subject has a cancer, or is suspected of having a cancer.

Claus 2. The method of clause 1, wherein the biomarker panel comprises CDC45.

Claus 3. The method of clause 1 or 2, wherein the biomarker panel comprises at least two biomarkers of the first biomarker group.

Clause 4. The method of any one of clauses 1-3, wherein the biomarker panel comprises CDC45 and NCAPG.

Clause 5. The method of any one of clauses 1-4, wherein the biomarker panel comprises at least three biomarkers of the first biomarker group selected from the set shown in Table 15.

Clause 6. The method of any one of clauses 1-5, wherein the biomarker panel comprises CDC45, NCAPG, and CLSPN.

Clause 7. The method of any one of clauses 1-6, wherein the biomarker panel comprises at least four biomarkers of the first biomarker group selected from the set shown in Table 16.

Clause 8. The method of any one of clauses 1-7, wherein the biomarker panel comprises at least five biomarkers of the first biomarker group selected from the set shown in Table 17.

Clause 9. The method of any one of clauses 1-8, wherein the biomarker panel comprises all six biomarkers of the first biomarker group.

Clause 10. The method of any one of clauses 1-9, wherein the biomarker panel comprises all six biomarkers of the first biomarker group and at least five biomarkers of the second biomarker group.

Clause 11. The method of any one of clauses 1-10, wherein the biomarker panel comprises CDC45, CENPI, CLSPN, ERCC6L, EXO1, NCAPG, BUB1B, CDK1, NUSAP1, RAD51, and RRM2.

Clause 12. The method of any one of clauses 1-11, wherein the cancer the subject has, or is suspected of having, is selected from the group consisting of prostate cancer, brain cancer, lung cancer, breast cancer, bladder cancer, and ovarian cancer.

Clause 13. The method of any one of clauses 1-12, wherein the sample is obtained from cells or portions of cells selected from the group consisting of a biopsy sample, tumor tissue excised during a surgery, circulating tumor cells, exosomes, and vesicles.

Clause 14. The method of any one of clauses 1-13, wherein the expression level of the at least one biomarker is determined using immunohistochemistry, PCR, RNA sequencing, multiplex RNA quantitation using molecular barcoding, and/or test surfaces comprising a microarray, microbeads, or capture surface.

Clause 15. The method of any one of clauses 1-14, wherein the expression level of the at least one biomarker is compared to an expression level of the at least one biomarker determined from a control group of subjects who do not have the cancer.

Clause 16. The method of of any one of clauses 1-15, wherein the expression level of the at least one biomarker is compared to an expression level of the at least one biomarker determined from a control group of subjects who have the cancer.

Clause 17. The method of any one of clauses 1-16, wherein the expression level of the biomarker panel is based on an average of expression measurements from at least two biomarkers.

Clause 18. The method of any one of clauses 1-17, further comprising applying to the subject active surveillance, hormonal therapy, chemotherapy, immunotherapy, radiation therapy, cryotherapy, and/or surgery based on whether the subject is at risk for the cancer, has been previously treated for the cancer, or has been diagnosed with the cancer but has not been previously treated for the cancer.

Clause 19. The method of clause 18, wherein the cancer is prostate cancer and the subject who has been previously treated for prostate cancer was treated by radical prostatectomy.

Clause 20. The method of clause 18, wherein active surveillance is applied to the subject when the expression level of the at least one biomarker is less than a threshold index value, and wherein one or more of hormonal therapy, chemotherapy, immunotherapy, radiation therapy, and surgery is applied to the subject when the expression level of the at least one biomarker is equal to or greater than the threshold index value.

Clause 21. An assay system for use in a cancer assay of a test sample, comprising: a test surface; and a plurality of capture molecules immobilized directly or indirectly on the test surface, wherein the plurality of capture molecules are selected from a group of molecules specific for RNA, proteins, and/or cDNA corresponding to a biomarker panel comprising the biomarker panel comprising at least one biomarker selected from a first biomarker group consisting of the genes CDC45, CENPI, CLSPN, ERCC6L, EXO1, NCAPG, and optionally at least one additional biomarker selected from a second biomarker group consisting of the genes BUB1B, CDK1, E2F7, GSG2, NUSAP1, RAD51, and RRM2 in any combination, for measuring an expression level of the biomarker panel in the sample Clause 22. The assay system of clause 21, wherein the test surface is selected from the group consisting of a plate, a microarray plate, a capture surface, microbeads, and a test strip.

Clause 23. The assay system of clause 21 or 22, wherein the assay system is used to measure the expression level by immunohistochemistry, PCR, RNA sequencing, and/or multiplex RNA quantitation using molecular barcoding of nanostrings.

Clause 24. The assay system of any one of clauses 21-23, wherein the sample is obtained from cells or portions of cells selected from the group consisting of a biopsy sample, tissue excised during a surgery, circulating tumor cells, exosomes, and vesicles.

Clause 25. The assay system of any one of clauses 21-24, wherein the cancer is selected from the group consisting of prostate cancer, brain cancer, lung cancer, breast cancer, bladder cancer, and ovarian cancer.

Clause 26. The assay system of clause 25, wherein the test sample is derived from prostate gland tissue of a subject, wherein the test sample is obtained from a biopsy, a surgically-excised tissue, circulating cells, or portions of cells from the subject.

Clause 27. The assay system of any one of clauses 21-26, wherein the biomarker panel comprises CDC45.

Clause 28. The assay system of any one of clauses 21-27, wherein the biomarker panel comprises at least two biomarkers of the first biomarker group.

Clause 29. The assay system of any one of clauses 21-28, wherein the biomarker panel comprises CDC45 and NCAPG.

Clause 30. The assay system of any one of clauses 21-29, wherein the biomarker panel comprises at least three biomarkers of the first biomarker group selected from the set shown in Table 15.

Clause 31. The assay system of any one of clauses 21-30, wherein the biomarker panel comprises CDC45, NCAPG, and CLSPN.

Clause 32. The assay system of any one of clauses 21-31, wherein the biomarker panel comprises at least four biomarkers of the first biomarker group selected from the set shown in Table 16.

Clause 33. The assay system of any one of clauses 21-32, wherein the biomarker panel comprises at least five biomarkers of the first biomarker group selected from the set shown in Table 17.

Clause 34. The assay system of any one of clauses 21-33, wherein the biomarker panel comprises all six biomarkers of the first biomarker group.

Clause 35. The assay system of any one of clauses 21-34, wherein the biomarker panel comprises all six biomarkers of the first biomarker group and at least five biomarkers of the second biomarker group.

Clause 36. The assay system of any one of clauses 21-35, wherein the biomarker panel comprises CDC45, CENPI, CLSPN, ERCC6L, EXO1, NCAPG, BUB1B, CDK1, NUSAP1, RAD51, and RRM2.

Clause 37. The assay system of any one of clauses 21-36, further comprising applying to the subject active surveillance, hormonal therapy, chemotherapy, immunotherapy, radiation therapy, cryotherapy, and/or surgery based on whether the subject is at risk for the cancer, has been previously treated for the cancer, or has been diagnosed with the cancer but has not been previously treated for the cancer.

Clause 38. The assay system of clause 37, wherein the cancer is prostate cancer and the subject who has been previously treated for prostate cancer was treated by radical prostatectomy.

Clause 39. The assay system of any one of clauses 21-38, wherein active surveillance is applied to the subject when the expression level of the biomarker panel is less than a threshold index value, and wherein one or more of hormonal therapy, chemotherapy, immunotherapy, radiation therapy, and surgery is applied to the subject when the expression level of the biomarker panel is equal to or greater than the threshold index value.

Clause 40. The assay system of any one of clauses 21-39, wherein the expression level of the at least one biomarker is compared to an expression level of the biomarker panel determined from a control group of subjects who do not have the cancer.

Clause 41. The assay system of any one of clauses 21-40, wherein the expression level of the at least one biomarker is compared to an expression level of the biomarker panel determined from a control group of subjects who have the cancer.

Clause 42. The assay system of any one of clauses 21-41, wherein the expression level of the biomarker panel is based on an average of expression measurements from at least two biomarkers.

Clause 43. The assay system of any one of clauses 21-42, further comprising oligonucleotides specific for one or more housekeeping genes for normalizing the expression level of the biomarker panel.

Clause 44. A method for determining gene expression in a sample obtained from a subject having or suspected of having a cancer, comprising: (a) obtaining the sample, wherein the sample is derived from a biopsy, a surgically-excised tissue, circulating cells, or portions of cells from the subject; (b) measuring expression of a biomarker panel in the sample, the biomarker panel comprising at least one gene, or at least two genes, or at least three genes, or at least four genes, or at least five genes, or all six genes, of a first biomarker group consisting of the genes CDC45, CENPI, CLSPN, ERCC6L, EXO1, NCAPG, and one or more genes selected from a second biomarker group consisting of the genes BUB1B, CDK1, E2F7, GSG2, NUSAP1, RAD51, and RRM2 in any combination; (c) calculating a test value based on the expression of the biomarker panel; (d) comparing the test value to a threshold index value; and (e) administering to the subject active surveillance when the test value is less than the threshold index value, and administering to the subject one or more of hormonal therapy, chemotherapy, immunotherapy, radiation therapy, cryotherapy, or surgery when the test value is equal to or greater than the threshold index value.

Clause 45. The method of clause 44, wherein the cancer the subject has, or is suspected of having, is selected from the group consisting of prostate cancer, brain cancer, lung cancer, breast cancer, bladder cancer, and ovarian cancer.

Clause 46. A method for determining gene expression in a sample derived from prostate gland tissue of a subject, comprising: (a) obtaining the sample derived from prostate gland tissue wherein the sample is obtained from a biopsy, a surgically-excised tissue, circulating cells, or portions of cells from the subject; (b) measuring expression of a biomarker panel in the sample, the biomarker panel comprising at least one gene, or at least two genes, or at least three genes, or at least four genes, or at least five genes, or all six genes, of a first biomarker group consisting of the genes CDC45, CENPI, CLSPN, ERCC6L, EXO1, NCAPG, and one or more genes selected from a second biomarker group consisting of the genes BUB1B, CDK1, E2F7, GSG2, NUSAP1, RAD51, and RRM2 in any combination; (c) calculating a test value based on the expression of the biomarker panel; (d) comparing the test value to a threshold index value, and (e) administering to the subject active surveillance when the test value is less than the threshold index value, and administering to the subject one or more of hormonal therapy, chemotherapy, immunotherapy, radiation therapy, cryotherapy, or surgery when the test value is equal to or greater than the threshold index value.

Clause 47. The method of clause 46, wherein the sample is obtained from cells or portions of cells selected from the group consisting of a prostate biopsy sample, prostate tissue excised during a surgery, circulating tumor cells, exosomes, and vesicles.

Clause 48. The method of clause 46, wherein the subject is prognosticated to have a recurrence of prostate cancer when the test value is equal to or exceeds the threshold index value.

Clause 49. The method of clause 46, wherein the subject is predicted to benefit from a therapeutic treatment when the test value is less than the threshold index value.

Clause 50. A method for treating prostate cancer in a subject, comprising: (a) obtaining a sample derived from prostate gland tissue wherein the sample is obtained from a prostate biopsy, a surgically-excised prostate tissue, circulating cells, or portions of cells from the subject; (b) measuring expression of a biomarker panel in the sample, the biomarker panel comprising at least one gene, or at least two genes, or at least three genes, or at least four genes, or at least five genes, or all six genes, of a first biomarker group consisting of the genes CDC45, CENPI, CLSPN, ERCC6L, EXO1, NCAPG, and one or more genes selected from a second biomarker group consisting of the genes BUB1B, CDK1, E2F7, GSG2, NUSAP1, RAD51, and RRM2 in any combination; (c) calculating a test value based on the expression of the biomarker panel; (d) comparing the test value to a threshold index value; and (e) administering to the subject active surveillance when the test value is less than the threshold index value, and administering to the subject one or more of hormonal therapy, chemotherapy, immunotherapy, radiation therapy, cryotherapy, or surgery when the test value is equal to or greater than the threshold index value.

Clause 51. The method of clause 50, wherein the sample is obtained from cells or portions of cells selected from the group consisting of a prostate biopsy sample, prostate tissue excised during a surgery, circulating tumor cells, exosomes, and vesicles.

Clause 52. The method of any one of clauses 45-51, wherein the biomarker panel comprises CDC45.

Clause 53. The method of any one of clauses 45-52, wherein the biomarker panel comprises at least two biomarkers of the first biomarker group.

Clause 54. The method of any one of clauses 45-53, wherein the biomarker panel comprises CDC45 and NCAPG.

Clause 55. The method of any one of clauses 45-54, wherein the biomarker panel comprises at least three biomarkers of the first biomarker group selected from the set shown in Table 15.

Clause 56. The method of any one of clauses 45-55, wherein the biomarker panel comprises CDC45, NCAPG, and CLSPN.

Clause 57. The method of any one of clauses 45-56, wherein the biomarker panel comprises at least four biomarkers of the first biomarker group selected from the set shown in Table 16.

Clause 58. The method of any one of clauses 45-57, wherein the biomarker panel comprises at least five biomarkers of the first biomarker group selected from the set shown in Table 17.

Clause 59. The method of any one of clauses 45-58, wherein the biomarker panel comprises all Clause 60. The method of any one of clauses 45-59, wherein the biomarker panel comprises all six biomarkers of the first biomarker group and at least five biomarkers of the second biomarker group.

Clause 61. The method of any one of clauses 45-60, wherein the biomarker panel comprises CDC45, CENPI, CLSPN, ERCC6L, EXO1, NCAPG, BUB1B, CDK1, NUSAP1, RAD51, and RRM2.

Clause 62. The method of any one of clauses 45-61, wherein the expression level of the at least one biomarker is determined using immunohistochemistry, PCR, RNA sequencing, multiplex RNA quantitation using molecular barcoding, and/or test surfaces comprising a microarray, microbeads, or nanostrings.

Clause 63. The method of any one of clauses 45-62, wherein the expression level of the at least one biomarker is compared to an expression level of the at least one biomarker determined from a Clause 64. The method of any one of clauses 45-63, wherein the expression level of the at least one biomarker is compared to an expression level of the at least one biomarker determined from a control group of subjects who have the cancer.

Clause 65. The method of any one of clauses 45-64, wherein the expression level of the biomarker panel is based on an average of expression measurements from at least two biomarkers.

Clause 66. A method for determining gene expression in a sample obtained from a subject diagnosed with prostate cancer, comprising: (a) obtaining the sample, wherein the sample is derived from a biopsy, a surgically-excised tissue, circulating cells, or portions of cells from the subject; (b) measuring an expression level of a biomarker panel in a sample obtained from the subject, the biomarker panel comprising at least one biomarker selected from a first biomarker group consisting of the genes CDC45, CENPI, CLSPN, ERCC6L, EXO1, NCAPG, and optionally at least one additional biomarker selected from a second biomarker group consisting of the genes BUB1B, CDK1, E2F7, GSG2, NUSAP1, RAD51, and RRM2 in any combination, wherein the expression level is obtained by measuring expression of the biomarker panel in the sample; (c) calculating a test value based on the expression level of the biomarker panel; (d) comparing the test value to a threshold index value; (e) determining that the subject is likely to respond favorably or unfavorably to a prostate cancer treatment modality based on the relation of the test value to the threshold index value; and (f) adjusting the treatment modality administered to the subject based on whether it is determined that the subject is likely to respond favorably or unfavorably to the treatment modality.

It will be understood from the foregoing description that various modifications and changes may be made in the various embodiments of the present disclosure without departing from their true spirit. The description provided herein is intended for purposes of illustration only and is not intended to be construed in a limiting sense, except where specifically indicated. Thus, while the present disclosure has been described herein in connection with certain embodiments so that aspects thereof may be more fully understood and appreciated, it is not intended that the present disclosure be limited to these particular embodiments. On the contrary, it is intended that all alternatives, modifications and equivalents are included within the scope of the present disclosure as defined herein. Thus the examples described above, which include particular embodiments, will serve to illustrate the practice of the present disclosure, it being understood that the particulars shown are by way of example and for purposes of illustrative discussion of particular embodiments only and are presented in the cause of providing what is believed to be a useful and readily understood description of procedures as well as of the principles and conceptual aspects of the inventive concepts. Changes may be made in the formulation of the various components and compositions described herein, the methods described herein or in the steps or the sequence of steps of the methods described herein without departing from the spirit and scope of the present disclosure.

What is claimed is:

1. A method of treating prostate cancer in a subject in need of such treatment, comprising:
   (a) providing an assay system for analyzing a sample of prostate gland tissue obtained from the subject, the assay system comprising:
      a set of immobilized probes, wherein the probes are selected from a group of probes specific for RNA, proteins, and/or cDNA corresponding to a biomarker panel comprising at least the genes CDC45, CENPI, CLSPN, ERCC6L, EXO1, NCAPG, BUB1B, CDK1, NUSAP1, RAD51, and RRM2, and wherein an expression level of the biomarker panel in the sample is obtainable by measuring expression of each biomarker of the biomarker panel in the sample;
   (b) providing the sample;
   (c) using the assay system to measure expression of the biomarker panel in the sample;
   (d) calculating a test value based on the expression of the biomarker panel;
   (e) comparing the test value to a threshold index value; and
   (f) administering to the subject one or more prostate cancer treatment therapies selected from the group consisting of prostate cancer hormonal therapy, prostate cancer chemotherapy, prostate cancer immunotherapy, prostate cancer radiation therapy, prostate cancer cryotherapy, and prostate cancer surgery when the test value is equal to or greater than the threshold index value.

2. The method of claim 1, wherein the assay system further comprises oligonucleotides specific for one or more housekeeping genes for normalizing the expression level of the biomarker panel.

3. A method of treating a subject after completion of a surgical procedure to treat prostate cancer in the subject, comprising:
   (a) providing an assay system for analyzing a sample of prostate gland tissue obtained from the subject, the assay system comprising:

a set of immobilized probes, wherein the probes are selected from a group of probes specific for RNA, proteins, and/or cDNA corresponding to a biomarker panel comprising at least the genes CDC45, CENPI, CLSPN, ERCC6L, EXO1, NCAPG, BUB1B, CDK1, NUSAP1, RAD51, and RRM2, and wherein an expression level of the biomarker panel in the sample is obtainable by measuring expression of each biomarker of the biomarker panel in the sample;

(b) providing the sample;

(c) using the assay system to measure expression of the biomarker panel in the sample;

(d) calculating a test value based on the expression of the biomarker panel;

(e) comparing the test value to a threshold index value; and (f) administering to the subject one or more prostate cancer treatment therapies selected from the group consisting of prostate cancer hormonal therapy, prostate cancer chemotherapy, prostate cancer immunotherapy, prostate cancer radiation therapy, prostate cancer cryotherapy, and radical prostatectomy surgery when the test value is equal to or greater than the threshold index value.

4. The method of claim 3, wherein the assay system further comprises oligonucleotides specific for one or more housekeeping genes for normalizing the expression level of the biomarker panel.

5. A method of treating prostate cancer in subject who has had a radical prostatectomy procedure, comprising:

(a) providing an assay system for analyzing a sample of prostate gland tissue obtained from the subject, the assay system comprising:
a set of immobilized probes, wherein the probes are selected from a group of probes specific for RNA, proteins, and/or cDNA corresponding to a biomarker panel comprising at least the genes CDC45, CENPI, CLSPN, ERCC6L, EXO1, NCAPG, BUB1B, CDK1, NUSAP1, RAD51, and RRM2, and wherein an expression level of the biomarker panel in the sample is obtainable by measuring expression of each biomarker of the biomarker panel in the sample;

(b) providing the sample;

(c) using the assay system to measure expression of the biomarker panel in the sample;

(d) calculating a test value based on the expression of the biomarker panel;

(e) comparing the test value to a threshold index value; and (f) administering to the subject one or more prostate cancer treatment therapies selected from the group consisting of prostate cancer hormonal therapy, prostate cancer chemotherapy, prostate cancer immunotherapy, prostate cancer radiation therapy, and prostate cancer cryotherapy, when the test value is equal to or greater than the threshold index value.

6. The method of claim 5, wherein the assay system further comprises oligonucleotides specific for one or more housekeeping genes for normalizing the expression level of the biomarker panel.

* * * * *